(12) United States Patent
Finn et al.

(10) Patent No.: US 12,481,843 B1
(45) Date of Patent: *Nov. 25, 2025

(54) ENCAPSULATING A METAL INLAY WITH THERMOSETTING RESIN AND METHOD FOR MAKING A METAL TRANSACTION CARD

(71) Applicant: Metaland LLC, Doral, FL (US)

(72) Inventors: David Finn, Fussen Weissensee (DE); Darren Molloy, Killour (IE); Daniel Pierrard, Killour (IE)

(73) Assignee: Metaland LLC, Doral, FL (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/952,253

(22) Filed: Sep. 24, 2022

Related U.S. Application Data

(63) Continuation-in-part of application No. 17/903,886, filed on Sep. 6, 2022, which is a continuation-in-part
(Continued)

(51) Int. Cl.
  *G06K 19/06* (2006.01)
  *B41M 5/24* (2006.01)
  (Continued)

(52) U.S. Cl.
  CPC ............. *G06K 1/12* (2013.01); *B41M 5/24* (2013.01); *B41M 7/0036* (2013.01)

(58) Field of Classification Search
  CPC ......... G06K 19/07749; G06K 19/0723; G06K 19/077; G06K 19/07; G06K 19/07722;
  (Continued)

(56) References Cited

U.S. PATENT DOCUMENTS 9,475,086 B2 * 10/2016 Finn ................. B23K 26/361
9,836,684 B2 * 12/2017 Finn ................. G06K 19/07788
(Continued)

FOREIGN PATENT DOCUMENTS

CN        111684466        *   9/2020   ......... G06K 19/077

OTHER PUBLICATIONS

Foreign Patent.*

*Primary Examiner* — Daniel St Cyr
(74) *Attorney, Agent, or Firm* — Michael D. Eisenberg; MDE Patents

(57) ABSTRACT

A method of making a smartcard may comprise: providing a metal layer (ML) having a module opening (MO) extending from a front surface of the metal layer to a rear surface thereof; providing a sacrificial layer (SL) on the front surface of the metal layer; filling (from behind) the module opening with thermosetting resin (TR); allowing the thermosetting resin to cure (harden); removing the sacrificial layer; and from the front surface of the metal layer, milling a cavity in the cured (hardened) thermosetting resin for receiving a transponder chip module (TCM). A chip module may be implanted in the milled-out cavity, wherein the thermosetting resin provides mechanical support to the chip module and electrical insulation of the chip module from the metal layer. The smartcard may be "dual-interface".

6 Claims, 19 Drawing Sheets

Dual Interface (DI) Metal Core Smartcard (SC)

Related U.S. Application Data of application No. 17/882,569, filed on Aug. 7, 2022, and a continuation-in-part of application No. 17/882,568, filed on Aug. 7, 2022, and a continuation-in-part of application No. 17/866,547, filed on Jul. 17, 2022, now Pat. No. 11,948,036, and a continuation-in-part of application No. 17/857,912, filed on Jul. 5, 2022, and a continuation-in-part of application No. 17/839,521, filed on Jun. 14, 2022.

(60) Provisional application No. 63/349,106, filed on Jun. 5, 2022, provisional application No. 63/345,430, filed on May 25, 2022, provisional application No. 63/334,671, filed on Apr. 26, 2022, provisional application No. 63/283,561, filed on Nov. 29, 2021, provisional application No. 63/241,005, filed on Sep. 6, 2021.

(51) Int. Cl.
*B41M 7/00* (2006.01)
*G06K 1/12* (2006.01)

(58) Field of Classification Search
CPC .......... G06K 19/07758; G06Q 20/357; G06Q 20/3278; G06F 3/044
USPC .............. 235/487, 492, 486, 462.46, 472.02
See application file for complete search history.

(56) References Cited

U.S. PATENT DOCUMENTS

| | | | |
|---|---|---|---|
| 11,829,826 B2* | 11/2023 | Lowe | G06K 19/0772 |
| 11,983,591 B2* | 5/2024 | Michieli | B42D 25/47 |
| 2004/0099746 A1* | 5/2004 | Norton | G06K 19/0728 |
| | | | 235/492 |
| 2013/0126622 A1* | 5/2013 | Finn | H05K 3/103 |
| | | | 29/601 |
| 2015/0180229 A1* | 6/2015 | Herslow | G06K 19/07749 |
| | | | 156/60 |
| 2017/0267013 A1* | 9/2017 | Staub | B42D 25/29 |
| 2018/0339503 A1* | 11/2018 | Finn | H01Q 1/2225 |
| 2019/0236434 A1* | 8/2019 | Lowe | G06K 19/02 |
| 2021/0049431 A1* | 2/2021 | Finn | G06K 19/0723 |

* cited by examiner (FIG. 4 of US 10,534,990)

Dual Interface (DI) Metal Core Smartcard (SC)

Transponder Chip Module (TCM)

FIG. 7B

Dual Interface (DI) Metal Face Smartcard (SC)

smartcard 700

- Hard Coat, Ink & Primer (723, 724, 725, 726, 727)

a - - - - -

- Sacrificial Layer (SL: 709A)
- Metal Layer (730) with module opening (712: P1) and slit (720A)
- Intercoat (738)
- Thermosetting Resin (768A)

b - - - - -

- Adhesive Layer (743A)

c - - - - -

- Sacrificial Layer (SL: 709B)
- Supporting Metal Layer (750) with module opening (714: P2) and slit (720B)
- Intercoat (748)
- Thermosetting Resin (768B)

d - - - - -

- Adhesive Layer (743B)
- Printed Stock (760, 764, 770)

Dual Interface (DI) Metal Face Smartcard (SC) with Booster Antenna Circuit (BAC)

FIG. 10B

Dual Interface (DI) Metal Face Smartcard (SC)

with Booster Antenna Circuit (BAC)

smartcard 1000B

Hard Coat, Ink & Primer (1023, 1024, 1025, 1026, 1027)

a----------

Sacrificial Layer (SL: 1009)

Metal Layer (1030) with module opening (1012: P1) and no slit

Intercoat (1038)

Magnetic Shielding with void (1042)

Adhesive Spacing Layer (1043)

Booster Antenna Circuit (BAC: 1044)

Intercoat (1048)

Thermosetting Resin (1068)

b----------

Adhesive / Intercoat (1058)

Printed Stock (1060, 1062, 1064, 1070)

ENCAPSULATING A METAL INLAY WITH THERMOSETTING RESIN AND METHOD FOR MAKING A METAL TRANSACTION CARD

CROSS-REFERENCES TO RELATED APPLICATIONS

This application is:
a continuation-in-part of Ser. No. 17/903,886 filed 6 Sep. 2022
   Ser. No. 17/903,886 is a non-provisional of 63/241,005 filed 6 Sep. 2021
a continuation-in-part of Ser. No. 17/882,569 filed 7 Aug. 2022
   Ser. No. 17/882,569 is a non-provisional of 63/349,106 filed 5 Jun. 2022
   Ser. No. 17/882,569 is a non-provisional of 63/345,430 filed 25 May 2022
   Ser. No. 17/882,569 is a non-provisional of 63/334,671 filed 26 Apr. 2022
   Ser. No. 17/882,569 is a non-provisional of 63/283,561 filed 29 Nov. 2021
   Ser. No. 17/882,569 is a non-provisional of 63/241,005 filed 6 Sep. 2021
a continuation-in-part of Ser. No. 17/882,568 filed 7 Aug. 2022
   Ser. No. 17/882,568 is a non-provisional of 63/349,106 filed 5 Jun. 2022
   Ser. No. 17/882,568 is a non-provisional of 63/345,430 filed 25 May 2022
   Ser. No. 17/882,568 is a non-provisional of 63/334,671 filed 26 Apr. 2022
   Ser. No. 17/882,568 is a non-provisional of 63/283,561 filed 29 Nov. 2021
   Ser. No. 17/882,568 is a non-provisional of 63/241,005 filed 6 Sep. 2021
a continuation-in-part of Ser. No. 17/866,547 filed 17 Jul. 2022
a continuation-in-part of Ser. No. 17/857,912 filed 5 Jul. 2022
a continuation-in-part of Ser. No. 17/839,521 filed 14 Jun. 2022
a non-provisional of 63/349,106 filed 5 Jun. 2022
a non-provisional of 63/345,430 filed 25 May 2022
a non-provisional of 63/334,671 filed 26 Apr. 2022
a non-provisional of 63/283,561 filed 29 Nov. 2021

FIELD OF THE INVENTION

The present invention relates generally to smartcards (or transaction cards) and, more particularly, to a transaction card having a metal layer and a laser-cut module opening in the metal layer, with the metal layer encapsulated on at least one side with a thermosetting resin, and the module opening further filled with said resin, and later implanting of a chip module in a milled-out cavity in the fully cured resin. The hardened resin provides mechanical support to the chip module and electrical insulation (isolation) from the metal layer. The transaction card may be "dual-interface" (DI)— capable of both contact and contactless functionality (communication with an external reader or terminal).

BACKGROUND

FIG. 2A of US 2013/0126622 (23 May 2013; Finn) shows an exemplary stack-up (sequence of layers) for a metallized smart card 200, having the following layers, structures and components. Exemplary dimensions may be presented. All dimensions are approximate. Thickness refers to vertical dimension in the figure.

A top layer 202 may be a metal (or metallized) layer 202, such as 250 µm thick stainless steel
A layer 203 of adhesive, such as 40 µm thick of polyurethane
A layer 204 of ferrite material, such as 60 µm thick sheet of soft (flexible) ferrite
A layer 205 of adhesive, such as 40 µm thick of polyurethane
A layer 208 of plastic material, such as 50-100 µm thick PVC
A layer 210 of plastic material, such as 150-200 µm thick PVC
Wire 212, such as 112 µm diameter wire, forming the booster antenna (BA) with coupler coil (CC)
A layer 214 of plastic material, such as 150 µm thick PVC, which may include printing, magnetic stripe, etc.
A layer 216 of plastic material, such as 50 µm thick PVC, which may serve as an overlay
The overall thickness of the smart card 200 (layers 202, 203, 204, 208, 210, 214, 216) may be approximately 810 µm (0.81 mm).

As shown in FIG. 2A of US 2013/0126622, prior art metal transaction card with a front face metal layer, has used a layer 204 of ferrite material between the metal layer 202 and the internal antenna 212 of the card to shield the antenna from the deleterious effect of the metal layer. Polyurethane layers (40 µm) bond the ferrite layer to the metal layer and to an underlying plastic layer. However, the ferrite layer tends to delaminate under wear and tear, and when subject to temperature and humidity. The ferrite material is also quite expensive. It is therefore desirable to provide a metal transaction card having a metal layer, in which the ferrite material does not extend to the edges of the metal card body.

An example of a metal transaction card having a ferrite layer disposed between a front face metal layer and in-card antenna structure wherein the ferrite layer on the backside of the front face metal layer does not extend to the perimeter edge of the metal layer may be found in U.S. Pat. No. 9,898,699 (20 Feb. 2018: CompoSecure: Herslow et al.).

Implanting a transponder chip module in a laser-cut module opening in a front face metal layer previously filled with a thermosetting resin and allowed to fully cure, before machining (CNC milling) the hardened resin to create a recess or pocket to accept the implanting of the chip module is described in a plethora of patent applications: U.S. Ser. No. 17/839,521 (14 Jun. 2022; Finn et al.), U.S. Ser. No. 17/857,912 (5 Jul. 2022: Finn et al.), U.S. Ser. No. 17/866, 547 (17 Jul. 2022: Finn et al.), U.S. Ser. No. 17/882,568 (7 Aug. 2022: Finn et al.), U.S. Ser. No. 17/882,569 (7 Aug. 2022: Finn et al.) and U.S. Ser. No. 17/903,886 (6 Sep. 2022; Finn et al.).

Laser-cutting the module opening in the front face metal layer instead of milling the metal layer to create the module opening significantly reduces the machining time, but also eliminates the need to use expensive coated milling tools which have a short tool life in the application. In the case of a laser-cut module opening, a separation channel of a given width between the metal and the position of the milled-out recess or pocket in the resin intended for the implanting of the transponder chip module would ensure that the milling tool does not come in contact with the metal. The separation channel may also have the dual purpose of improving contactless communication.

An example of a metal transaction card having a separation channel between the metal edges in a module opening in a front face continuous metal layer and the module antenna of a transponder chip module to permit contactless communication may be found in FIG. 18A of U.S. 63/283,561 (29 Nov. 2021: Finn) entitled "RFID Enabled Metal Transaction Cards".

The separation channel creates a gap between the metal edges in the module opening and the implanted transponder chip module. With the transponder chip module implanted in the milled-out recess or pocket in the hardened resin which has filled the module opening in the front face metal layer of the metal transaction card, the module antenna of the transponder chip module inductively couples with an underlying discontinuous metal layer (with slit) or inductively couples with the coupler coil of a booster antenna circuit.

It is an object of the current invention to encapsulate a metal layer in a metal card body with thermosetting resin and filling any openings, apertures, voids, recesses or gaps in the metal layer with said resin using conventional techniques for encapsulation.

An example of a smartcard having electronic components encapsulated with polymeric material may be found in U.S. Pat. No. 6,241,153 (5 Jun. 2001: CardXX: Tiffany), U.S. Pat. No. 7,220,615 (22 May 2007: Micron Technology: Bolken), U.S. Pat. No. 7,225,537 (5 Jun. 2007: CardXX: Reed), U.S. Pat. No. 8,012,809 (6 Sep. 2011: CardXX: Reed), U.S. Pat. No. 8,324,021 (4 Dec. 2012: CardXX; Reed), U.S. Pat. No. 9,916,992 (13 Mar. 2018: Dynamics: Mullen et al.) and U.S. Pat. No. 11,392,860 (19 Jul. 19 2022: Dynamics: Mullen et al.)

Some Patents and Publications of Interest

The following patents and/or publications ("references") may be of interest or relevant to the invention(s) disclosed herein, and some commentary may be provided to distinguish the invention(s) disclosed herein from the following references.

U.S. Pat. No. 10,534,990 (14 Jan. 2020: CompoSecure: Herslow et al.), entitled "Metal smart card with dual interface capability", incorporated by reference herein, discloses a dual interface smart card, and methods for the manufacture thereof, having a metal layer, an IC module, with contacts and RF capability, and a plug formed of non RF impeding material, disposed in the metal layer. The plug provides support for the IC module and a degree of electrical insulation and isolation from the metal layer. Embodiments of the card include at least one additional layer.
Claim 1 of U.S. Pat. No. 10,534,990
A smart card comprising: a metal layer having a thickness (D) and first and second opposite surfaces: an opening in said metal layer extending for the thickness (D) of said metal layer: a plug of non-RF-impeding material and a dual interface integrated circuit (IC) module mounted in said opening, the IC module having contacts configured for physical contact with a card reader, wherein the plug has a perimeter larger than a perimeter of the IC module; and at least one additional layer stacked relative to the plug.

U.S. Ser. No. 17/839,521, entitled "RFID Enabled Metal Transaction Cards", incorporated by reference herein, discloses a metal transaction card comprising a front face continuous metal layer and a rear continuous metal layer sandwiching electronic component elements adhesively attached to each other using a thermosetting adhesive coating (epoxy or polyurethane) or a thermosetting adhesive film layer (epoxy or polyurethane). The thermosetting adhesive coating or film (epoxy or polyurethane) may be applied in B-stage, and converted to C-stage after a lamination process involving selected temperature and pressure profiles over a specific cycle time.

U.S. Ser. No. 17/857,912, entitled "Contactless Metal Cards With Fingerprint Sensor", incorporated by reference herein, discloses a biometric transaction card with a metal chassis wherein a first continuous or discontinuous metal layer is coated on one side with a chemical bonding agent (primer) followed by a coating of thermosetting resin of a defined thickness filling any opening, void, recess or slit in the first metal layer, and a second continuous or discontinuous metal layer is also coated on one side with a chemical bonding agent (primer) followed by a coating of thermosetting resin of a defined thickness filling any opening, void, recess or slit in the second metal layer, wherein both resin coated metal layers are joined together using a thermosetting adhesive film layer placed between the cured thermosetting resin layers in a hot press lamination process. The thermosetting adhesive film layer may be replaced by a coating of primer to one or both resin coated metal layers.

A dual interface chip module and or a fingerprint touch sensor (or components) may be implanted in milled-out pockets in the thermosetting resin. Removed metal sections may also be encased in (by) the thermosetting resin.

A rear side of the front continuous metal layer may be surface treated and coated with an adhesion promoter to enhance the adhesion of the thermosetting resin to the metal. The surface may be chemically etched, or sand blasted resulting in a "scuffed-up" surface. The metal surface may undergo chemical treatment as a metal finishing process. The adhesion promoter may be a thermosetting adhesive coating, a thermosetting adhesive film layer or a primer (chemical bonding agent) acting as an interface. After the deposition of the adhesive promoter, the thermosetting resin may be applied, seeping into any opening, aperture, void, cavity or recess, and encapsulating the entire area to a defined thickness.

U.S. Ser. No. 17/866,547, entitled "RFID Enabled Metal Transaction Cards", incorporated by reference herein, discloses a method for producing a metal transaction card having a front face metal layer (continuous) and a rear metal layer (discontinuous) sandwiching a magnetic shielding layer assembled to a booster antenna circuit for contactless communication separated by a resin spacing layer, wherein the metal layers and magnetic shielding layer are coated with a thermosetting resin (e.g., epoxy or polyurethane) by means of a roll coating process or any suitable over-molding process such as casting, and wherein a layer of thermosetting resin is applied to the primed surface of a metal layer with an array of card body sites forming a metal inlay having a resin thickness which can be mechanically reduced after final curing: the roll coating process also fills any pockets, channels or recesses in the metal layer with thermosetting resin: the roll coating process in addition fills any voids or holes in the magnetic shielding layer, the PET carrier layer for the booster antenna circuit and any subsequent synthetic or adhesive layers in the stack-up construction: the roll coating process further fills any openings or slits in the intermediate discontinuous metal layer covered by a sacrificial layer on one side. Optionally, thermosetting resin can be dispensed into any pocket, channel or recess in any of the layers forming a metal card body.

The metal transaction card may comprise a front face continuous or discontinuous metal layer and may have a layer of polyurethane (PU) resin upon which graphic elements may be digitally (inkjet) printed (primer and ink)

thereon. The polyurethane resin may be further doped to facilitate laser engraving or marking of its polymer surface for the purpose of personalization. Prior to the application of the polyurethane resin, the metal layer may be surface treated and primed. The polyurethane resin may be a two-component, low viscosity, semi-flexible PU compound with the physical properties (mix ratio (w/w): polyol/isocyanate, viscosity (mPa*s, or millipascal seconds), density (g/cm$^3$), pot life (min), gel-time (min), curing time (hr) and final cure (days)) determining the adhesion, hardness and tensile strength of the compound.

U.S. Ser. No. 17/882,568, entitled "RFID Enabled Metal Transaction Cards", incorporated by reference herein, discloses a metal transaction card having a front face "continuous" (no slit) or "discontinuous" (with slit) metal layer having a module opening for accepting a dual interface chip module. Coating thermosetting resin (e.g., epoxy or polyurethane) may be used to replace (in lieu of) conventional thermosetting adhesive film layers and plastic slugs or plugs, and to fill module openings, apertures, voids and recesses in layers of the card body. A booster antenna circuit, comprising of a perimeter coil, coupler coil and a capacitor bank on a polyethylene terephthalate (PET) carrier layer, disposed behind the magnetic shielding, may be encapsulated in a thermosetting resin. The magnetic shielding layer and the PET carrier layer may have voids to allow for inductive coupling. The thermosetting resin may further fill and seal the module opening in the front face continuous metal layer and any apertures, voids or recesses in subsequent layers. The resin may fill and seal any discontinuity (in the form of a slit) or opening in a rear discontinuous metal layer. The dual interface chip module may be implanted in a milled-out cavity in the thermosetting resin. Flexible glass may be laminated to a resin coated discontinuous metal layer or the flexible glass may be submerged in a layer of thermosetting resin to enhance the mechanical strength of the glass assembled on the front face metal layer.

For the purpose of clarity, a layer of thermosetting resin may be used in combination with a film layer of thermosetting adhesive. A thermosetting adhesive film layer may be used as an adhesion promoter to bond thermosetting resin to a layer of metal or may be used as a bonding interface between a cured thermosetting resin layer and a synthetic print layer. An adhesion promoter in the form of a primer (chemical bonding agent) and or a thermosetting adhesive coating may be used to laminate a cured thermosetting resin layer to a synthetic printed layer of PVC with graphic artwork.

A method of manufacturing a metal transaction card having a front face metal layer with a module opening to accept the implanting of a dual interface chip module and additional layers of thermosetting adhesive film and synthetic material may comprise: applying an adhesion promoter comprising a primer layer to a rear surface of the front face metal layer; and allowing the primer layer to dry: wherein the adhesion promoter further comprises an adhesive top-coat: further comprising: applying the adhesive top-coat onto the dried primer layer; and coating the top-coat with thermosetting resin. The thermosetting resin may be applied by a process of roll coating or slot nozzle coating. At least some of the layers may have openings, apertures, voids, or cavities; and the thermosetting resin may seep into the openings, apertures, voids, or cavities. The thermosetting resin may encapsulate an entire area of the transaction card to which it is applied to a defined thickness.

The adhesion promoter may comprise a chemical bonding agent (primer) acting as an interface, or a two-coat adhesive formulation. The adhesion promoter may be deposited by spraying, dipping, rod coating or screen printing. The thermosetting resin, when cured, may contribute to the smartcard exhibiting a metallic sound when tossed on a hard surface.

After the thermosetting resin is fully cured, at least one of the following steps may be performed: back-lapping the cured thermosetting resin to reduce its thickness: laser etching or mechanically engraving the cured thermosetting resin; and printing on the cured thermosetting resin. The cured thermosetting resin may be receptive to ink.

The thermosetting resin may be filled with glass fiber for increased strength. The thermosetting resin may be colored with a pigment.

Prior to applying the primer layer, a surface treatment may be performed on the rear surface of the front metal layer to produce a scuffed-up surface. The surface treatment may comprise chemically etching or sand blasting the rear surface of the front metal layer.

In filling and sealing any openings, apertures, voids or cavities in any metal layer or any subsequent layer in the card construction, the front face and rear face surfaces of the metal card body are devoid of any indents or dimples. Synthetic printed layers assembled to a metal layer may not reveal any deformations at the position of the openings, apertures, voids or cavities post lamination.

U.S. Ser. No. 17/882,569, entitled "Coating and Filling Openings in a Metal Inlay And Method for Making a Metal Transaction Card", incorporated by reference herein, discloses a method of covering an opening, an aperture, a void or a slit at each site in an array of card body positions in a layer of metal forming a metal inlay (typically in a 16- or 25-up format), using a sacrificial layer to create a pocket, cavity, recess or channel. The pockets, cavities, recesses or channels created by the presence of the sacrificial layer on one side (front side) of the layer of metal may be further sealed using a non-conductive polymeric material such as a thermosetting resin (e.g., epoxy or polyurethane). The thermosetting resin may be transparent or pigmented. The side (front side) of the layer of metal disposed with the sacrificial layer is further protected from surface scratches which may occur from general handling, conveying and production processing.

A thermosetting adhesive film layer on a release liner may be applied to the same side of the layer of metal in which the thermosetting resin is applied (rear side). The thermosetting adhesive film layer on a release liner may have cut-outs matching approximately the dimensional and geometrical positions of the pocket, cavity, recess or channel (in the x and y axis) at each card body site. The thermosetting adhesive film layer in B-stage may be bonded to the layer of metal (rear side) by application of heat and pressure over time to convert to C-stage.

The thermosetting resin (e.g., epoxy or polyurethane) may be roll coated to the cured thermosetting adhesive film layer to a defined thickness, encapsulating or encasing the entire side of the layer of metal with the thermosetting resin (rear side), and simultaneously filling and sealing the pockets, cavities, recesses or channels. The encapsulation layer may be further compressed with a pressure plate to remove gases. The cured thermosetting resin may facilitate the retention of the drop acoustics of the layer of metal in a final laminated metal card body.

The fully cured thermosetting resin in a hardened state may be machined (back-lapped) to reduce the overall thickness on the side of the layer of metal (rear side) encapsulated by the resin.

The sacrificial layer may comprise a protective release film with low tack adhesive such as polyethylene film tape or plasticized PVC film. The sacrificial layer may be polytetrafluoroethylene (PTFE, Teflon®).

After removal of the sacrificial layer from the layer of metal (front side), an unscratched metal surface is revealed with openings (module openings) sealed with fully cured thermosetting resin.

The fully cured thermosetting resin in each (module) opening at each card body site in the array may be CNC milled to create a stepped recess for later embedding of a chip module.

The front side of the layer of metal may be roll coated with a transparent thermosetting resin by first applying an adhesion promoter in the form of a primer (chemical bonding agent) and or a thermosetting adhesive coating, shrouding the entire front side with resin.

U.S. Ser. No. 17/882,569 further discloses a metal inlay comprising a layer of metal defining a plurality of card body sites (typically an array of 16 or 25 card body positions) on the layer of metal, each card body site corresponding to a single metal card body, performing a laser or water cutting operation to form corner struts extending from corners of the card body sites to the metal inlay, with void sections extending around sides of the card body sites except for where the card body site is supported by the corner struts of the metal inlay and filling the void sections with thermosetting resin. In addition, forming a module opening at each card body site and filling the openings with the thermosetting resin. In a further production step, synthetic layers (e.g., sheets of adhesive film, PVC with printed artwork and protective overlay material) are laminated to the encapsulated metal inlay, followed by singulation of the card body sites by removing the struts through cutting or punching.

U.S. Ser. No. 17/903,886 entitled "Encapsulating a Metal Inlay with Thermosetting Resin and Method for Making a Metal Transaction Card", discloses over-molding or casting thermosetting resin may be used to replace thermosetting adhesive film layers, plastic slugs and to fill module openings, cut-outs, gaps and voids in a metal transaction card. The use of thermosetting resin may also enhance or preserve (safeguard) the drop acoustics of the metal card. The method of coating thermosetting resin to a layer of metal may be substituted by the manufacturing techniques of casting, over-molding or reaction injection molding. As disclosed therein:

Generally, metal layers of a smartcard have module openings ($P_1$ and $P_2$) for receiving a transponder chip module (TCM). Thermosetting resin coats (encapsulates) the top or bottom surface of the metal layers and fills the module openings. An inter-coat may be disposed between the thermosetting resin and the top or bottom surface of the metal layers. A metal layer may be a discontinuous metal layer (DML) having a slit which may also be filled by the thermosetting resin.

As used herein, the term "encapsulating" (and variations thereof) refers to coating (e.g., a metal layer or metal inlay) on at least one side or surface thereof and may include filling openings and slits in the metal layer.

A booster antenna circuit may be disposed between a continuous metal layer and a discontinuous metal layer; and a magnetic shielding layer may be disposed between the continuous metal layer and the booster antenna circuit. Adhesive may be disposed on both sides of the booster antenna circuit. Thermosetting resin may separate the booster antenna circuit at a given distance from the magnetic shielding layer to achieve optimum shielding and RF functionality. The distance may be at least 50 μm.

An adhesive layer may be disposed between a first resin coated (encapsulated) metal layer and a second resin coated (encapsulated) metal layer.

A method of making a smartcard may comprise: providing a metal layer having a top surface, a bottom surface, and a module opening extending between the top and bottom surfaces for receiving a transponder chip module: attaching a sacrificial layer to the top surface of the metal layer; and encapsulating (such as coating) the metal layer with a thermosetting resin disposed on the bottom surface of the first metal layer and filling the module opening of the first metal layer up to the sacrificial layer. The process of encapsulating may be selected from the group consisting of coating, open cast molding, vacuum or pressure casting, over-molding, compression molding, reaction injection molding (RIM) and reaction assisted molding process.

A surface treatment may be performed on the metal layer prior to coating (encapsulating) it. The surface treatment may be selected from the group consisting of mechanical surface preparation, chemical preparation, sanding, cleaning, ultrasonic cleaning, and dichromate treatment. The sacrificial layer may comprise polytetrafluoroethylene (PTFE, Teflon®) or polyolefin backing film. The sacrificial layer may be removed after the thermosetting resin is sufficiently cured to remain in the module opening. Before coating (encapsulating) the metal layer, an inter-coat may be applied to the bottom surface of the metal layer to promote adhesion of the thermosetting resin and the metal layer. The thermosetting resin may be transparent or pigmented. Printed stock may be laminated with elevated pressure and temperature to one or both of the top and bottom surfaces of the coated (encapsulated) metal layers.

Some Additional References

The following patents and/or publications ("references") may be of interest or relevant to the invention(s) disclosed herein, and some commentary may be provided to distinguish the invention(s) disclosed herein from some of the following references.

U.S. Pat. No. 11,068,770 Connection bridges for dual interface transponder chip modules
U.S. Pat. No. 10,599,972 Smartcard constructions and methods
U.S. Pat. No. 10,552,722 Smartcard with coupling frame antenna
U.S. Pat. No. 10,518,518 Smart cards with metal layer(s) and methods of manufacture
U.S. Pat. No. 10,248,902 Coupling frames for RFID devices
U.S. Pat. No. 10,193,211 Smartcards, RFID devices, wearables and methods
U.S. Pat. No. 9,960,476 Smart card constructions
U.S. Pat. No. 9,836,684 Smart cards, payment objects and methods
U.S. Pat. No. 9,812,782 Coupling frames for RFID devices
U.S. Pat. No. 9,798,968 Smartcard with coupling frame and method of increasing activation distance of a transponder chip module
U.S. Pat. No. 9,697,459 Passive smartcards, metal cards, payment objects and smart jewelry
U.S. Pat. No. 9,634,391 RFID transponder chip modules
U.S. Pat. No. 9,622,359 RFID transponder chip modules U.S. Pat. No. 9,489,613 RFID transponder chip modules with a band of the antenna extending inward
U.S. Pat. No. 9,475,086 Smartcard with coupling frame and method of increasing activation distance of a transponder chip module
U.S. Pat. No. 9,390,364 Transponder chip module with coupling frame on a common substrate for secure and non-secure smartcards and tags
2018/0339503 Smartcards with metal layer(s) and methods of manufacture
2018/0341846 Contactless metal card constructions
2019/0114526 Smartcard constructions and methods
2019/0171923 Metallized smartcard constructions and methods
2019/0197386 Contactless smartcards with multiple coupling frames
2019/0392283 RFID transponder chip modules, elements thereof, and methods
2020/0005114 Dual interface metal hybrid smartcard
2020/0034578 Smartcard with display and energy harvesting
2020/0050914 Connection bridges for dual interface transponder chip modules
2020/0151534 Smartcards with metal layers and methods of manufacture
2020/0226443 Smartcard with a booster antenna and a wireless connection between modules
2020/0250504 Manufacturing metal inlays for dual interface metal cards
2020/0250506 Smartcard constructions and methods
2020/0257953 Contactless smartcards with coupling frames
2020/0327387 Smartcard with a coupling frame and a wireless connection between modules
2020/0387768 Contactless metal card constructions
2021/0056374 Transponder chip module with module antenna(s) and coupling frame(s)
2021/0056375 Smart cards with metal layer(s) and methods of manufacture
2021/0182650 Smartcards with Multiple Coupling Frames
2021/0192311 Coupling frames for smartcards with various module opening shapes
2021/0192312 Smart Cards with Metal Layer(s) and Methods of Manufacture
2021/0256341 Smart Cards with Metal Layer(s) and Methods of Manufacture
U.S. Pat. No. 11,250,305 (15 Feb. 2022: Finn)
U.S. Pat. No. 11,113,593 (7 Sep. 2021; Finn)
US 2021/0049431 (18 Feb. 2021: Finn)
US 2021/0049439 (18 Feb. 2021: Finn), issued as U.S. Pat. No. 11,113,593
US 2021/0073608 (11 Mar. 2021; Finn), issued as U.S. Pat. No. 11,347,993
US 2021/0081743 (18 Mar. 2021: Finn et al.)
US 2021/0081748 (18 Feb. 2021; Finn)
US 2021/0110231 (15 Apr. 2021: Finn)
US 2021/0117744 (22 Apr. 2021: Finn et al.)
US 2021/0150294 (20 May 2021: Finn) issued as U.S. Pat. No. 11,341,385 (24 May 2022; Finn)
US 2021/0174159 (10 Jun. 2021; Finn)
US 2021/0216838 (15 Jul. 2021: Finn), issued as U.S. Pat. No. 11,250,305
US 2021/0350198 (11 Nov. 2021: Finn), issued as U.S. Pat. No. 11,315,003

Some Additional References

U.S. Pat. No. 6,452,563 (17 Sep. 2002: Gemplus aka Gemalto; Porte)
U.S. Pat. No. 6,491,229 (10 Dec. 2002; NJC Innovations; Berney)
U.S. Pat. No. 7,306,163 (11 Dec. 2007; IBM: Scholz et al.)
U.S. Pat. No. 7,701,350 (20 Apr. 2010; Hitachi; Sakama, et al.)
U.S. Pat. No. 8,186,582 (29 May 2012: American Express: Varga et al.)
U.S. Pat. No. 8,393,547 (12 Mar. 2013; Perfect Plastic Printing: Kiekhaefer et al.)
U.S. Pat. No. 8,523,062 (3 Sep. 2013: American Express: Varga et al.)
U.S. Pat. No. 8,608,082 (17 Dec. 2013; Oberthur Technologies, aka IDEMIA: La Garrec et al.)
U.S. Pat. No. 8,725,589 (13 May 2014; JPMorgan Chase; Skelding et al.)
U.S. Pat. No. 8,737,915 (27 May 2014; J. H. Tonnjes E.A.S.T.: Beenken)
U.S. Pat. No. 9,024,763 (5 May 2015; Hamedani Soheil)
U.S. Pat. No. 9,299,020 (29 Mar. 2016; TheCard: Zimmerman et al.)
U.S. Pat. No. 9,390,366 (12 Jul. 2016; CompoSecure; Herslow et al.)
U.S. Pat. No. 9,564,678 (7 Feb. 2017; Murata Manufacturing: Kato et al.)
Reference is also made to U.S. Pat. Nos. 8,976,075, 9,203,157 and 9,231,305.
U.S. Pat. No. 9,721,200 (1 Aug. 2017; CompoSecure; Herslow et al.)
U.S. Pat. No. 9,760,816 (12 Sep. 2017; American Express: Williams et al.)
U.S. Pat. No. 9,836,687 (5 Dec. 2017; American Express; Williams et al.)
U.S. Pat. No. 9,881,247 (30 Jan. 2018: Le Garrec et al.)
U.S. Pat. No. 9,898,699 (20 Feb. 2018; CompoSecure; Herslow et al.)
U.S. Pat. No. 10,089,570 (2 Oct. 2018; CompoSecure; Herslow et al.)
U.S. Pat. No. 10,140,569 (27 Nov. 2018; Kim et al.)
U.S. Pat. No. 10,275,703 (30 Apr. 2019; CompoSecure: Herslow et al.)
U.S. Pat. No. 10,289,944 (14 May 2019; CompoSecure; Herslow et al.)
U.S. Pat. No. 10,318,859 (11 Jun. 2019; CompoSecure: Lowe, et al.)
U.S. Pat. No. 10,445,636 (15 Oct. 2019; Giesecke & Devrient; Virostek et al.)
U.S. Pat. No. 10,534,990 (14 Jan. 2020; CompoSecure; Herslow et al.)
U.S. Pat. No. 10,583,683 (10 Mar. 2020; Federal Card Services: Ridenour et al.)
U.S. Pat. No. 10,748,049 (18 Aug. 2020; CompoSecure; Herslow et al.)
U.S. Pat. No. 10,885,419 (5 Jan. 2021: CompoSecure; Lowe et al.)
U.S. Pat. No. 11,151,437 (19 Oct. 2021: CompoSecure: Lowe et al.)
U.S. Pat. No. 11,182,662 (23 Nov. 2021; CompoSecure: Lowe)
US 2011/0181486 (28 Jul. 2011; Murata; Kato), reference is also made to US 2011/0186641
US 2012/0112971 (10 May 2012; Panasonic: Takeyama et al.)
US 2013/0126622 (23 May 2013; AmaTech: Finn)
US 2014/0091149 (3 Apr. 2014; Finn et al.)
US 2014/0231503 (21 Aug. 2014; Smart Co.; Kunitaka)
US 2015/0206047 (23 Jul. 2015: CompoSecure; Herslow)
US 2015/0221624 (6 Aug. 2015; Sandisk: Ye et al.)

US 2019/0050706 (14 Feb. 2019; CompoSecure; Lowe) now U.S. Pat. No. 10,406,734
US 2019/0073578 (7 Mar. 2019; CompoSecure: Lowe et al.)
US 2019/0156994 (23 May 2019; X-Card Holdings; Cox)
US 2019/0160717 (30 May 2019; CompoSecure: Lowe)
US 2019/0236434 (1 Aug. 2019; CompoSecure: Lowe)
US 2019/0286961 (19 Sep. 2019; CompoSecure: Lowe)
US 2019/0291316 (26 Sep. 2019; CompoSecure: Lowe) (now U.S. Pat. No. 10,583,594).
US 2019/0311235 (10 Oct. 2019; Giesecke & Devrient: Sexl et al.)
US 2019/0311236 (10 Oct. 2019; Giesecke & Devrient: Sexl et al.)
US 2019/0384261 (19 Dec. 2019; Kona I; Nam et al.)
US 2019/0354825 (21 Nov. 2019; CompoSecure; Lowe)
US 2020/0151535 (14 May 2020; CompoSecure; Herslow et al.) now U.S. Pat. No. 10,748,049
US 2020/0164675 (28 May 2020; FCS: Ridenour et al.)
US 2020/0364531 (19 Nov. 2020; CompoSecure: Lowe et al.)
US 2020/0364532 (19 Nov. 2020; CompoSecure: Herslow et al.)
US 2021/0073606 (11 Mar. 2021; CompoSecure: Lowe et al.)
US 2021/0073607 (11 Mar. 2021: CompoSecure: Lowe et al.)
US 2021/0154898 (27 May 2021: CompoSecure: Lowe et al.)
US 2021/0158124 (27 May 2021: CompoSecure: Lowe et al.)
US 2021/0209437 (8 Jul. 2021: CompoSecure: Lowe et al.)
US 2021/0232887 (29 Jul. 2021: Ritter)
US 2022/0058457 (24 Feb. 2022: Thales: Meridiano et al.)
US 2022/0253661 (11 Aug. 2022; Daley et al.)
Chen, S. L., Kuo, S. K. and Lin C. T. (2009) incorporated by reference herein, discloses "A metallic RFID tag design for steel-bar and wire-rod management application in the steel industry" (Progress in Electromagnetics Research, PIER Vol. 91: pp. 195-212.)
EP 0 494 471 (1 Jan. 1992: Chubb Lips: Nieuwkoop)
JP 4016322 (5 Dec. 2007; FEC: Takeda)
EP 2372840 (25 Sep. 2013; Panasonic; Hashimoto) including US 2011/0227799
U.S. Pat. No. 8,665,069 (4 Mar. 2014; Petratec: Weitzhandler et al.)
CN 205158409U (13 Apr. 2016)
WO 2017/090891 (1 Jun. 2017; Biosmart: Yoon et al.)
KR 10-1754985 (30 Jun. 2017; Aichi CK Corporation aka ICK: Kim et al.)
PCT/US2019/020919 (12 Sep. 2019; X-Card Holding: Cox)
US 2004/0118930 (24 Jun. 2004: American Express: Berardi et al.)
US 2019/0114526 (18 Apr. 2019; Finn et al.)
US 2019/0171923 (6 Jun. 2019; Finn)
US 2016/0180212 (23 Jun. 2016; Herslow et al)
WO 2017/162311 (28 Sep. 2017; Zwipe AS)
WO 2017/177905 (19 Oct. 2017; Hightec Tech)
WO 2018/132404 (19 Jul. 2018; CompoSecure, LLC)
U.S. Pat. No. 3,214,324 (26 Oct. 1965: General Mills: Peerman)
U.S. Pat. No. 6,329,958 (11 Dec. 2001: TDK: McLean et al.)
U.S. Pat. No. 6,817,085 (16 Nov. 2004; TDK: Uchikoba et al.)
U.S. Pat. No. 7,948,057 (24 May 2011; TDK: Furukawa et al.)
U.S. Pat. No. 8,158,018 (17 Apr. 2012; TDK, Nakahata et al.)
U.S. Pat. No. 9,673,506 (6 Jun. 2017: TDK: Asou et al.)
US 2017/0271746 (21 Sep. 2017: TDK: Komachi et al.)

Some Additional References

The following references may also be applicable to the invention(s) disclosed herein:
U.S. Pat. Nos. 6,581,839, 6,749,123, 6,764,014, 7,306,158, 7,377,443, 7,607,583, 7,837,116, 8,066,190, 8,186,598, 7,494,057, 7,530,491, 7,819,310, 7,823,777, 7,971,786, 8,033,457, 8,079,514, 8,186,582, 8,523,062, 9,760,816, 9,836,687
U.S. D879,196, U.S. D942,538 and U.S. Pat. No. 943,024
WO 2007/049273 (3 May 2007: Vilnai et al.)
WO 2007/049274 (3 May 2007; Weitzhandler et al.)
U.S. Pat. No. 7,237,724 (3 Jul. 2007; Singleton)
U.S. Pat. No. 7,607,249 (27 Oct. 2009; Innovatier; Singleton)
U.S. Pat. No. 7,959,085 (14 Jun. 2011; Innovatier; Singleton)
U.S. Pat. No. 8,657,983 (25 Feb. 2014; Innovatier; Singleton)
U.S. Pat. No. 8,727,224 (20 May 2014; Innovatier: Singleton)
U.S. Pat. No. 9,258,898 (9 Feb. 2016; FiTeq: Singleton)
U.S. Pat. No. 6,687,131 (3 Feb. 2004: Sokymat: Miehling)
U.S. Pat. No. 7,012,530 (14 Mar. 2006; NagraID: Droz)
U.S. Pat. No. 7,205,899 (17 Apr. 2007; Schreiner Group: Surkau)
U.S. Pat. No. 5,498,388 (12 Mar. 1996; Mitsubishi; Kodai et al.)
U.S. Pat. No. 6,025,054 (15 Feb. 2000; CardXX: Tiffany)
U.S. Pat. No. 6,241,153 (5 Jun. 2001; CardXX: Tiffany)
U.S. Pat. No. 6,256,873 (10 Jul. 2001; CardXX: Tiffany)
U.S. Pat. No. 7,220,615 (22 May 2007: Micron Technology: Bolken)
U.S. Pat. No. 7,225,537 (5 Jun. 2007; CardXX: Reed)
U.S. Pat. No. 8,012,809 (6 Sep. 2011: CardXX: Reed)
U.S. Pat. No. 8,324,021 (4 Dec. 2012; CardXX: Reed)
U.S. Pat. No. 9,916,992 (13 Mar. 2018; Dynamics: Mullen et al.)
U.S. Pat. No. 11,392,860 (19 Jul. 19 2022; Dynamics; Mullen et al.)
US 2016/0108291 (21 Apr. 2016; Novacel: Jean-Loup Masson et al.)
US 2010/0255300 (7 Oct. 2010; Novacel; Catherine Coutey et al.)

Some Definitions

Some of the following terms may be used or referred to, herein.

Booster Antenna Circuit

A booster antenna circuit in a metal transaction card may comprise a perimeter coil component with a given number of windings extending around the periphery edge of the card body, a coupler coil component with a given number of windings, a capacitor bank component connected in parallel with the coupler coil for frequency trimming, and a secondary coil component(s) contributing to energy harvesting. The components of the booster antenna circuit (e.g., tracks, windings or turns, parallel plates, vertical interconnects) may reside on both sides of a carrier layer. The carrier layer may comprise polyethylene terephthalate (PET).

In a conventional booster antenna circuit (chemically etched circuitry, plated copper circuitry, conductive printed circuitry or equivalent), the perimeter coil on the periphery of the card body inductively couples with the contactless reader while the coupler coil inductively couples with the module antenna of a transponder chip module driving the RFID payment chip.

The secondary coil(s) has or have a range of functions including tuning, additional power generation, picking up surface currents at the edges and inner locations of the card body, coupling to other components such as to a biometric sensor, and customized to drive sound, piezo haptic actuator, light and display devices.

The coupler coil may be an open or closed loop circuit being assembled on the PET carrier layer having vertical interconnects to the upper and lower plate electrodes of the capacitor bank.

In some card constructions, the perimeter coil may be eliminated, with the coupler coil coupled inductively to an in-card discontinuous metal layer having a slit, opening, a metal ledge and metal edges, functioning as a one turn RLC circuit.

The booster antenna circuit is assembled to a continuous metal layer using a magnetic shielding layer to offset the effects of field attenuation caused by the continuous metal layer.

Magnetic Shielding

Magnetic shields have historically been ferrite-based materials, but non-ferrite materials having properties that impact RF performance are used in metal card applications. Magnetic shields can be powdered iron, ferrite, permalloy, polymer-based or a whole host of other materials (e.g. nanocrystalline).

Thermosetting Resin

The International Union of Pure and Applied Chemistry (IUPAC) defines a thermosetting resin as a petrochemical in an indulgent solid or viscous state that changes irreversibly into an infusible, insoluble polymer network by curing.

Thermosetting resins undergo chemical reactions (curing process) that crosslink the polymer chains and thus connect the entire matrix together in a three-dimensional network. Once cured, they cannot be remelted or reformed. Thermosetting resins tend to have high dimensional stability, high-temperature resistance, and good resistance to solvents because of their three-dimensional cross-linked structure.

Thermosetting resins describe a generic family of products that includes unsaturated polyesters, vinyl esters, epoxy, and polyurethane resins. The materials used with them are generally described as hardeners, curing agents, peroxide initiators, isocyanates, fillers, and flexibleness.

Thermosetting resins are popular because uncured and at room temperature they are in a liquid state. Common thermosetting resins include polyester resin, vinyl ester resin, epoxy, phenolic and urethane. They are commonly used in polyester fiberglass systems, sheet molding compounds, polyurethanes and adhesives.

Reference: Handbook of Thermoset Plastics, 4th Edition, Oct. 21, 2021, Editor: Hanna Dodiuk Polyurethane A polyurethane (PU) is typically produced by reacting an isocyanate with a polyol. Since polyurethane contains two types of monomers, which polymerize one after the other, they are classed as alternating copolymers. It is a versatile polymeric material that can be tailored to meet the demands of a number of adhesive and sealant systems.

Polyurethane Resins

Any resin resulting from the reaction of diisocyanates (such as toluene diisocyanate) with a phenol, amine, or hydroxylic or carboxylic compound to produce a polymer with free isocyanate groups: used as protective coatings, potting or casting resins, adhesives, rubbers, and foams, and in paints, varnishes, and adhesives.

They are synthetic resins that have two-component systems which consist of a polyol component (resin) and an isocyanate component (hardener) that must be mixed in a defined ratio prior to application. Synthetic resins are thinner than epoxy resins, making them very easy to mix: they also work very well in molds.

Polyurethane Adhesives

Adhesives based on polyurethane (PU) resins show good strength at low and high temperatures and are resistant to chemicals, water and humidity. The polyurethane polymer forms rigid and soft domains that give the polymer its balance of flexibility and high strength. Reference: Handbook of Adhesives and Sealants, Volume 2, 2006, Pages 355-480, xl-xlii Epoxy Epoxy is the family of basic components or cured end products of epoxy resins. Epoxy resins, also known as polyepoxides, are a class of reactive prepolymers and polymers which contain epoxide groups. The epoxide functional group is also collectively called epoxy. The IUPAC name for an epoxide group is an oxirane. It is a type of petroleum-based adhesive. Epoxy contains the important element, epocholohydrin, which forms a hard layer that is highly resistant to excessive cold, heat, and moisture.

Epoxy Resins

Epoxy resins may be reacted (cross-linked) either with themselves through catalytic homopolymerisation, or with a wide range of co-reactants including polyfunctional amines, acids (and acid anhydrides), phenols, alcohols and thiols (usually called mercaptans). These co-reactants are often referred to as hardeners or curatives, and the cross-linking reaction is commonly referred to as curing.

They are often referred to as laminating resins and are well suited for coating surfaces. They may be mixed with colorants and filling materials to get the desired results.

Epoxy Adhesives

They are considered the strongest of all types of adhesives. They are used to build vehicles, planes, as well as sports equipment. They are water-resistant and are solvent-free.

B-Staged Epoxy

This is a descriptive term used to define a one component epoxy system, using a latent (low reactivity) curing agent. This unique product can be partially cured (sometimes referred to as "pre-dried"), as an initial stage after being applied onto one substrate/surface. It can, at a later time, be completely cured under heat and pressure.

Partially cured epoxy, or B-staged epoxy adhesive, does have processing advantages. The adhesive can have its initial application and partial cure in one location, and its final cure in another location weeks later.

C-Staged Epoxy

The B stage is a solid, thermoplastic stage. When given additional heat, the B-stage epoxy will flow and continue to cure to a crosslinked condition or C stage.

Urethane Casting

Urethane casting uses silicone molds to produce plastic and rubber components using two-component polyurethane resins under a vacuum. Also known as vacuum casting or polyurethane casting, it is a versatile manufacturing technology capable of producing complicated engineering parts in polyurethane resins and cast nylon by simulating injection molding. Because the process takes place inside a vacuum chamber, it creates high-quality bubble-free casting with a smooth surface texture and no defects. Urethane resins are also available to make entirely opaque, translucent, or transparent cast parts.

Urethane Casting vs Injection Molding

Urethane casting and injection molding are similar processes that can create identical plastic parts using similar materials. However, in contrast to urethane casting, which relies on gravity to fill the molds, injection molding employs a pressured nozzle to push the molten plastic into the mold cavity.

Reaction Injection Molding (RIM)

Reaction injection molding (RIM) is similar to injection molding except thermosetting polymers are used, which requires a curing reaction to occur within the mold.

In this process, highly reactive plastic liquids are mixed under high pressure and then injected into a mold to react, polymerize and produce principally polyurethane thermoset plastic or thermoplastic parts.

Instead of using already polymerized materials as matrices, highly reactive monomeric or oligomeric ingredients are placed in two tanks which are then quickly mixed by impingement and injected into the mold cavity. As soon as the two materials are mixed, chemical reaction begins to form a polymeric matrix which completes typically within 5-30 s. The major portion of the reaction injection molding machine is a high-pressure pump and a metering system.

RIM can be used for the production of polyurethane, ureaformaldehyde, nylon, styrene class resin, and epoxy resin for use in automobile parts.

Reaction Assisted Molding Process (RAMP)

It is an offshoot of existing Reaction Injection Molding (RIM) molding technology, being used to encapsulate electronics into smart cards without requiring the traditional layering manufacturing process.

RAMP is based on low pressure and low temperature dispensing of polyurethanes (unlike RIM which is based on high pressure and temperature).

The RAMP technique precisely positions computer chips and electronic components within a mold between two sheets of PVC or polycarbonate film, after which a polyurethane mixture is injected at low temperature and low pressure to completely immerse the electronic element. The electronic element is securely encapsulated and protected when curing is completed in less than an hour.

Reference is made to: https://www.plasticsnet.com/doc/first-reaction-injection-molding-now-reaction-0001

Mold Casting

It is a manufacturing process in which a liquid material is poured into a mold, which contains a hollow cavity of the desired shape, and then allowed to solidify. The solidified part (i.e. casting) is ejected or broken out of the mold to complete the process. The casting material is a time setting liquid that cures after mixing two or more components together: examples are thermosetting epoxies and polyurethanes.

Thermosetting epoxies are rigid polymeric materials that are resistant to higher temperatures than ordinary thermoplastics. These materials are normally made up of lines of polymers, which are highly cross-linked that irreversibly cure. Polyurethanes are synthetic resins or plastics that result from a polyaddition reaction between dialcohols or polyols and polyisocyanates. Essentially, polyurethanes have a higher cross-link density than epoxies, making them more durable.

In general, the casting resin consists of a two-component system of resin and hardener, which hardens after mixing through a chemical reaction. PU casting resins can, just like epoxy resin and polyester resin, be combined with various additives as well as filling materials or colorants. This gives them the desired properties. For example, an inhibitor can be added to the resin to increase the so-called pot life, i.e., the processing time.

There are also color pigments and fluorescent dyes that can give the polyurethane resin a specific color. Examples of fillers are, among others, cotton flocks, glass fibers, mineral fillers, and lightweight fillers. Also, fillers can be added to the resins to influence properties such as mechanical strength, stiffness, surface hardness, and in the case of metal transaction cards the fillers influence the drop acoustics. Reference: https://en.wikipedia.org/wiki/Casting and https://resin-expert.com/en/guide/polyurethane-resin Casting Polyester Resin In its liquid form, casting polyester resin has a consistency of corn syrup and a slight color ranging from straw to light aqua. During the hardening process the slight color bleaches out and the resin becomes crystal clear.

Added to liquid casting resin, catalyst (hardener) produces a chemical reaction, which generates heat, causing the resin to harden.

Coating of Metal

A coating, such as polyurethane resin, is a covering that is applied to the surface of a substrate such as a metal layer, a metal inlay, a metal frame or a metal chassis. The purpose of applying the coating may be to fill openings, voids or recesses in the substrate, to encapsulate the substrate, and or to encase any components or devices assembled thereto.

Functional coatings may be applied to change the surface properties of the substrate, such as the acoustic properties of the substrate, mechanical robustness of the substrate, electrical isolation of the substrate, radio frequency response of components and devices assembled to the substrate, protection of the surface of the substrate from environmental conditions, and to fill and cover openings, apertures, voids and recesses in the substrate, with the coating forming an essential part of the finished product.

A major consideration for most coating processes is that the coating is to be applied at a controlled thickness. After applying the coating, a compression step (under vacuum) may be implemented to extract any air pockets or release of gases. After contraction and curing of the coating over a long duration, the solidified coating may be mechanically planed to a certain thickness.

An adhesion promoter such as a primer (chemical bonding agent) or a single layer of thermosetting adhesive film may be applied to the substrate, before coating the substrate. An adhesion promoter encourages the subsequent coating to adhere well.

Adhesion Promoter

A primer in the form of a chemical bonding agent is a low viscous liquid (e.g. 30 mPa·s) for the pre-treatment of metal surfaces to promote the adhesion of polyurethane thereto. Adhesion can be further improved with surface treatment such as sanding, ultrasonic cleaning, blasting and chemical activation or combinations of these before applying the primer. The primer is applied in a single coat to the metal surface by spraying, dipping, coating or screen printing. Ideally, the film thickness of the primer is very thin (5 μm to 15 μm).

A typical primer is comprised of film-forming polymers, cross-linkable resins, fillers, and a solvent or water-based carrier system.

Two-coat adhesive formulations for coating polyurethane to metal may comprise a primer layer and an adhesive topcoat. The primer provides a means of obtaining robust adhesion to the metal substrate such as stainless steel while providing the necessary reactivity with the adhesive topcoat for bonding to polyurethane.

Sacrificial Layer

To protect sheet metal from scratches during mechanical processing, a number of protective release films or peel-off films with low tack adhesive are available, such as polyethylene film tape with an acrylic low tack adhesive and plasticized PVC film with low tack adhesive. The sacrificial layer may be polytetrafluoroethylene (PTFE, Teflon®) or polyolefin backing film.

Release Agent

Also known as a mold release agent is a chemical used to prevent other materials such as adhesives or plastics from bonding to surfaces such as metal. Release agents provide the critical barrier between a molding surface and the substrate, facilitating separation of the cured part from the mold. Many kinds of release agents are used. They are waxes, fatty ester, silicones, and metallic soaps.

Silicone release agents are widely used as additives (having nonstick properties) in mold release applications where they enable quicker release of products made in molds.

Lapping Cured Polyurethane Resin

There are several methods to horizontally lap cured thermosetting polyurethane (PU) resin bonded to a metal layer such as stainless steel, to reduce the thickness of the PU, and to accomplish ultra-high precision geometries. Planing is a machining process that uses linear relative motion between a workpiece (e.g., PU coated metal inlay) and a single point cutting tool, to generate an accurate flat surface. Grinding (abrasive cutting) uses a grinding wheel as cutting tool. Lapping is a machining process in which two surfaces are rubbed together with an abrasive between them.

Roll Coating System

A roll coating system coats a polymeric material (single or 2-component formulation) such as a thermosetting epoxy or polyurethane resin for all-over coating of a substrate and parts with irregular shapes. A roll coating system typically has a resin reservoir, a coating drum, a doctor blade and a conveyor roller, with the width of the drum dictating the width of the coating being applied to the substrate. In order, to avoid resin spillage during application, the substrate may be larger than the start and stop positions of the coating. A sacrificial layer may be applied to one side of the substrate for protection, and should the substrate have any apertures, openings or windows. Reference is made to:

https://www.hardo.eu/adhesive-technology/?lang=en

Slot Die Coating

Slot coating is a high-precision coating method used to deposit a thin liquid film onto a moving substrate. It is a pre-metered coating method, where film thickness is directly controlled by the flow rate and web speed. Slot die coating may also be referred to as "slot nozzle coating".

The liquid flow in the application region, so called the coating bead, is strongly affected by operating parameters, liquid properties, and design parameters, such as web speed, surface tension, and geometry of the coating die.

Slot die coating technology is an alternative process to roll coating.

Metal Surface Treatment (Corona)

Treating metal surfaces is primarily a surface cleaning issue. Plasma treatment is a process designed to change the surface properties of a substrate to increase surface energy and/or make it chemically compatibility with a bonding material. Plasma treatment creates an electron bombardment that breaks the surfaces chemical bonds while the ions hitting the surface are designed to alter the chemical composition of the surface. Plasma systems may also be used to treat a variety of material types including polymers, glass and ceramics.

Passivation

Passivation is a non-electrical metal finishing process to help prevent metal surfaces from corrosion and pitting. The chemical treatment for stainless steel and other alloys makes the metal more resistant to rust and reduces chemical reactivity.

Metal Inlay Passivation

It involves immersing a stainless steel sheet in an acid bath (usually nitric or citric acid). The process removes free iron from stainless steel surfaces. When the stainless steel is exposed to oxygen containing environments, a thin chromium oxide film layer is formed. While most stainless steels naturally form this protective oxide layer, the passivation process thickens the layer and significantly speeds up the process. The oxide layer creates a passive surface that acts as protection from corrosive environmental stimuli.

SUMMARY

The invention may relate to innovations in or improvements (add-ons or variations) to RFID-enabled ("contactless capable") metal smartcards or metal transaction cards with/having a transponder chip module or an inductive coupling chip module, which may also be referred to as an electronic chip module or dual interface chip module.

The invention may further relate to innovations in or improvements to RFID-enabled metal smartcards or metal transaction cards having two metal layers (both modified to function as coupling frames), and to an appropriate thermosetting resin disposed between the two metal layers to retain the metal sound.

It is an object of the invention, to provide improved techniques for making (manufacturing) metal layers and inlays, or metal card bodies for smartcards.

Coating, over-molding or casting thermosetting resin may be used to replace thermosetting adhesive film layers, plastic slugs and to fill module openings, cut-outs, gaps and voids in a metal transaction card. The use of thermosetting resin may also enhance or preserve (safeguard) the drop acoustics of the metal card. The method of coating thermosetting resin to a layer of metal may be substituted by the manufacturing techniques of vacuum or pressure casting, over-molding or reaction injection molding.

According to the invention, generally, metal layers (650, 730, 750, 830, 850) of a smartcard (SC, 600, 700, 800) have module openings (614, 712, 714, 812, 814) for receiving a transponder chip module (TCM). Thermosetting resin (TR, 668B, 768A, 768B, 868A, 868B) coats (encapsulates) the bottom surfaces and fills the module openings of the metal layers. Inter-coat (638, 738, 748, 838, 858) may be disposed between the thermosetting resin and the bottom surfaces of the layers. A second layer of thermosetting resin (TR, 668A) may (coat (encapsulate) the top surface of the metal layer (650). A first metal layer (650, 750, 850) may be a discontinuous metal layer (DML), having a slit (S: 620, 720B, 820) which may also be filled by the thermosetting resin. A second metal layer (ML, 730, 830) having a second module opening (MO, 712, 812) may be disposed atop the first metal layer, and thermosetting resin (768A, 868A) may coat (encapsulate) the bottom surface of the metal layer and fill the module opening. The second metal layer (730) may be discontinuous, having a slit (S, 720A). The second metal layer (830) may be "continuous", without a slit. A booster antenna circuit (BAC, 844) may be disposed between the first and second metal layers, with magnetic shielding material (842) disposed between the booster antenna circuit and the second metal layer.

As used herein, the term "metal inlay" refers to a metal layer that has be processed, such as by forming a module opening or a slit therein, and also to a metal layer having a synthetic or adhesive layer on one or both sides thereof.

As used herein, the term "encapsulating" (and variations thereof) refers to coating (e.g., a metal layer or metal inlay) on at least one side or surface thereof, and may include filling openings and slits in the metal layer.

//h Abstract

According to the invention, generally, a method of making a smartcard may comprise: providing a metal layer (ML) having a module opening (MO) extending from a front surface of the metal layer to a rear surface thereof: providing a sacrificial layer (SL) on the front surface of the metal layer: filling (from behind) the module opening with thermosetting resin (TR): allowing the thermosetting resin to cure (harden): removing the sacrificial layer; and from the front surface of the metal layer, milling a cavity in the cured (hardened) thermosetting resin for receiving a transponder chip module (TCM). A chip module may be implanted in the milled-out cavity, wherein the thermosetting resin provides mechanical support to the chip module and electrical insulation of the chip module from the metal layer. The smartcard may be "dual-interface".

According to some embodiments (examples) of the invention, a method of making a smartcard may comprise: providing a metal layer (ML) having a module opening (MO) extending from a front surface of the metal layer to a rear surface thereof: providing a sacrificial layer (SL) on the front surface of the metal layer, wherein the sacrificial layer covers at least the module opening; and from the rear surface of the metal layer, filling the module opening with thermosetting resin (TR). The method may further comprise: allowing the thermosetting resin to cure (harden): removing the sacrificial layer; and from the front surface of the metal layer, milling a cavity in the cured (hardened) thermosetting resin for receiving a transponder chip module (TCM).

The method may further comprise: disposing a graphic print layer on the front surface of the metal layer, applying a transparent coat of rigid ink (hard coat) for scratch protection over the graphic print layer, disposing a laser-reactive, protective gloss or matte coating over the transparent coat, and providing laser markings on the protective coating.

According to some embodiments (examples) of the invention, a smartcard may comprise: a metal layer having a module opening: thermosetting resin encapsulating the metal layer on at least one side thereof and filling the module opening: a milled-out cavity in the thermosetting resin in the module opening; and a chip module implanted in the milled-out cavity: wherein the thermosetting resin provides mechanical support to the chip module and electrical insulation of the chip module from the metal layer.

The smartcard may further comprise: a graphic print layer disposed on the front surface of the metal layer, a transparent coat of rigid ink (hard coat) for scratch protection disposed over the graphic print layer, and a laser-reactive, protective gloss or matte coating disposed over the transparent coat.

In the various embodiments disclosed herein, the smartcard may be "dual-interface", capable of both contact and contactless functionality.

According to some embodiments (examples) of the invention, a smartcard (SC) may comprise: a front discontinuous metal layer (ML, FML, DML) having a slit(S): a rear discontinuous metal layer (ML, RML, DML); and a transponder chip module (TCM) having a module antenna (MA): wherein the module antenna does not overlap the slit in the front metal layer; and wherein the module antenna overlaps the slit in the rear metal layer.

The smartcard may further comprise: a graphic print layer on the front surface of the front discontinuous metal layer, a transparent coat of rigid ink (hard coat) for scratch protection disposed over the graphic print layer, and a laser-reactive, protective gloss or matte coating disposed over the transparent coat.

According to some embodiments (examples) of the invention, a dual-Interface metal face smartcard (SC) having a card body (CB) may comprise: a front continuous metal layer (ML, CML, FML): a magnetic shielding layer (MSL): a booster antenna circuit (BAC) enabling contactless functionality from a rear side of the card body; and a layer of thermosetting resin encapsulating the booster antenna circuit and magnetic shielding layer. The front continuous metal layer may have a module opening (MO) for receiving a transponder chi module (TCM). Thermosetting resin may fill the module opening and providing mechanical support for a transponder chip module (TCM) implanted in the thermosetting resin.

According to an embodiment of the invention, a smartcard (SC, 600, 700, 800) may comprise: a first metal layer (ML, 650, 750, 850) having a top surface, a bottom surface, and a module opening (MO, 614, 714, 814) extending between the top and bottom surfaces for receiving a transponder chip module (TCM); and a first layer of thermosetting resin (TR, 668B, 768B, 868B) coating (encapsulating) the bottom surface of the first metal layer and filling the module opening of the first metal layer. A first layer of inter-coat (638, 748, 858) may be disposed between the first layer of thermosetting resin and at least the bottom surface of the first metal layer. A second layer of thermosetting resin (TR, 668A) may coat (encapsulate) the top surface of the first metal layer. The first metal layer (650, 750, 850) may be a discontinuous metal layer (DML), having a slit (S: 620, 720B, 820). The first layer of thermosetting resin may also fill the slit in the first metal layer.

The smartcard (SC) may further comprise: a second metal layer (ML, 730, 830) having a top surface, a bottom surface, and a module opening (MO, 712, 812) extending between the top and bottom surfaces for receiving the transponder chip module (TCM); and a second layer of thermosetting resin (TR, 768A, 868A) disposed on the bottom surface of the second metal layer and into the module opening of the second metal layer. A second layer of inter-coat (738, 838) may be disposed between the second layer of thermosetting resin and the bottom surface of the second metal layer. The second metal layer may be a discontinuous metal layer (DML, 730), having a slit(S); and the second layer of thermosetting resin on the bottom surface of the second metal layer may also fill the slit in the second metal layer.

Alternatively, the second metal layer may be a continuous metal layer (CML, 830), not having a slit(S). A booster antenna circuit (BAC, 844) may be disposed between the second continuous metal layer and the first discontinuous metal layer; and magnetic shielding material (842) may be disposed between the second continuous metal layer and the booster antenna circuit. Adhesive (843, 848) may be disposed on both sides of the booster antenna circuit.

The second layer of thermosetting resin (868A) separates the booster antenna circuit a given distance from the magnetic shielding layer to achieve optimum shielding and RF functionality. The distance may be at least 50 μm.

An adhesive layer (743A) may be disposed between the first resin coated (encapsulated) metal layer (750) and the second resin coated (encapsulated) metal layer (730).

The transponder chip module may be a dual-interface module having an upper larger ("P1") portion and a lower smaller ("P2") portion. The module opening in the first metal layer (650) may be "stepped", having a larger ("P1") portion aligned atop a smaller "P2" portion. The module opening may be larger than the module, with a separation channel of approximately 0.25 mm between edges of the module opening in the metal layer and corresponding portions of the module implanted therein.

The second metal layer (730, 830) may be disposed below the first metal layer (750, 850); and the module opening in the second metal layer may be smaller ("P2") than the module opening ("P1") in the first metal layer. The module opening in the first metal layer may be 0.4-0.5 mm larger than an upper portion of the chip module; and the module opening in the second metal layer may be 0.4-0.5 mm larger than a lower portion of the chip module. There may be a separation channel of approximately 0.25 mm between metal edges of the metal layer in the module opening a corresponding portion of the module implanted therein.

According to an embodiment of the invention, a method of making a smartcard (SC) may comprise: providing a metal layer (ML, 650, 750, 850) having a top surface, a bottom surface, and a module opening (MO, 614, 714, 814) extending between the top and bottom surfaces for receiving a transponder chip module (TCM): attaching a sacrificial layer (SL, 609) to the top surface of the metal layer; and encapsulating (such as coating) the metal layer with a thermosetting resin (TR, 668B, 768B, 868B) disposed on the bottom surface of the first metal layer and filling the module opening of the first metal layer up to the sacrificial layer. The process of encapsulating may be selected from the group consisting of coating, open cast molding, vacuum or pressure casting, over-molding, compression molding, reaction injection molding (RIM) and reaction assisted molding process. A surface treatment may be performed on the metal layer prior to coating (encapsulating) it. The surface treatment may be selected from the group consisting of mechanical surface preparation, chemical preparation, sanding, cleaning, ultrasonic cleaning, and dichromate treatment. The sacrificial layer may comprise polytetrafluoroethylene (PTFE, Teflon®) or polyolefin backing film. The sacrificial layer may be removed after the thermosetting resin is sufficiently cured to remain in the module opening. Before coating (encapsulating) the metal layer, an inter-coat (638) may be applied to the bottom surface of the metal layer to promote adhesion of the thermosetting resin and the metal layer. The thermosetting resin may be transparent or pigmented. Printed stock may be laminated with elevated pressure and temperature to one or both of the top and bottom surfaces of the coated (encapsulated) metal layers.

The transponder chip module may be implanted in the module opening(s) of the smartcard.

In their various embodiments, the invention(s) described herein may relate to industrial and commercial industries, such RFID applications, payment smartcards (metal, plastic or a combination thereof), electronic credentials, identity cards, loyalty cards, access control cards, and the like.

Other objects, features and advantages of the invention(s) disclosed herein may become apparent in light of the following illustrations and descriptions thereof.

BRIEF DESCRIPTION OF THE DRAWINGS

Reference will be made in detail to embodiments of the disclosure, non-limiting examples of which may be illustrated in the accompanying drawing figures (FIGS.). The figures may generally be in the form of diagrams. Some elements in the figures may be stylized, simplified or exaggerated, others may be omitted, for illustrative clarity.

Although the invention is generally described in the context of various exemplary embodiments, it should be understood that it is not intended to limit the invention to these particular embodiments, and individual features of various embodiments may be combined with one another. Any text (legends, notes, reference numerals and the like) appearing on the drawings are incorporated by reference herein.

Some elements may be referred to with letters ("AS", "CBR", "CF", "CLS", "FC", "MA", "MT", "TCM", etc.) rather than or in addition to numerals. Some similar (including substantially identical) elements in various embodiments may be similarly numbered, with a given numeral such as "310", followed by different letters such as "A", "B", "C", etc. (resulting in "310A", "310B", "310C"), and may collectively (all of them at once) referred to simply by the numeral ("310").

Figure 1:
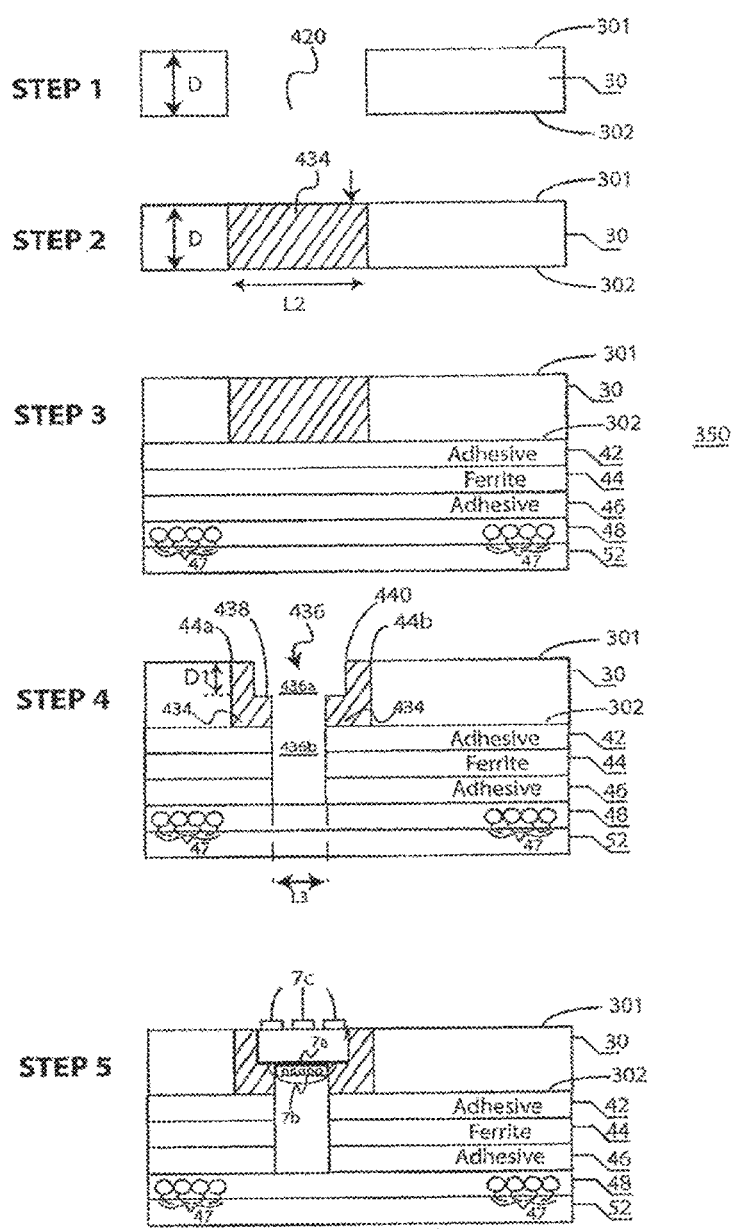
Figure 2:
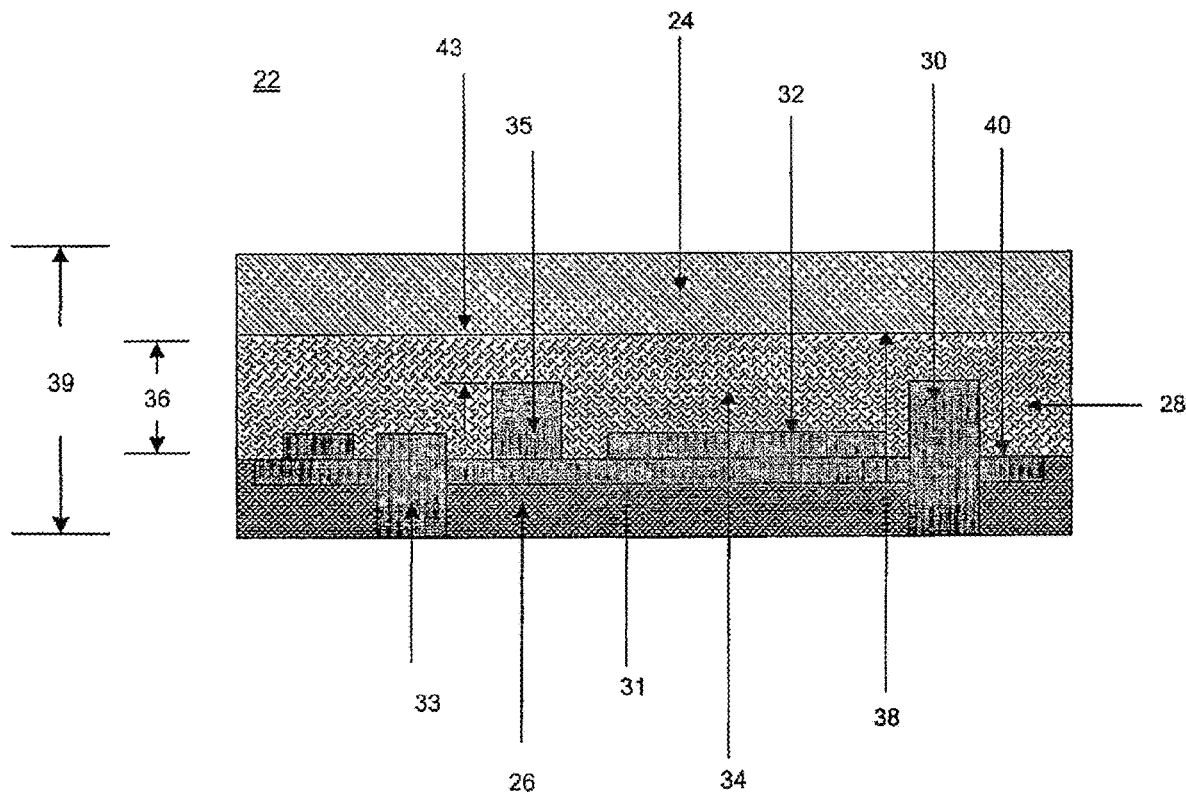
Figure 3:
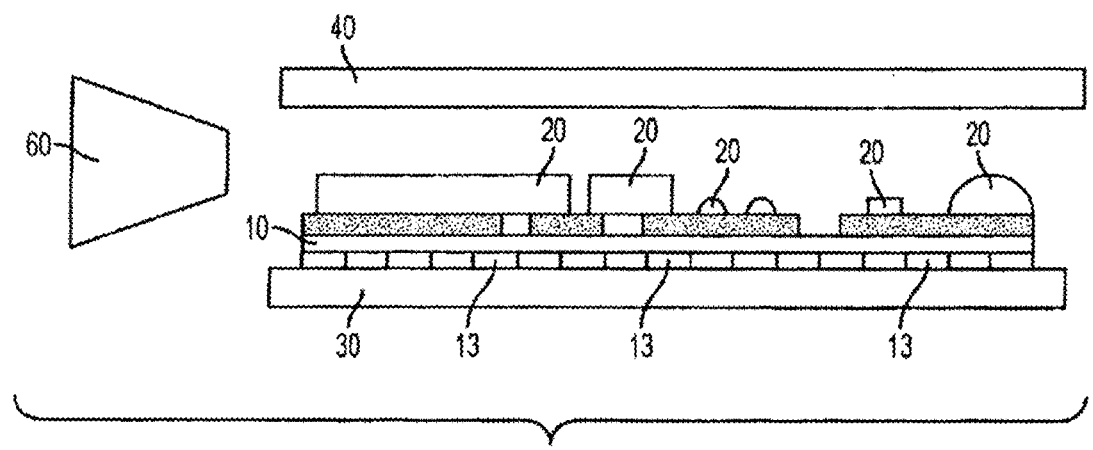
Figure 4:
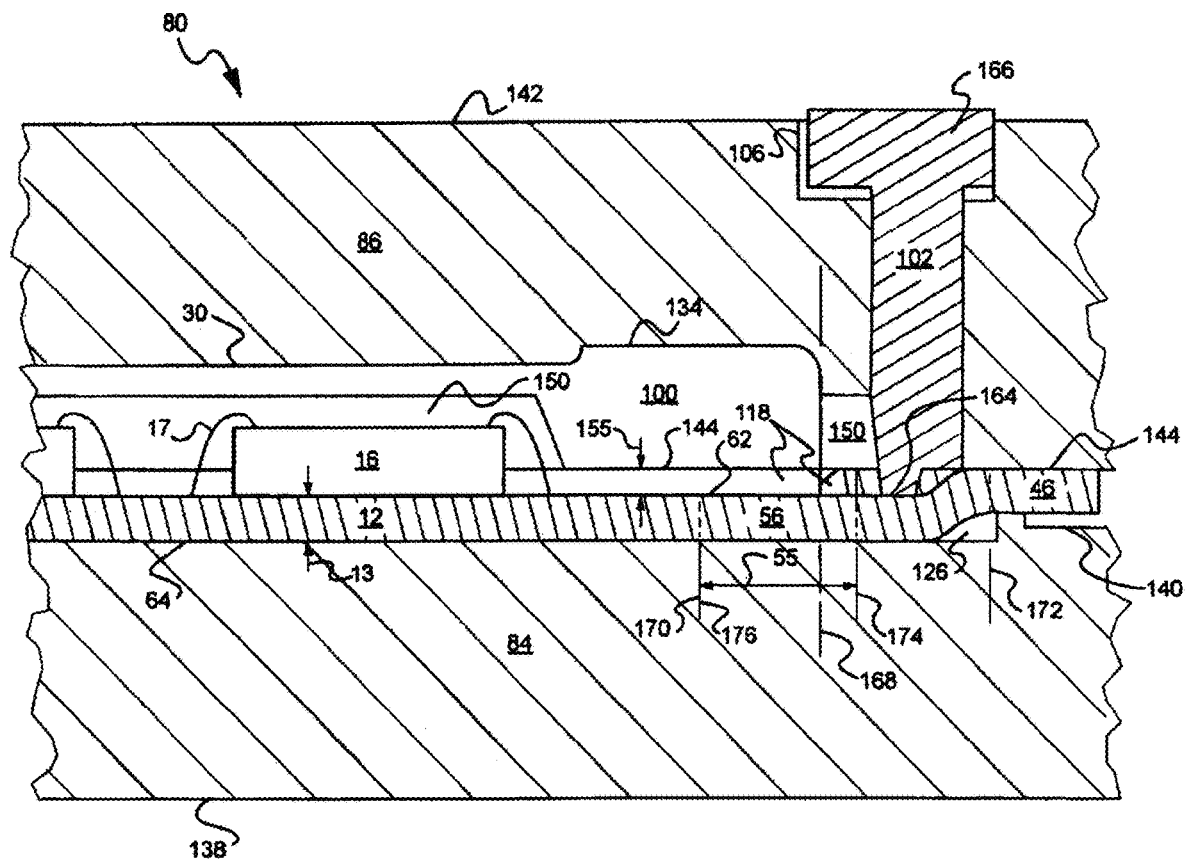
Figure 5:
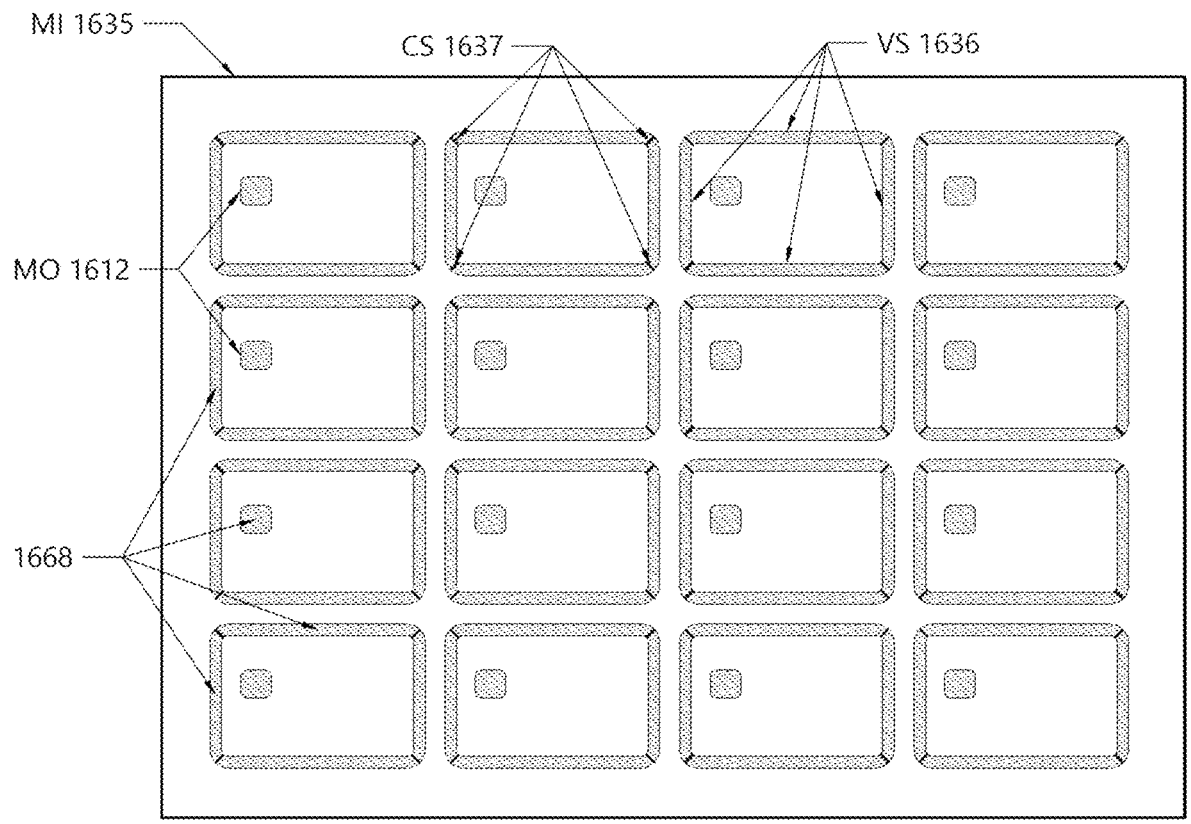

FIG. 1 (FIG. 4 of U.S. Pat. No. 10,534,990) is a number of cross-sectional diagrams of various processing steps (1 through 5) to form a smartcard (or card), according to the prior art:

FIG. 2 (FIG. 1 of U.S. Pat. No. 8,012,809) is a cut-away side view of an Advanced Smart Card made according to the teachings of the patent disclosure, according to the prior art:

FIG. 3 (FIG. 3 of U.S. Pat. No. 9,258,898) is a sectional view of an embedded electronic device and an injection nozzle, according to the prior art:

FIG. 4 (FIG. 18 of U.S. Pat. No. 7,220,615) is an enlarged partial cross-sectional end view of a molding apparatus illustrating a configuration of the molding cavity for fabrication of a plastic body on a substrate, according to the prior art:

FIG. 5 (FIG. 16 of U.S. Ser. No. 17/882,569 (ML 029)) is a diagram, front view of a metal inlay having an array of card body sites, with each card body in the array suspended by corner struts from all four corners, and between struts air gaps or void sections exist around all four edges of the card body, according to the prior art.

Figure 6A:
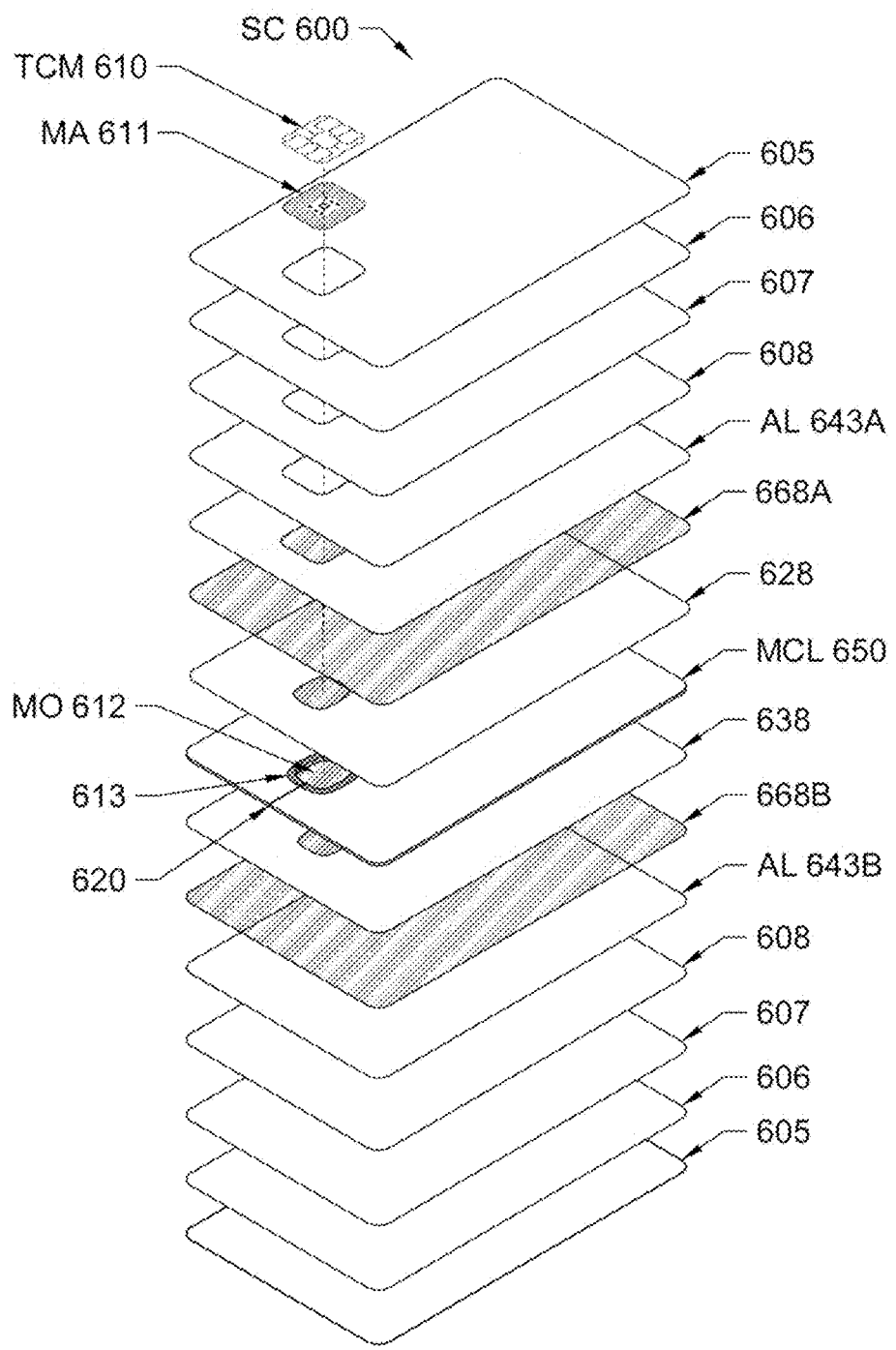

FIG. 6A is a diagram (exploded perspective view) of the stack-up construction of a dual interface metal core smartcard (SC) having contactless "tap to pay" functionality operating from both sides of the card body (CB), according to an embodiment of the invention.

Figure 6B:
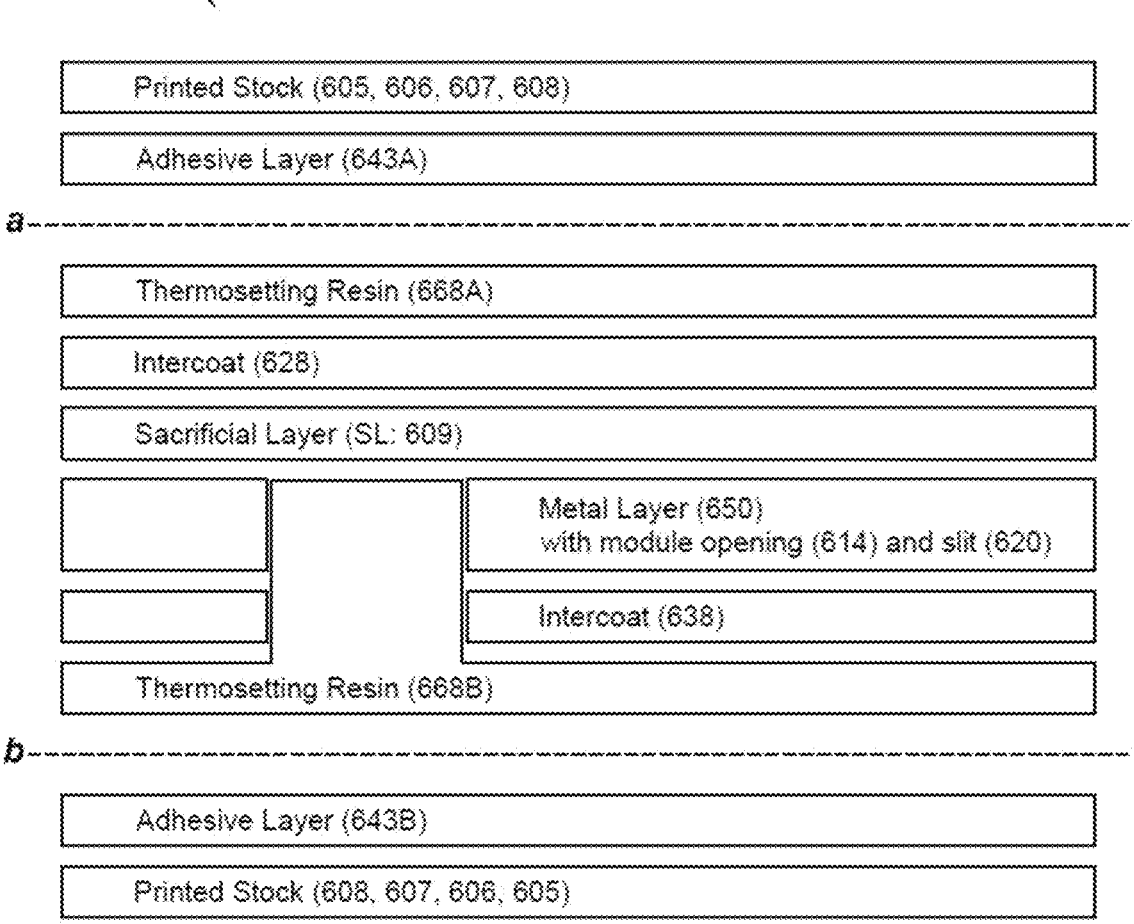

FIG. 6B is an exploded cross-sectional view (not to scale) of a smartcard having a metal core, such as the smartcard shown in FIG. 6A, according to an embodiment of the invention.

Figure 6C:
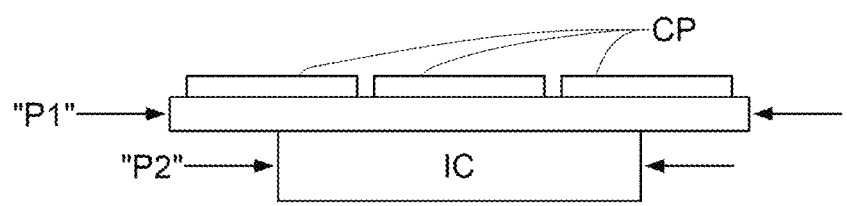

FIG. 6C is a cross-sectional view of a typical module, which may be a transponder chip module (TCM) or an inductive coupling module (ICM).

Figure 7A:
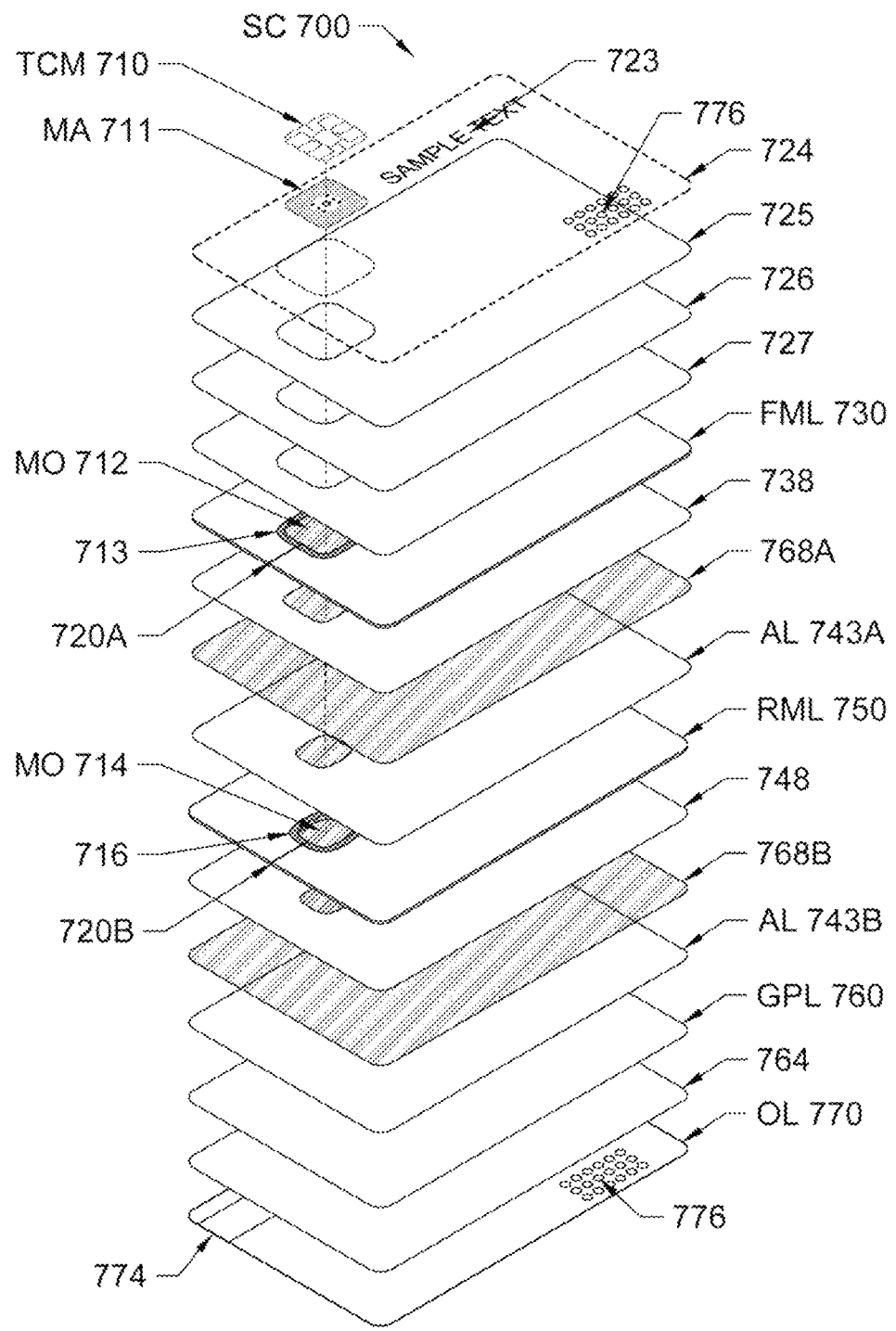

FIG. 7A is a diagram (exploded, perspective view) of a metal face smartcard or transaction card showing different layers in the stack-up construction, according to an embodiment of the invention.

FIG. 7B is an exploded cross-sectional view (not to scale) of a smartcard having a metal face, such as the smartcard shown in FIG. 7A, according to an embodiment of the invention.

Figure 8A:
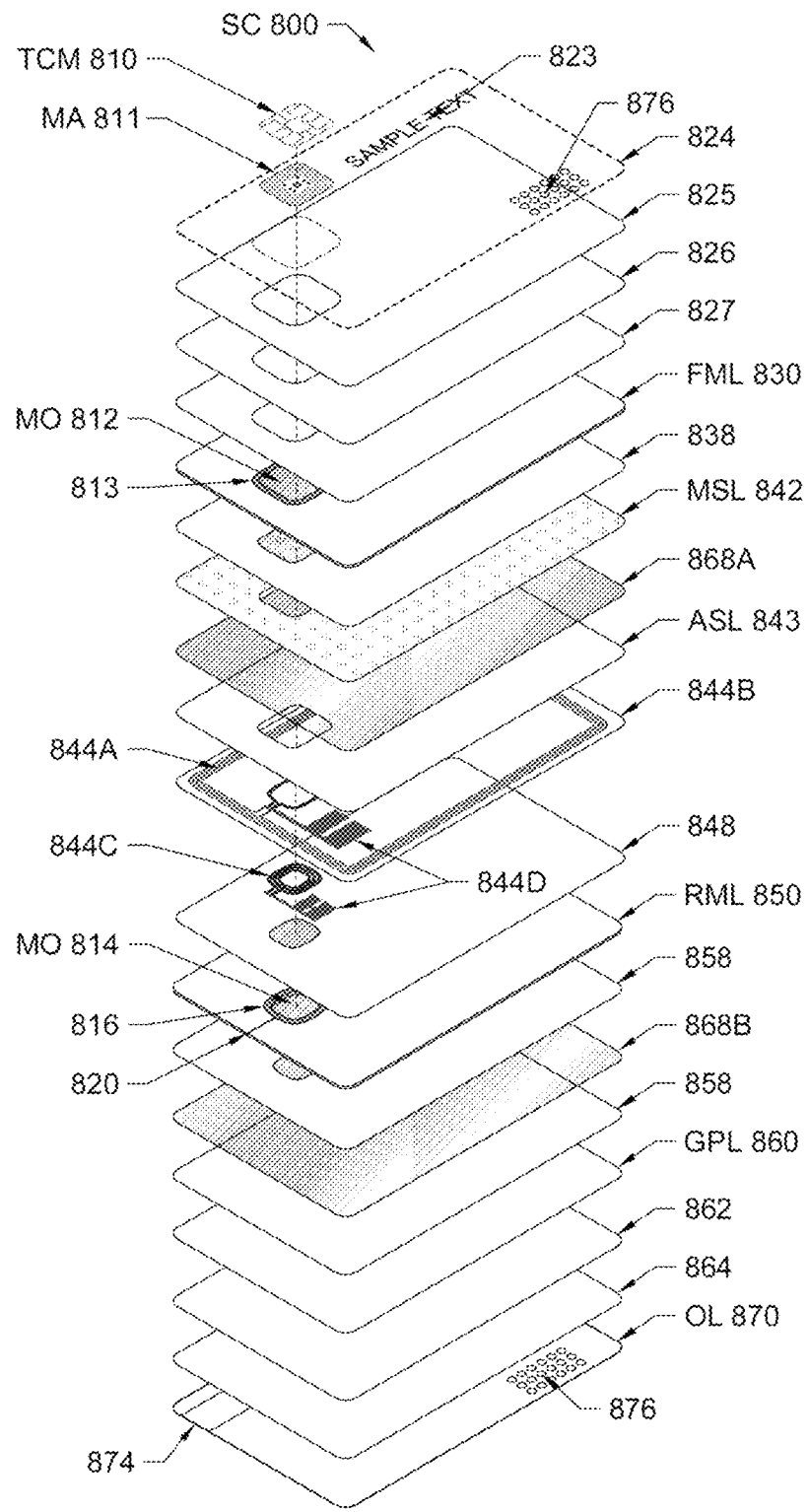

FIG. 8A is a diagram (exploded perspective view) of the stack-up construction of a dual interface metal face smartcard having front continuous metal layer (CML) and further having magnetic shielding material and a booster antenna circuit (BAC) enabling contactless "tap to pay" function operating from the rear side of the card body, according to an embodiment of the invention.

Figure 8B:
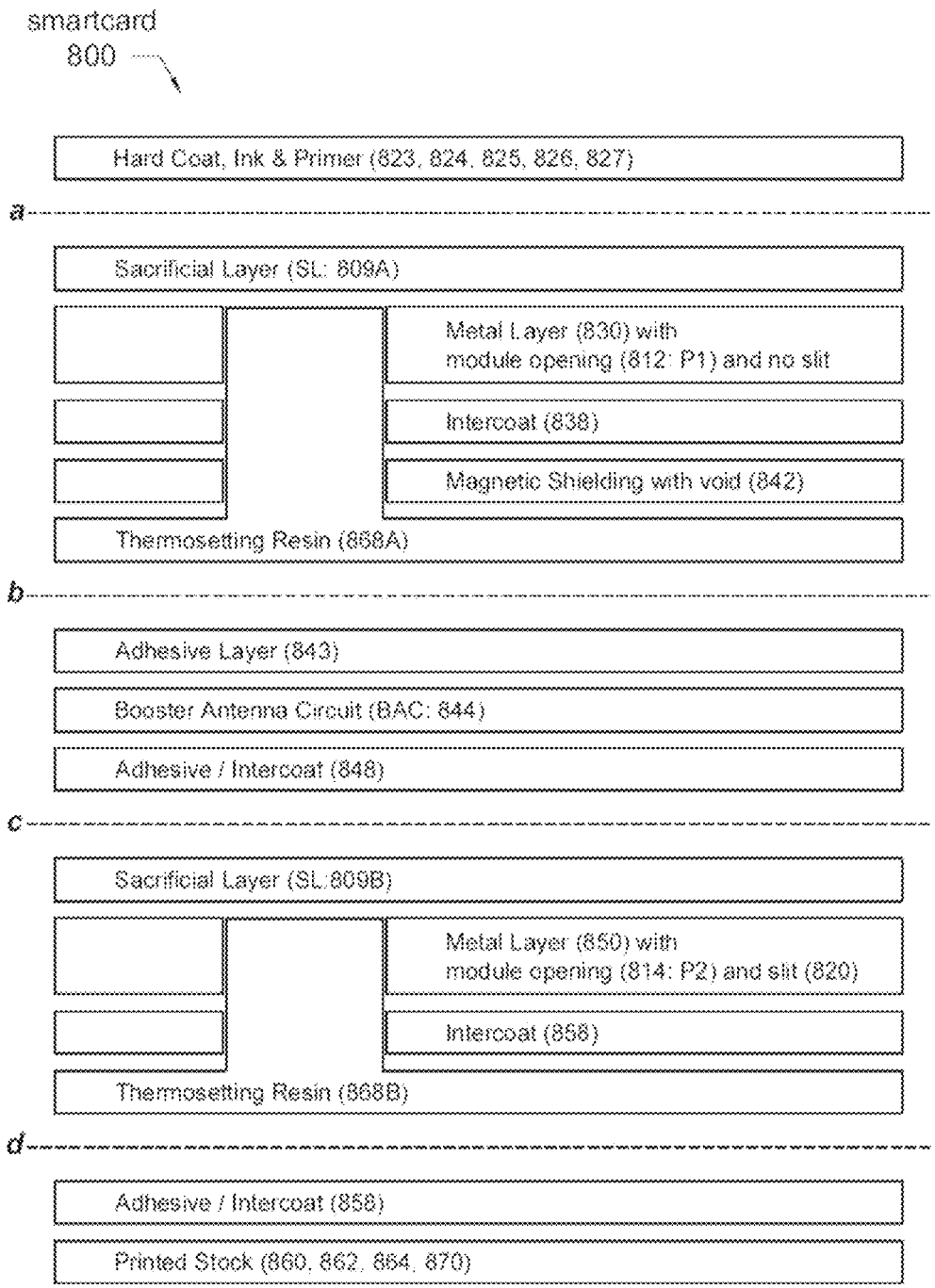

FIG. 8B is an exploded cross-sectional view (not to scale) of a smartcard having a booster antenna circuit (BAC), such as the smartcard shown in FIG. 8A, according to an embodiment of the invention.

Figure 8C:
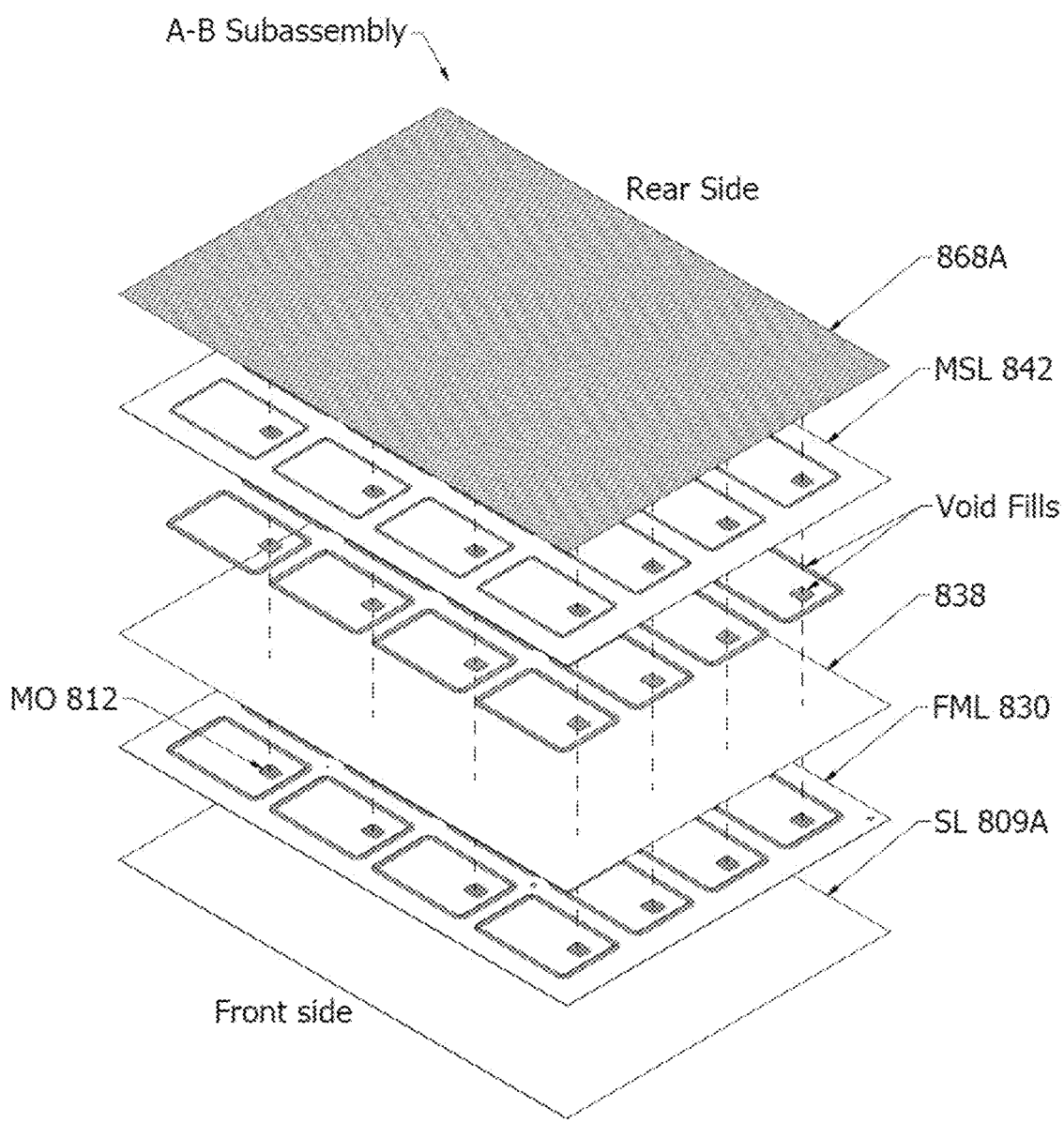

FIG. 8C is an exploded perspective view of a subassembly with an array of 16 card body sites representing the front stack-up constriction of section "a to b" as presented in FIG. 8B, according to an embodiment of the invention.

Figure 8D:
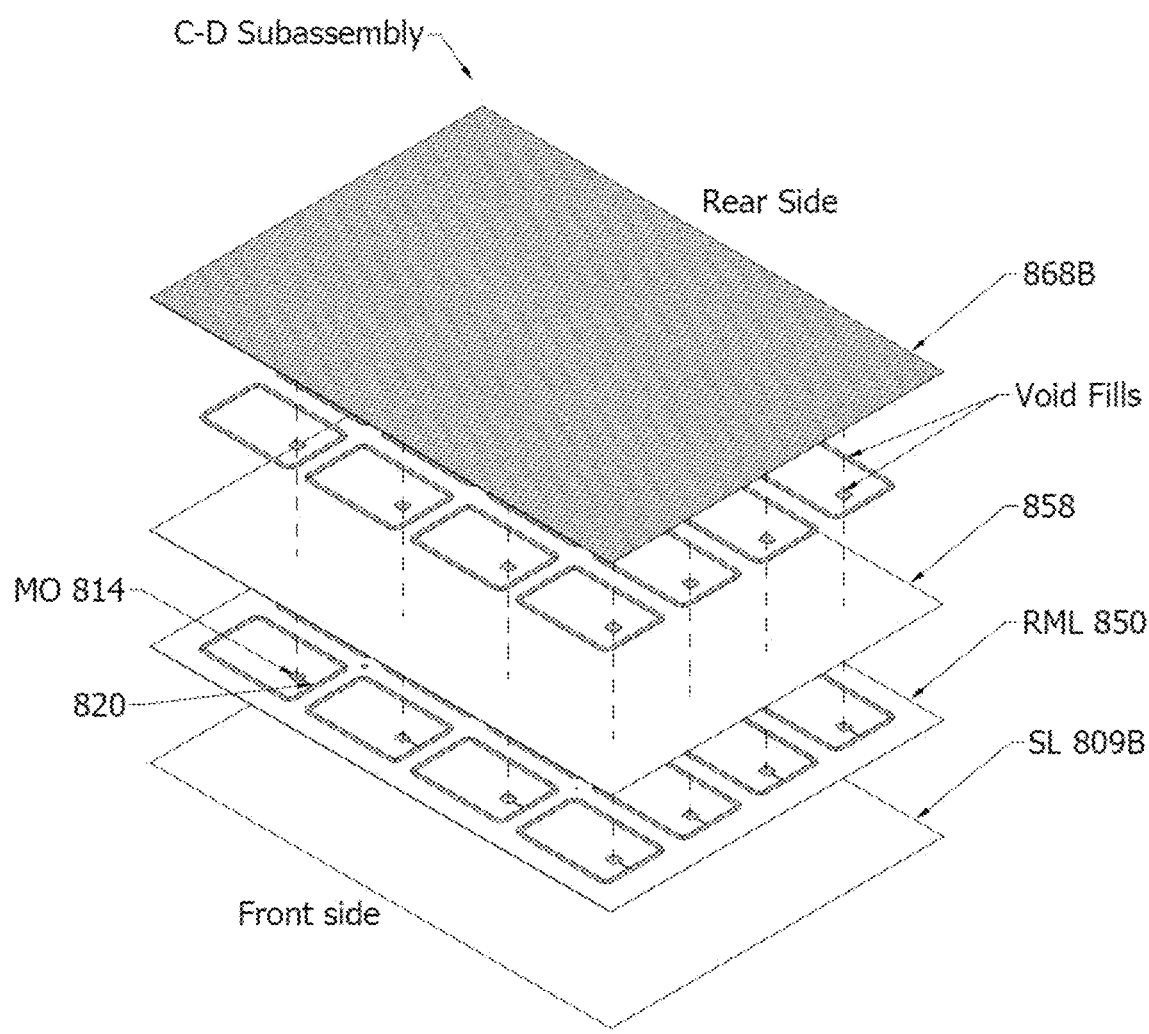

FIG. 8D is an exploded perspective view of a subassembly with an array of 16 card body sites representing the rear stack-up constriction of section "c to d" as presented in FIG. 8B, according to an embodiment of the invention.

Figure 8E:
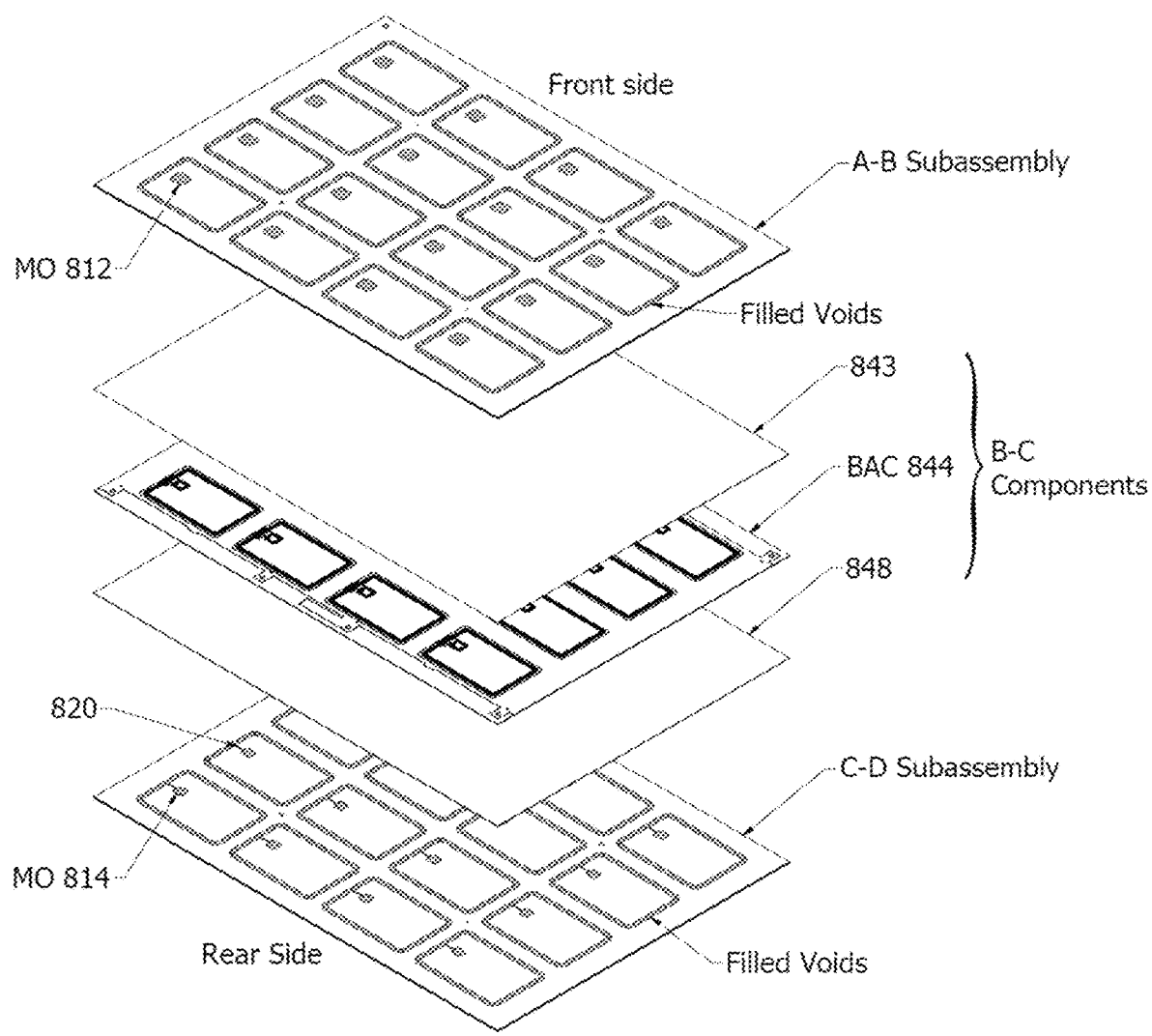

FIG. 8E is an exploded perspective view of the subassemblies "a to b" as shown in FIG. 8C and "c to d" as shown in FIG. 8D, with a center component section "b to c" as presented in FIG. 8B ready for press lamination with the subassemblies, according to an embodiment of the invention.

Figure 9A:
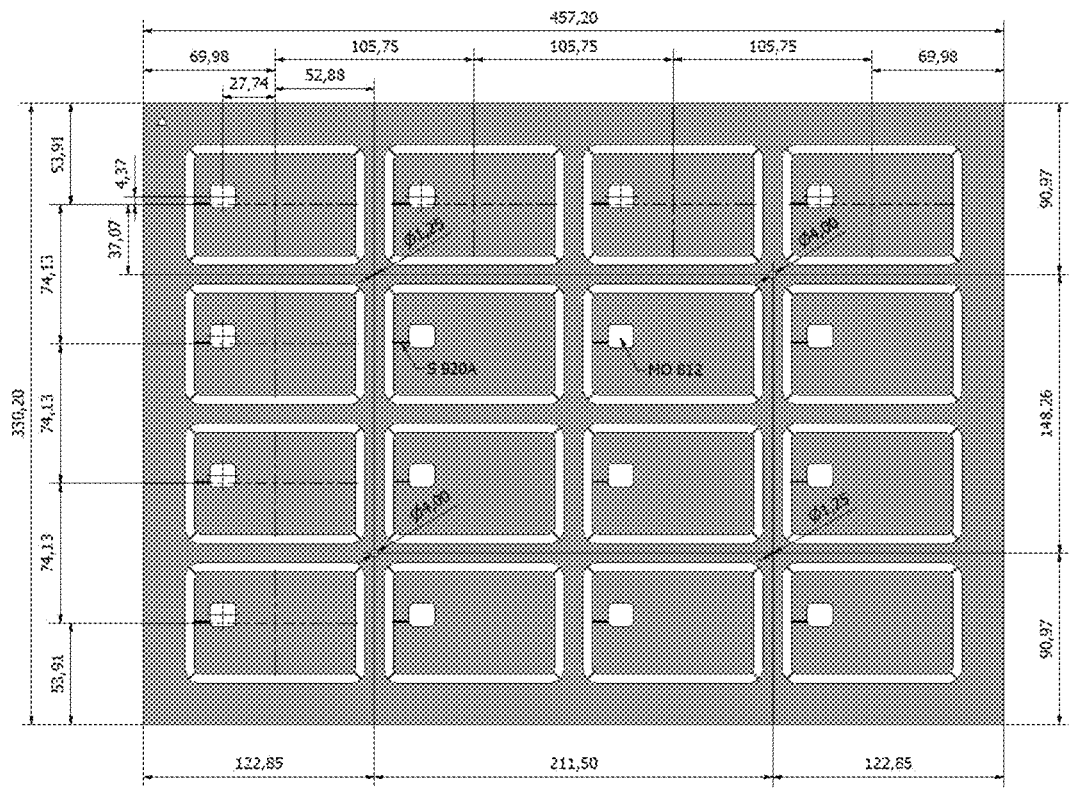

FIG. 9A is a front view diagram of a 16-up metal inlay with each card body site supported by corner struts with void sections between struts, similar to the prior art in FIG. 5 (FIG. 16 of U.S. Ser. No. 17/882,569), and each card body site in the metal inlay provided with a laser-cut module opening and slit, according to an embodiment of the invention.

Figure 9B:
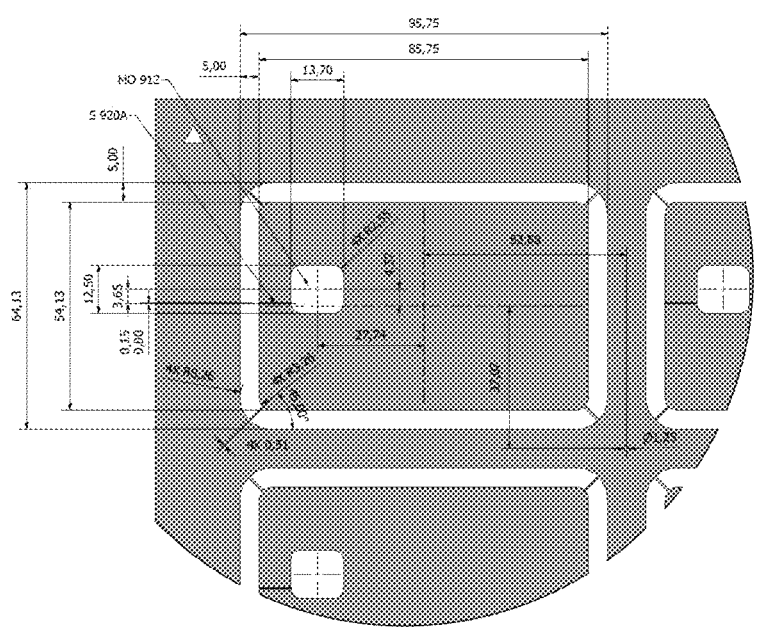

FIG. 9B is an exploded view of a card body site supported by corner struts between void sections from the 16-up metal inlay array shown in FIG. 9A, according to an embodiment of the invention.

Figure 9C:
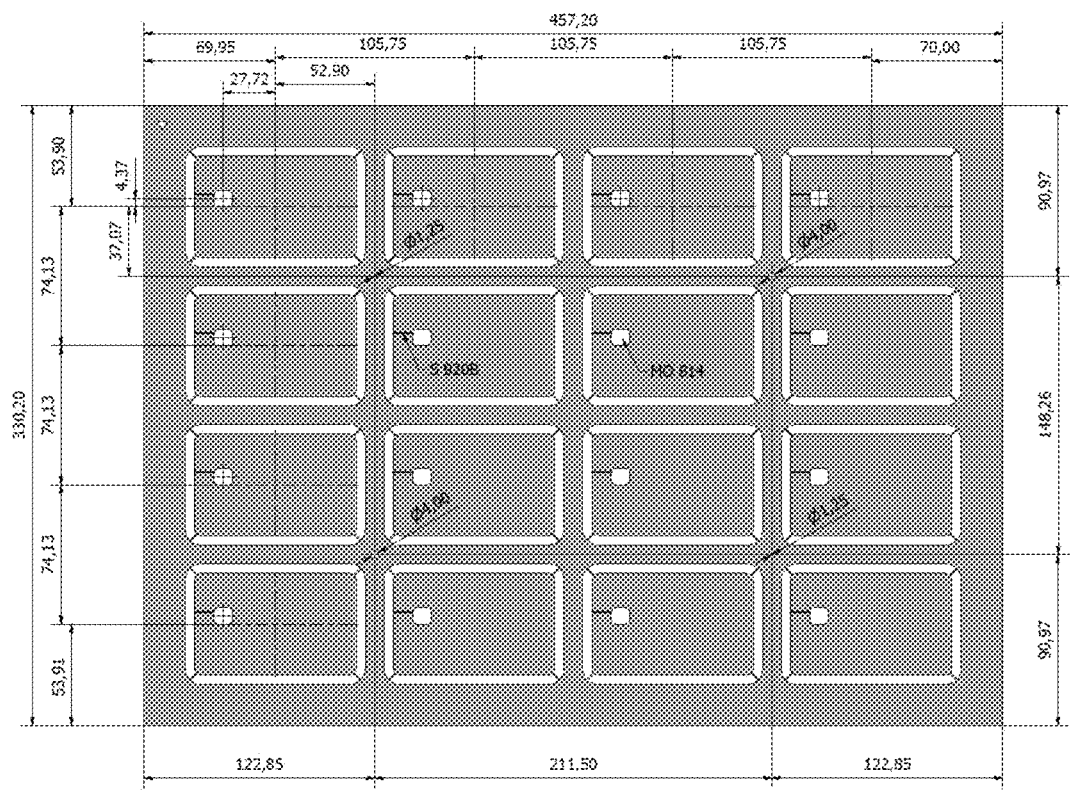

FIG. 9C is a front view diagram of a 16-up supporting metal inlay with each card body site supported by corner struts with void sections between struts, and each card body site in the metal inlay provided with a laser-cut module opening and slit for inductive coupling with the module antenna of the transponder chip module, according to an embodiment of the invention.

Figure 9D:
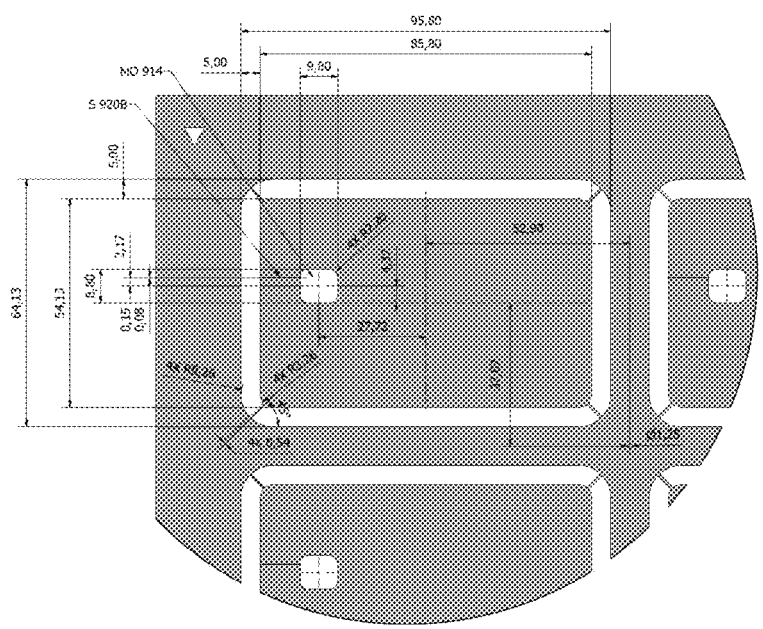

FIG. 9D is an exploded view of a card body site supported by corner struts between void sections from the 16-up supporting metal inlay shown in FIG. 9C, according to an embodiment of the invention.

Figure 10A:
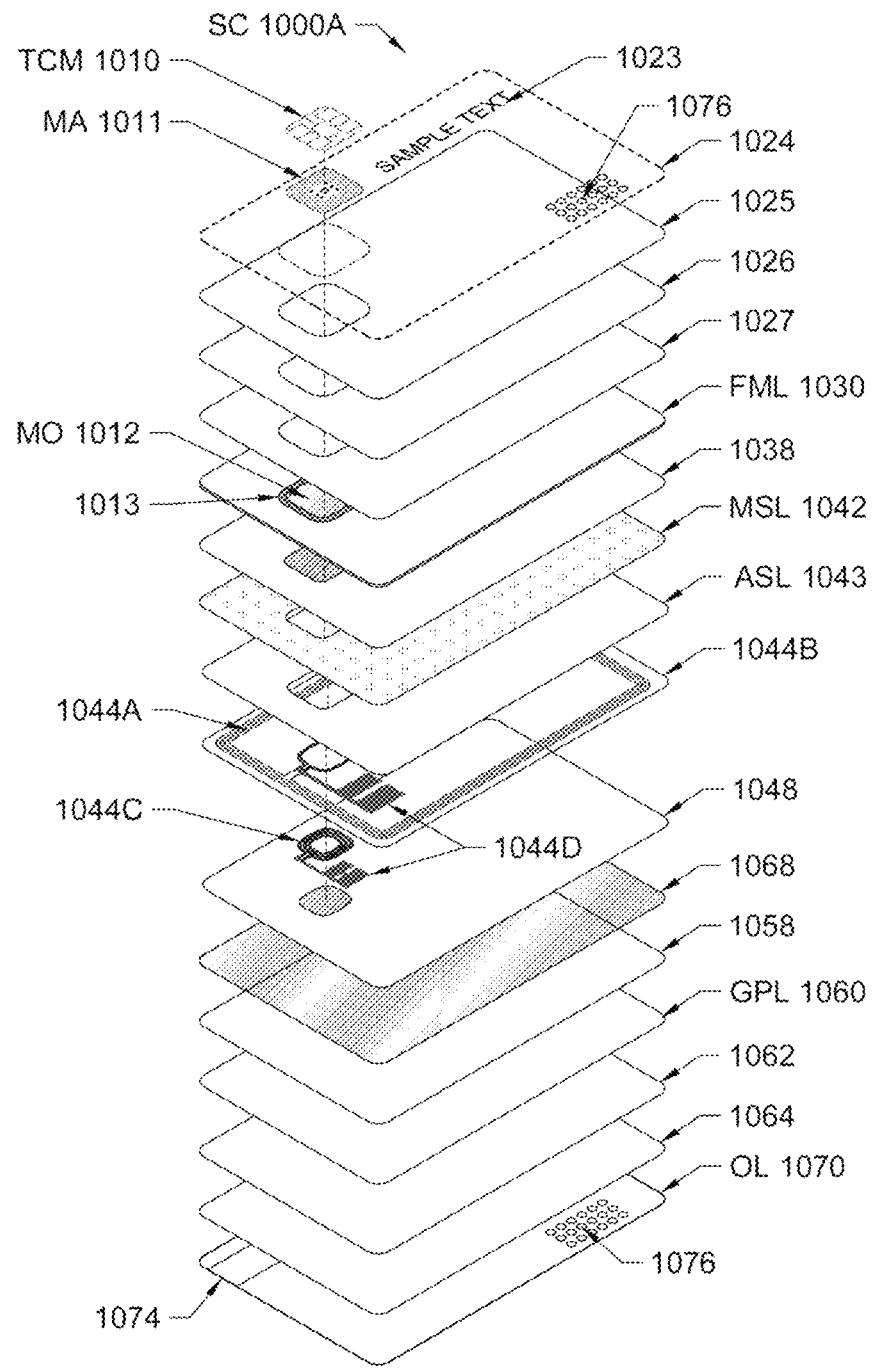

FIG. 10A is a diagram (exploded perspective view) of the stack-up construction of a dual interface metal face smartcard having a front continuous metal layer (ML, CML, FML) and further having a magnetic shielding layer (MSL) and a booster antenna circuit (BAC) enabling contactless "tap to pay" function operating from the rear side of the card body, according to an embodiment of the invention.

FIG. 10B is an exploded cross-sectional view (not to scale) of a smartcard having a single layer of thermosetting resin encapsulating a booster antenna circuit (BAC), a magnetic shielding layer (MSL) and a front face continuous metal layer (ML, CML, FML) having a module opening (MO), such as the smartcard shown in FIG. 10A, according to an embodiment of the invention.

Figure 10C:
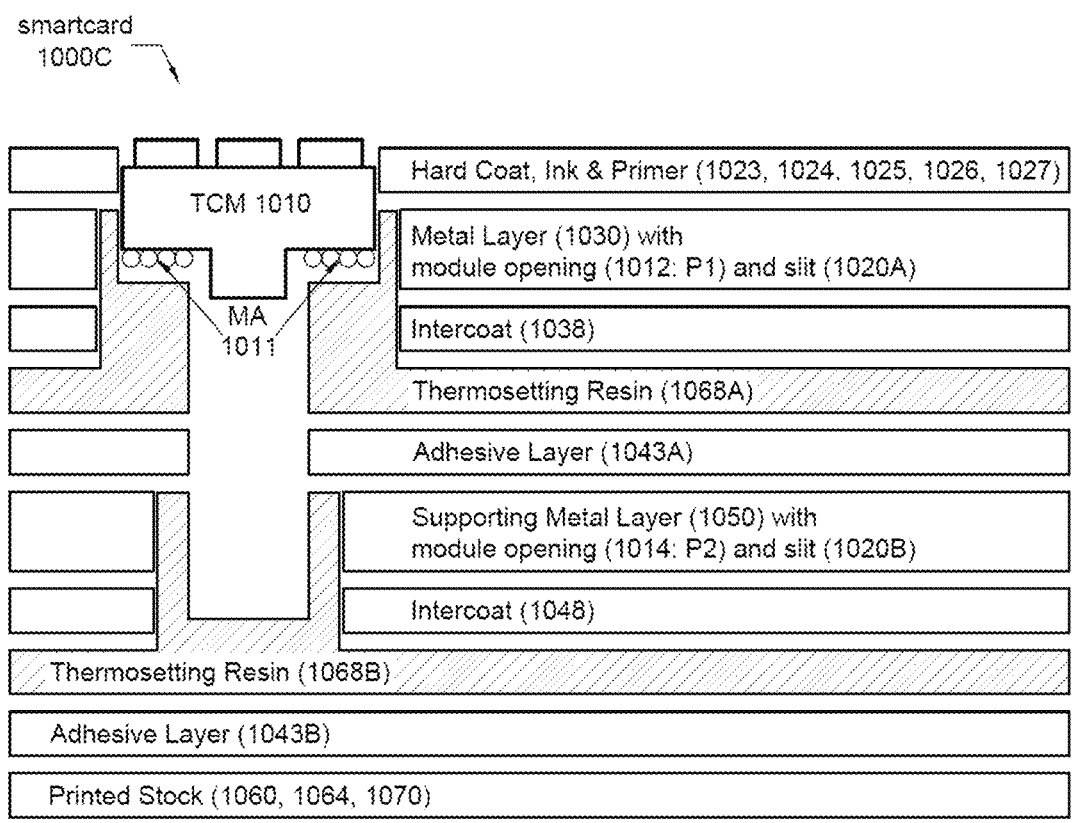

FIG. 10C is a cross sectional view of a transponder chip module implanted in a filled opening in a metal layer of thermosetting resin, providing to the transponder chip module mechanical support, according to an embodiment of the invention.

DESCRIPTION

Various embodiments (or examples) may be described to illustrate teachings of the invention(s), and should be construed as illustrative rather than limiting. It should be understood that it is not intended to limit the invention(s) to these particular embodiments. It should be understood that some individual features of various embodiments may be combined in different ways than shown, with one another. Reference herein to "one embodiment", "an embodiment", or similar formulations, may mean that a particular feature, structure, operation, or characteristic described in connection with the embodiment is included in at least one embodiment of the present invention. Some embodiments may not be explicitly designated as such ("an embodiment").

The embodiments and aspects thereof may be described and illustrated in conjunction with systems, devices and methods which are meant to be exemplary and illustrative, not limiting in scope. Specific configurations and details may be set forth in order to provide an understanding of the invention(s). However, it should be apparent to one skilled in the art that the invention(s) may be practiced without some of the specific details being presented herein. Furthermore, some well-known steps or components may be described only generally, or even omitted, for the sake of illustrative clarity. Elements referred to in the singular (e.g., "a widget") may be interpreted to include the possibility of plural instances of the element (e.g., "at least one widget"), unless explicitly otherwise stated (e.g., "one and only one widget").

In the following descriptions, some specific details may be set forth in order to provide an understanding of the invention(s) disclosed herein. It should be apparent to those skilled in the art that these invention(s) may be practiced without these specific details. Any dimensions and materials or processes set forth herein should be considered to be approximate and exemplary, unless otherwise indicated. Headings (typically underlined) may be provided as an aid to the reader, and should not be construed as limiting.

Reference may be made to disclosures of prior patents, publications and applications. Some text and drawings from those sources may be presented herein, but may be modified, edited or commented to blend more smoothly with the disclosure of the present application.

FIG. 1 shows a card may include the following processing steps and structure: 1—A metal layer 30 is selected (as shown in step 1 of FIG. 4) which is intended to serve as the top layer of a card 10. The metal layer 30 has a top (front) surface 301 and a bottom (back) surface 302 and a thickness (D) which may range from less than 0.01 inches to more than 0.02 inches. Metal layer 30 may have the same characteristics and properties as metal layer 30 shown and discussed above. 2—A hole 420 of depth D is formed in the metal layer 30 (as shown in step 1 of FIG. 4). The lateral dimensions of the hole are L2 and W2 (see FIGS. 5A and 5B). The hole 420 may be formed in any known manner (e.g., casting or milling). The hole 420 may be a regular or irregular solid cube, or a cylinder whose planar projection in the horizontal plane may be a square, a rectangle or a circle or an irregular shape. In the embodiment shown in FIG. 4, the lateral dimensions [length (L2) and width (W2)] of the hole 420 are respectively greater than the lateral dimensions [length L1 and width W1] of the IC module as further discussed below. Generally, L2 is greater than L1 (by at least 0.04 inches and W2 is greater than W1 (by at least 0.04 inches). However, as noted above, L2 may be made equal to L1, and W2 may be made equal to W1. The advantage of making L2 and W2, respectively, larger than L1 and W1 is to provide greater separation between the metal layer and the IC module and thus enhance RF transmission and reception. 3—A plug 434 of any material like plug 34 which does not interfere with RF transmission is formed or shaped to conform to the dimensions of the hole 420 to fill the cut out region (as shown in step 2 of FIG. 4). Plug 434 is processed and functions to secure the IC module. The interior walls of the hole 420 and/or the exterior walls of the plug 434 is/are coated with a suitable adhesive so the plug 434 adheres firmly to the walls of the hole throughout the processing of the metal layer in the formation of the card. The plug 434 may be made of any thermoplastic material such as PET, PVC or other polymer or any material such as epoxy resins and a ceramic. 4—As shown in step 3 of FIG. 4, an adhesive layer 42 is used to attach a ferrite layer 44 to the back surface 302 of layer 30. An adhesive layer 46 is used to attach a plastic (e.g., PVC) layer 48 which contains and/or on which is mounted a booster antenna 47 to the ferrite layer. Layers 42, 44, 46, and 48 and the booster antenna 47 are formed in a similar manner as the corresponding number components shown in FIG. 2 and serve the same or similar functions. 5—The assembly comprising layers 30, 42, 44, 46 and 48 is laminated to form a card assembly 350 (as indicated in step 3 of FIG. 4). 6—A T-shaped hole/opening 436 is then formed through the plug 434. The hole 436 is formed by milling, drilling and/or any other suitable means. The top portion 436a of T-shaped hole 436 is formed to have lateral and depth dimensions to accommodate the IC module. Where the dimensions of IC module 7 are L1 by W1 by DI the top portion of 436a will be formed to be just about L1 by W1 by DI to enable the IC module to be snugly inserted within the hole 436a and to be glued in place. The bottom portion 436b of the hole 436 formed in plug 434, (by drilling vertically down about the center of the plug 434) extends through the underlying layers 42, 44 and 46 and until layer 48, as shown in step 4 of FIG. 4. The lateral dimensions of hole 436b formed in plug 434 are made large enough to enable sufficient RF signals to pass between booster antenna 47 and the IC chip module 7 to enable RF communication to take place reliably. The lateral dimensions of the hole 436b formed in the plug 434 are denoted as L3 and W3, where L3 and W3 are less than L1 and W1. Note that making L3 and W3 less than L1, and W1, respectively, results in the formation of ledges 438 which will provide support for the IC module and keep it at its designed height of DI below the top card surface 301. The IC module 7 can be snugly inserted and attached (glued) to the ledges 438 and the top interior walls of the plug 434. 7—As shown in Step 5 of FIG. 4, IC module 7 which includes a chip 7a and a chip antenna 7b and a set of contacts 7c is positioned within hole 436a is glued in place.

FIG. 2 shows an Advanced Smart Card 22 made according to the teachings of U.S. Pat. No. 8,012,809. In its finished form, such an Advanced Smart Card will be comprised of a top layer 24, a bottom layer 26, and a center or core layer 28.

The top layer 24 is a film or sheet of synthetic paper PVC, Polycarbonate, or other suitable material. The bottom layer 26 is an electronics assembly on substrate circuit board (e.g. polyimide for flexible printed circuits or industry standard FR4 for conventional printed circuit boards) containing a number of integrated electronic components such as a Light Emitting Diode (LED) 30, a battery 32, a polymer dome switch 33, a microprocessor 35, an antenna 31, a Liquid Crystal Display (not shown). The center or core layer consists of a thermosetting polymeric material 34 (e.g., an initially liquid or semi-liquid thermosetting resin) that, upon curing, constitutes the center or core layer 28 of a finished Advanced Smart Card. The center or core layer 28 completely encapsulates all exposed electronic components on the top surface of the bottom layer 26. The thermosetting material 34 that eventually becomes the center layer 28 of the Advanced Smart Card is injected into the void space 36 between the top layer 24 and bottom layer 26. This injected polymeric material 34 should be capable of being injected under the relatively cold, low pressure forming conditions employed in applicant's process.

In any case, such thermosetting polymeric materials will be injected into, and fill, the void space 36 defined between the inside surface 38 of the top layer 24 and the inside surface 40 of the bottom layer 26. Upon curing, the polymeric material 34 of the center layer 28 should bond or otherwise adhere to both the inside surface 38 of the top layer 24 and the inside surface 40 of the bottom layer 26 to produce a unified Advanced Smart Card body. Such adhesion can be aided by treating the inside surfaces 38 and 40 of the top and bottom layers, respectively, in any one of several ways.

For example, bond promoting agents known to this art (e.g. chloro-polyolefins) may be employed to enhance bonding between the core layer-forming thermoset material and the material(s) from which the top and bottom layers are made (e.g., PVC, polyimide). By way of example only, Minnesota Mining and Manufacturing's base primer product 4475® can be used for this bond enhancing purpose, especially when the top or bottom layer material is PVC. Other treatments that can be applied to the inside surfaces of the top and/or bottom layers include plasma corona treatments and acid etching.

The Advanced Smart Card's thickness 39 is defined by placement of the mold faces (not shown in FIG. 1) as the thermoset material is injected into the void space 36 as part of the cold, low pressure forming process of this patent disclosure. In effect, the injection of the thermoset material into the void space 36 between the top and bottom layers fills any portion of that void space 36 that is not otherwise occupied by the electronic components protruding from the bottom layer 26.

The layout of electronic components on the top surface of the bottom layer in the manner generally suggested in FIG. 2 allows the incoming liquid or semi-liquid polymeric material to flow over and around all sides of exposed electronic components.

The elastomeric properties of the cured thermoset polymer provide protection from physical and thermal stressors for the electronic components in the bottom layer. The shock-absorbing properties of the elastomer that encapsulates all exposed electronics enable the assembly to resist flexion and/or torsion and/or impact forces that the Advanced Smart Card may encounter upon either of its major outside surfaces or on any of its four outside edge surfaces. The thermal insulation properties of the elastomer also reduce the amount of heat to which the electronic components may be exposed during a final hot lamination process employing a thin layer of PVC to create a high quality exterior surface on the bottom surface of the bottom layer.

FIG. 3 shows an embedded electronic device and an injection nozzle. The injection molding apparatus injects thermosetting polymeric material via a nozzle 60 between the top overlay 40 and the bottom overlay 30 forming the core layer 50 from thermosetting polymeric material. Preferably, as mentioned above, the thermosetting polymeric material is polyurea.

Cold, low pressure forming conditions generally mean forming conditions wherein the temperature of the core layer 50 consisting of thermosetting polymeric material, is less than the heat distortion temperature of the top 40 and bottom 30 overlays, and the pressure is less than about 500 psi. Preferably, the cold forming temperatures will be at least 100° F. less than the heat distortion temperature of the top 40 and bottom 30 overlays. The heat distortion temperature of many polyvinyl chloride (PVC) materials is about 230° F. Thus, the temperatures used to cold form such PVC sheets in the present invention will be no more than about (230° F.–100° F.) 130° F.

FIG. 4 shows a module 48 inserted between the upper side 140 of a first or lower plate 84 and the lower side 144 of a second or upper plate 86. The module section is shown with a frame 46, a substrate 12, and one of the four connecting segments 56 linking the substrate to the frame. The connecting segment 56 has an inner end 170 and an outer end 172. The connecting segment 56 is shown pushed downward by the inner end 164 of one of the down-set pins 102 into the depressed portion 112 of the lower plate 84. The displacement 155 of the substrate 12 from the frame 46 may be small, i.e., about ⅕ of the substrate thickness 13, or may be up to about three times the substrate thickness 13, depending on the thicknesses of substrate and semiconductor card 10.

The substrate 12 is shown with a circuit side 62 on which are mounted exemplary semiconductor elements 16 with connecting bond wires 17. The substrate 12 is held downward to depressed portion 112 (not shown) by the connecting segments 56, generally preventing passage of pressurized fluid polymer 15 (not shown) onto the substrate's opposing back side 64. For reference purposes, the peripheral opening 54 over the majority of the substrate 12 generally has a width 55 extending from the inner end 170 to the opening's outer edge 174 (see also FIGS. 19 and 20).

In FIG. 4, the central depressed region 134 forming the front face of the molded semiconductor card 10 is shown with a slightly indented label area 30 in which a label may be applied. In addition, FIG. 18 depicts a final singulation plane 168 relative to the molding apparatus 80. The semiconductor card 10 will be singulated from the frame 46 and wings 148 following removal from the molding apparatus 80.

Following molding and solidification of the casting in the molding apparatus 80, the unsingulated semiconductor card 10 may be ejected from the mold by further insertion of down-set pins 102, or use of other pins, not shown. Ease of ejection is enabled by the use of sloped lateral surfaces and rounded or oblique corners on the molded casting 180.

FIG. 5 shows a large generally rectangular metal inlay (MI: 1635) comprising a sheet or layer of metal (which may be referred to as the "body" of the metal inlay, and further comprising defining a plurality (sixteen shown) of smaller generally rectangular metal card body (MCB) sites arranged in a 4×4 array of card body sites. Each card body site corresponds with a single smartcard or transaction card. Each of the card body sites in the metal inlay is suspended by corner struts (CS: 1637) extending from all four corners thereof to the body of the metal inlay, with air gaps or void sections (VS: 1636), extending around all four sides of the card body sites (except for where the card body site is attached to the metal inlay). This results in the card body sites being "suspended" in the metal inlay by the corner struts.

The metal inlay (MI: 1635) may comprise 302 or 304 stainless steel, half hard or full hard. The card body sites (i.e., the voids or air gaps) may be laser cut, water cut or chemically etched from the metal inlay, leaving only the corner struts (CS: 1637) supporting each card body site. Later, removing (cutting) the corner struts will result in the card body sites being singulated from the metal inlay, and serving as a metal layer (ML) of a smartcard (or transaction card).

Reference is made to US 2021/0073608 (11 Mar. 2021; Finn), entitled DUAL INTERFACE METAL CARDS AND METHODS OF MANUFACTURING. Struts are shown at FIGS. 12-14 therein, and are described as follows:

[0448] FIG. 12 illustrates a perforated metal inlay (MI) site with a metal frame (MF) formed by laser cutting, water cutting or chemical etching, featuring a front and rear metal layer with a slit(S) and module opening (MO) to act as a coupling frame (CF), and the coupling frame (CF) supported by struts (SRTs) connected to said metal frame (MF),

[0450] FIG. 13 illustrates a metal inlay (MI) in which the front and rear metal layers, consisting of a metal frame (MF) supporting a coupling frame (CF), are folded over on each other at the point of perforations (perfs). The coupling frame (CF) is supported in the metal frame (MF) by struts (SRTs), resulting in an air gap (ag).

[0451] FIG. 14 illustrates a metal inlay (MI) disposed with a metal frame (MF) supporting a coupling frame (CF) which is suspended from the metal frame (MF) using supporting struts.

In each of FIGS. 12-14 in US 2021/0073608, a coupling frame (CF) is supported in a metal frame (MF) by only two struts, both extending from one side (of the four sides) of the coupling frame.

FIG. 5 shows four corner struts (CS) struts supporting each rectangular metal card body (MCB) site in the metal inlay (MI), the struts emanating from respective four corners of the meta card body. This provides more stability to the card body site in the metal inlay than the two struts on one side of a coupling frame disclosed in US 2021/0073608. Each rectangular metal card body (MCB) site may be supported in the metal inlay (MI) by struts located at other than the corners of the sites. For example, a site may be supported in the inlay by struts extending from at least two sides, such as opposite sides of the site. Or, there may be only three corner struts extending from three corners of the sites. Or, there may be a combination of corner struts and struts extending from the sides of the sites.

Each card body site comprises a module opening (MO: 1612) for receiving a transponder chip module (TCM) or the like. For a card body site intended to function as a discontinuous metal layer (ML), a discontinuity in the form of a slit(S) may be formed in the site, extending from the module opening to a perimeter edge thereof.

The metal inlay (MI: 1635) may have registration edges (or features, or fiducials) for later precision punching or cutting in facilitating the card singulation process. During the laser or water cutting process, the edges of the metal card bodies (MCBs) may be dulled (smoothed) to remove sharp edges.

The metal card body (MCB) at each site may be separated from the metal inlay (MI: 1635) by an air gap or a void section (VS: 1636) having a width of approximately 5 mm. The supporting corner struts (CS: 1637) may be positioned at the four corners of each metal card body (MCB), projecting at an angle therefrom and having a width of 0.5 mm to hold in position each metal card body (MCB).

A sacrificial layer (SL: not shown, see FIG. 14), such as polytetrafluoroethylene (PTFE), may be disposed on a front side (or face) of the metal inlay (MI: 1635) to protect the exposed metal surface from scratches, and to cover the air gaps or void sections (VS: 1636), module openings (MO: 1612) and slits. The sacrificial layer may be slightly larger than the metal inlay (MI: 1635), hanging over at least one edge thereof, to facilitate its later removal. The sacrificial layer may form pockets/channels at each air gap or void section (VS: 1636), module opening (MO: 1612) and slit in the metal inlay (MI: 1635).

The reverse side (or face) of the metal inlay (MI: 1635) may be provided with an adhesion promoter such as a primer (chemical bonding agent) and/or a thermosetting adhesive (coating or film) or a doubled-sided thermosetting adhesive film on a release carrier layer, with said adhesion promoter provided with cut-outs matching the dimensional and geometrical positions of the air gaps (or void sections (VS: 1636)), module openings (MO: 1612) and slits in the metal inlay (MI: 1635). The thermosetting adhesive film may be partially bonded to the metal inlay (MI: 1635) through a process of lamination. Subsequent removal of the release liner will leave a layer of thermosetting adhesive film disposed on the metal inlay (MI: 1635) with pockets/channels at each site in the array.

A coating of polyurethane resin (PU: 1668) with a given viscosity may be roll coated onto the surface of the adhesion promoter (a primer and/or a thermosetting adhesive (coating or film). The thickness of the coating may be controlled by a doctor blade and a rotating drum of resin to create an encapsulation layer of polyurethane (1668) having a controllable thickness (e.g. 50 μm), while at the same time filling the pockets and channels with resin (1668) at each site in the array of metal card body (MCB) sites. The encapsulation layer (1668) may contain glass fiber for rigidity and/or a pigment for color. The encapsulation layer (1668) may be further compressed with a pressure plate to remove gases, and left to cure to its final stage, typically after storage for a duration of one week. Before final curing of the encapsulation layer (1668), components and devices may be embedded into the resin (1668), followed by an additional coating layer (not shown). The solidified resin (1668) in its final curing state may be mechanically milled or planed to a preferred thickness before assembly of other layers in the card stack-up construction.

In a final step the shrouded metal inlay with polyurethane resin (1668) is laminated to other layers in the card stack-up construction, before separating (singulating) the metal card body sites from the metal inlay. The singulation process may simply involve removing the corner struts (CS: 1637) from the corners of each metal card body (MCB). The card singulation process is significantly reduced in terms of machining time and production yield.

A particular advantage of laser cutting metal card body sites in a metal layer, with each metal card body suspended by four narrow struts, is the ability to DLC or PVD coat the exposed edges of the individual metal card bodies.

The adhesion promoter in the form of a primer and/or a thermosetting adhesive (coating or film) may be removed with the polyurethane resin (1668) applied directly to the metal inlay (MI: 1635) or metal layer. The metal surface may be first sand blasted or chemically treated to create a rough surface, to promote adhesion of the polyurethane resin (1668).

Glossary of Terms for Molding Thermosetting Resins

Aliphatic polyurethanes: A polyurethane (PU, or PUR) which is used where transparency and nonyellowing properties are the most important.

C stage: The final, cured state of a thermosetting resin.

Castable polyurethane: Castable polyurethanes are all liquid nonfoam urethane polymers, 100% (or nearly 100%) solids, reactive polymer systems.

Castable polyurethane ingredients: Polyol, diisocyanate and the chain extender (commonly called the curative). These three items are reacted together to give the polyurethane.

Casting: (a) The process of forming solid or hollow articles from fluid plastic mixtures or resins by pouring or injecting the fluid into a mold or against a substrate with little or no pressure, followed by solidification and removal of the formed object.

(b) The process of forming solid or hollow articles from fluid plastic mixtures in a mold with little or no pressure. Following solidification, the articles are removed by the process known as demolding.

Compression mold: A precision-machined mold used in the process of compression molding.

Compression molding: A method of molding in which the preheated polymer is forced into a cavity. The material is subjected to pressure and (usually) heat until cure has been effected. The process most often employs thermosetting resins such as silicones for the production of medical devices.

Corona discharge treatment: An important surface treatment that renders normally inert polymers, such as olefins and fluorocarbons, more receptive to coatings, adhesives, and inks.

The corona discharge oxidizes the surface of the polymer by the formation of polar groups on reactive site.

Curative: Materials that react with an isocyanate prepolymer to produce the final elastomer.

Cure time: The length of time required for sufficient reaction completion to develop desired polymer properties such as strength, dimensional stability, elongation, and so on. The longer the pot life, the longer is the cure time. Heat and catalysts facilitate the cure as they speed up the chemical activity of the compound.

Curing agent: A chemical that is added to a polyurethane mixture to affect a cure (molecular extension) in a polymer.

Curing agents (hardeners, curatives): Substances or mixtures of substances added to a compound to promote or control the curing reaction. Curing agents are reactive substances that become part of the molecular structure during cure.

Curing temperature: The temperature at which a thermosetting resin is subjected to attain final cure.

Curing time: The time necessary to attain full cure in a thermosetting resin.

Degassing: Also known as deaeration or vacuuming, removing air from a liquid material.

Delamination: The undesirable separation of one or more layers in a laminate caused by failure at the adhesive interphase.

Demold: The process of removing a specimen or cast from a mold.

Dip coating: A coating process wherein the object to be coated is immersed in a vessel containing a solution, dispersion, or heated fluid coating material, then withdrawn and subjected to heat or drying to solidify the film deposit. Fluidized-bed coating is a typical example of this technique.

Doctor bar (doctor blade, doctor knife): A precision-machined flat bar used for regulating the amount of liquid material on the rollers of a coating machine, or to control the thickness of a coating after it has been applied to a substrate.

Ductless filtration fume hood: To eliminate contaminating gas and/or solid particles/aerosols from the workspace. When working with the two polyurethane components (polyol and isocyanate) and primers, it is important to note the respiratory hazards which present and to implement adequate engineering safety controls. A ductless containment hood creates a semi-enclosed, negative pressure work environment where contaminated particles are arrested at the source of emission.

Exothermic: The liberation of heat during the course of a chemical reaction.

Gel time: For polyurethanes, the interval of time between mixing together the polyol and diisocyanate or prepolymer and curative and the formation of a non-owing, semi-solid, jelly-like system.

Hardness: The resistance of a material to penetration, usually expressed in Shore A or Shore D units.

Hot cure: The curing of polyurethanes at temperatures between 5° and 110° C.

Inert gas: A gas that exhibits great stability and extremely low reaction rates under normal temperature and pressure conditions, for example, nitrogen, argon and helium. Nitrogen is commonly used in polyurethane processing.

Liquid injection molding (LIM): A process that involves an integrated system for proportioning, mixing, and dispensing two-component liquid resin formulations and directly injecting the resultant mix into a mold, which is clamped under pressure.

Mold release agent: A lubricant that prevents the casting from adhering to the mold. Useful release agents are telomers, silicones, synthetic and natural waxes, and various sorts of soaps.

Open cast molding: Polyurethane is smoothly poured into an open-top mold, or sometimes gently flowed up from the bottom of the mold. The product's top face, or open face, usually undergoes a secondary machining operation in order to remove the over-pour.

Open pour: The process of filling a mold by pouring polyurethane directly onto the lower surface of an open mold.

Pigment: A powdered or liquid substance used in resins that imparts coloration to the cured item. Can be organic or inorganic.

Polyurethanes: A large family of polymers based on the reaction products of an organic isocyanate with compounds containing a hydroxyl group. Polyurethanes are also called urethanes, a name that sometimes is confused with similar-sounding but totally different chemicals, including urea-formaldehyde and urethane (chemical name for ethyl carbamate). The general term polyurethane is not limited to those polymers containing only urethane linkages but includes polymers containing allophanate, biuret, carbodiimide, oxazolinyl, isocyanurate, uretidinedione, and urea linkages in addition to urethane.

Pot life: The period of time during which a reacting thermoset plastic remains suitable for processing after mixing with a reaction-initiating agent.

Prepolymer: The product from reacting a polyol with an isocyanate.

Primer: A coating applied to a substrate to improve the adhesion, gloss, or durability of a subsequently applied coating.

Process routes: Prepolymer process (bulk reaction between polyol and diisocyanate, with the curative added just before casting) or one-shot process (all ingredients mixed together and allowed to react).

Reaction injection molding (RIM): A process that involves the high-pressure impingement mixing of two or more reactive liquid components and injecting into a closed mold at low pressure. The RIM process includes four interdependent elements: the chemical system, the RIM machine, a mold support, and mold temperature-control system. Reaction injection molding refers to any molding system that involves filling a mold with a flowable polymerizable resin-forming composition, which may contain a reinforcement component, the resin-forming composition then undergoing polymerization to provide an article of desired molded configuration. The expression reaction injection molding as used is synonymous with those operations referred to as liquid reaction molding (LRM), reinforced reaction injection molding (RRIM), liquid injection molding (LIM), and liquid resin molding.

Release agent: A substance put on a mold surface or added to a molding compound to facilitate the removal of the molded product from the mold.

Shore hardness: The measure of firmness (resistance to indentation) of a compound determined by means of a durometer hardness gauge, measured on a Shore A or D scale.

Single shot: In this process all the ingredients are mixed together and the reaction is allowed to proceed to completion. The reaction often needs to be sped up by the addition of a catalyst. Due to the fact that the reaction gives off heat (exothermic), the process is mainly used in thin-walled applications where the generated heat can be readily dissipated. The equipment and mold set-up is similar to that used for RIM (reaction-in-mold) processing of two-part polyurethanes.

Venting: The displacement of air from the mold cavity as the cavity is filled by polyurethane. Venting normally occurs through small holes or seams in the mold located at strategic positions around the mold to ensure that all air is vented. When the mold is completely air free and polyurethane filled, a small amount of polyurethane also vents, further ensuring a completely air-free filling of the mold.

Polyurethane (PU) Casting
Introduction

Castable polyurethanes have the basic properties of thermosets in that they can only be processed once, plus they have the elastic of rubber over the full range of hardness. The equipment and mold set-up are similar to that used for RIM (reaction-in-mold) processing of two-part polyurethanes. Polyurethane will adhere to metal, but an engineering grade bond is required. This is obtained by proper preparation and the application of an inter-coat or bonding coat.

Vacuum Casting

In parts where amounts of entrapped air must be kept to an absolute minimum, the process may be carried out under full vacuum. The unit consists of two chambers, one for the mixing of the prepolymer, curative and other ingredients, and the lower chamber for the mold. The mixing is done under vacuum and the fully degassed mix is poured into the mold using remote handling equipment. As both chambers are under vacuum, there is no air to be displaced and the mold is filled completely with no entrapped gasses. In certain units the mix can be pressure transferred to the mold. A pot life of at least five to six minutes is needed for this method.

The advantage of this system is that bubble-free mixes are made, and the polyurethane will completely fill the mold as there is no air to displace.

Compression Molding

In this process the polyurethane mix is poured into a mold that can be placed into a compression molding press with heated platens. The material is allowed to gel and a top plate is placed on the material. The molding press is fully closed. The molds must be capable of withstanding the direct heat and pressure of the press. Aluminum or steel molds are preferred for this process. A variation in the compression molding technique is to use transfer molding.

Surface Preparation for Bonding

| Surface to which Polyurethane Can Be Bonded | Mechanical Preparation | Chemical Preparation |
|---|---|---|
| Stainless steel | 40 grit-steel grit, clean sand, aluminum oxide grit | Dichromate treatment |

Bonding Primer

There are specialist primers on the market for bonding polyurethane to metals. The three most popular brands are:
1. Chemlok® (Lord Chemical Products, Erie, Pennsylvania)
2. Conap® R (Cytec Conap, Olean, New York)
3. Thixon® (Rohm and Hass, Philadelphia, Pennsylvania)

Avoid Forming Air Pockets

The mold must be designed so that the casting will fill from the bottom upward and not have a tendency to fold over itself. In other words, when pouring the polyurethane mix, care must be taken so that the polyurethane flows down to the base of the article and displaces the air as it fills from the bottom.

Competing Factors when Casting Polyurethanes

The temperature of the mix and the mold must be suitable for the part. The viscosity of the material must be as low as practicable to allow easy filling and release of entrapped air. The polyurethane temperature must not be too high as to cause too fast a gelation.

Machinability

Polyurethanes with a hardness above 90 Shore A are easy to machine. The harder the material, the easier it is to machine. All standard metal machining operations can be carried out with some care.

Liquid Resin Casting

Pouring a reactive liquid PU into molds, then allowing it to cure to solid form, describes the fundamentals of liquid resin casting.

Unlike injection molding, liquid resin casting is associated with mild processing conditions that allow delicate components, such as electronics, to be encapsulated directly into the final or near-net shape required.

New tooling starts with a model. A castable material of PU is poured over the model in one or more steps. The material then cures, creating a mold. (Molds may also be machined directly out of aluminum or another suitable material.) Once the mold is finished, parts are produced by pouring a resin into it and allowing the material to cure.

Equipment

Special equipment for liquid resin casting includes mixing and dispensing equipment for handling resins, degassing equipment for removing entrapped air within the resin, and ovens or electrically heated molds for curing materials.

Materials

Thermoset resins such as PUs are excellent general-purpose materials for both soft-rubber and hard-plastic applications where exceptional toughness and wear resistance are important.

Processing Parameters

Little or no pressure occurs within the liquid resin casting process, but humidity should be controlled during material handling. PUs are sensitive to moisture and will react to the presence of water in the mold. Release agents can be used on mold surfaces to facilitate part removal and are available in silicone-based and water-soluble formulations.

Reference is made to:

Ratna, D (2009): *Handbook of Thermoset Resins*, Shrewsbury, Shropshire: iSmithers—A Smithers Group Company Clemitson, I. R. (2012): *Polyurethane Casting Primer*, Boca Raton, Florida: CRC Press Taylor & Francis Group Szycher, M (2013): *Szycher's handbook of Polyurethanes Second Edition*, Boca Raton, Florida: CRC Press Taylor & Francis Group Clemitson, I. R. (2015): *Castable Polyurethane Elastomers*, Boca Raton, Florida: CRC Press Taylor & Francis Group U.S. Ser. No. 17/866,547, entitled "RFID Enabled Metal Transaction Cards", incorporated by reference herein, discloses a metal transaction card which may comprise a front face continuous or discontinuous metal layer and may have a layer of polyurethane (PU) resin upon which graphic elements may be digitally (inkjet) printed (primer and ink) thereon. The polyurethane resin may be further doped to facilitate laser engraving or marking of its polymer surface for the purpose of personalization. Prior to the application of the polyurethane resin, the metal layer may be surface treated and primed. The polyurethane resin may be a two-component, low viscosity, semi-flexible PU compound with the physical properties (mix ratio (w/w): polyol/isocyanate, viscosity (mPa*s, or millipascal seconds), density (g/cm$^3$), pot life (min), gel-time (min), curing time (hr) and final cure (days)) determining the adhesion, hardness and tensile strength of the compound.

The typical uncured properties of the base resins (component A [polyol] and component B [poly-isocyanate]) may have a respective viscosity (mPa*s) at 25° C. of 150-350 (A) and 600-800 (B). The density of the resins at 25° C. for component A may be 1.05 g/cm$^3$ and for component B 1.20 g/cm$^3$. The mix ratio of the components (A:B) before casting may be by weight 100:86 or by volume 100:100. The mix viscosity at 25° C. may be 300-500 mPa*s. The gel-time in the casting mold at 25° C. may be 30-45 minutes. The curing time at 25° C. may be 24 hours. The final cured properties would be attained after 7 days, reaching a minimum hardness of 80 Shore A and transparent in color.

FIG. 6A shows the stack-up construction of a dual interface metal core smartcard (SC) having contactless "tap to pay" functionality operating from both sides of the card body (CB).

The smartcard (SC) comprises front synthetic layers (605, 606, 607, 608), and rear synthetic layers (608, 607, 606, 605) laminated with adhesive layers 643A and 643B, respectively, to a metal core comprising a single discontinuous metal layer (ML, DML: 650) having a module opening (MO: 612) and a slit (S: 620). The module opening and slit may both be laser cut into the metal layer.

The discontinuous metal layer (DML: 650) is encapsulated (covered) on at least one side with thermosetting resin, and is shown with its top and bottom sides both covered with thermosetting resin (668A, 668B). The thermosetting resin also fills the laser-cut module opening (MO: 614) and the slit (S: 620) in the discontinuous metal layer (DML: 650). In this, and other embodiments, the thermosetting resin may be transparent or pigmented.

The thermosetting resin (668B) is disposed on the bottom surface of the metal layer (650), and "encapsulates" it. The intercoat (or inter-coat) (638) is shown disposed between the thermosetting resin (668B) and the bottom surface of the metal layer (650). The thermosetting resin (668B) is shown also filling the module opening (614) in the metal layer (650). The process of encapsulating may be coating, open cast molding, pressure casting, over-molding, compression molding, reaction injection molding (RIM) or reaction assisted molding process.

A similar situation exists with regard to the thermosetting resin (768A) disposed upon and encapsulating the bottom surface of the metal layer (730), with intercoat (738) therebetween, and filling the module opening (712). A similar situation exists with regard to the thermosetting resin (768B) disposed upon and encapsulating the bottom surface of the metal layer (750), with intercoat (748) therebetween, and filling the module opening (714). See FIG. 7B. A similar situation exists with regard to the thermosetting resin (868B) disposed upon and encapsulating the bottom surface of the metal layer (850), with intercoat (858) therebetween, and filling the module opening (814). A similar situation exists with regard to the thermosetting resin (868A) disposed upon and encapsulating the bottom surface of the metal layer (830), with intercoat (838), therebetween, and filling the module opening (812), and as illustrated in FIG. 8B a magnetic shielding layer (842) may also be disposed between the bottom surface of the metal layer 830 and the thermosetting resin (868A).

The process of coating with thermosetting resin, including filling the module opening, slit (if any), and any voids may be performed in multiple steps (passes), rather than in a single step. For example, as described in US 2022/0253661 (11 Aug. 2022: Daley et al.), The filling of the slitted area can be force cured at a higher temperature than the temperature where filling occurs. This filling process can be performed multiple times so that the filler material, in the event of shrinkage, completely fills the slit and results in a planar surface. Repeating the filling and curing process assists with a complete fill of the slit and can assist with providing a flush and level surface defined by the substrate and filled slit. Referring to FIG. 8C, the slit 18 can be filled with a resin 82. The resin can be applied in one process, allowed to cure, or partially cure and an additional resin applied in a second process.

The smartcard (SC: 600), which may also be referred to as a metal core transaction card, may comprise the following elements, and the following layers in the order shown. In this and other embodiments of smartcards disclosed herein, exemplary approximate thicknesses are presented for the various layers in the stack-up construction of the smartcard. Actual thicknesses may vary. Also, exemplary materials for the various layers of the various embodiments of smartcard constructions are disclosed herein.

- 600 smartcard (SC). The pre-lamination thickness of overall (all layers of) the card body (CB) may be approximately 810 µm. After lamination, the overall thickness of the card body (CB) may be approximately 790 µm.
- 610 transponder chip module (TCM) or inductive coupling chip module (ICM)
- 611 module antenna (MA)
- 605 top overlay layer (OL). The overlay layer may be laser engravable, and coated on one side (backside) with an adhesive coating. The thickness of the overlay layer may be 60µ m.
- 606 deposited ink
- 607 deposited primer. The combined thickness of the ink 606 and primer may be 8 µm.
- 608 transparent PVC print layer with printed artwork. The thickness of the print layer may be 125 µm.
- 643A adhesive layer (AL). The adhesive layer may comprise a thermosetting adhesive film layer (AL) which may be joined by way of press lamination of the front synthetic layer assembly (605, 606, 607, 608) to the top side of the encapsulated metal core (650?). An inter-coat layer (10 µm) may replace the adhesive film layer (25 µm)—thickness of the adhesive layer (AL): 25 µm
- 668A a layer of transparent thermosetting resin encapsulating (covering) the top side of the discontinuous metal core layer (DML: 650). The thickness of the thermosetting resin may be 40 µm.
- 628 inter-coat (an adhesion promoter in the form of a primer or an adhesive coating) applied to the top surface of the discontinuous metal core layer (DML: 650). The thickness of the inter-coat may be 10 µm.
- 650 metal core layer (ML, MCL), which may be a discontinuous metal layer (DML) with a laser-cut module opening (MO: 614) and slit (S: 620). The metal core layer may be stainless steel having a thickness of 304 µm (12 mils).
- 614 laser-cut module opening (MO: $P_2$)
- 616 metal edges around the laser-cut module opening (MO: 614)
- 620 slit in the discontinuous metal core layer (DML: 650)
- 638 inter-coat (an adhesion promoter in the form of a primer or an adhesive coating) applied to the bottom surface of the discontinuous metal core layer (DML: 650). The thickness of the inter-coat may be 10 µm.
- 668B a layer of transparent thermosetting resin encapsulating the bottom side of the discontinuous metal core layer (DML: 650) filling the laser-cut module opening (MO: 614) and the slit (S: 620). The thickness of the thermosetting resin may be 40 µm.
- 643B adhesive layer (AL). The adhesive layer may comprise a thermosetting adhesive film layer (AL) joining by way of press lamination the rear synthetic layer assembly to the bottom side of the encapsulated metal core layer, an inter-coat layer (10 µm) may replace the adhesive film layer (25 µm). The thickness of the adhesive layer (AL) may be 25 µm.
- 608 transparent PVC layer with printed artwork. The thickness of the print layer may be 125 µm.
- 607 deposited primer
- 606 deposited ink. The combined thickness of ink and primer may be 8 µm.
- 605 bottom overlay layer (OL) with magnetic stripe (not shown). The bottom overlay layer (OL) may be laser engravable, coated on one side (backside) with an adhesive coating. The thickness of the bottom overlay layer (OL) may be 60 µm.

FIG. 6B shows a smartcard (SC: 600) having a metal core, comprising three (3) main portions:

a top portion comprising front printed stock (605, 606, 607, 608)

a metal core; and a bottom portion comprising rear printed stock (608, 607, 606, 605).

Method and apparatus will be described.

The metal core portion of the smartcard comprises:
- a metal layer (ML: 650) which is a discontinuous metal layer (DML) having a module opening (MO: 614) and a slit (S: 620);
- thermosetting resin (TR: 668B) covering the bottom surface of the metal layer (ML) and filling the module opening and slit(S); and
- thermosetting resin (TR: 668A) covering the top surface of the metal layer (ML).

The layer of thermosetting resin on the bottom surface of the metal layer (and filling the module opening and slit), may be applied by a process of coating, over-molding, casting, reaction injection molding (RIM), or the like. In order to facilitate the process, a sacrificial layer (SL: 609) is applied on the top surface of the metal layer, covering the module opening (MO and slit(S), to retain the thermosetting resin in the module opening and slit, with a top surface of the thermosetting resin being substantially coplanar with the top surface of the metal layer. The sacrificial layer may comprise polytetrafluoroethylene (PTFE, Teflon®) or polyolefin backing film. The sacrificial layer will be removed after the thermosetting resin is sufficiently cured to remain in the module opening and slit, without leaking (bulging) out. Also, an inter-coat (638) is applied to the bottom surface of the metal layer to promote adhesion of the thermosetting resin and the metal layer.

The layer of thermosetting resin on the top surface of the metal layer may be applied by a process of coating, over-molding, casting, reaction injection molding (RIM) or the like, with the sacrificial layer in place (in situ).

Regarding the processes of applying the thermosetting resin on the top and bottom surfaces of the metal layer, injection molding is a problem because of the high temperature and pressure required. Other processes, such as Reaction Assisted Molding Process (RAMP) may be suitable. RAMP is already being used to encapsulate electronics into smart cards without requiring the traditional layering manufacturing process. Reference may be made to https://www.plasticsnet.com/doc/first-reaction-injection-molding-now-reaction-0001

This results in a "metal core" component (between the dashed lines "a" and "b") comprising a metal layer coated on both of its top and bottom surfaces by thermosetting resin, and having the module opening and slit filled with thermosetting resin. (The sacrificial layer is part of the process, is removed, and is not part of the resulting metal core.)

In this, and other embodiments having a metal layer coated (encapsulated) by thermosetting resin, if the metal layer is stainless steel, an inter-coat in the form of an adhesion promoter such as a primer or thermosetting adhesive coating may be applied to the surfaces of the metal layer being encapsulated.

In this, and other embodiments, the metal layer, may benefit from mechanical and/or chemical surface preparation such as cleaning and dichromate treatment, sanding, sandblasting (or similar abrasive cleaning process), and/or ultra ultrasonic cleaning, particularly if the metal layer is stainless steel.

In this, and other embodiments having a metal layer coated (encapsulated) by thermosetting resin, the method of encapsulating may comprise coating, open cast molding, vacuum or pressure casting, over-molding, compression molding, reaction injection molding (RIM), reaction assisted molding process, and the like.

The thermosetting resin layers are cured.

A sacrificial layer on the top surface of a metal layer being encapsulated from the bottom side ensures that the thermosetting resin fills the module opening (and slit, if there is one), and will be flush with the top surface of the thermosetting resin encapsulated metal layer. The sacrificial layer may be removed before further process steps are performed, such as milling the filled module opening(s) to accept insertion of the transponder chip module (TCM).

The module opening, filled with thermosetting resin, may then be machined (milled) to accept insertion of a module (TCM, ICM). The module opening may be slightly larger than the module, so that the module does not contact the sides of the module opening of the metal layer. Also, the module will rest upon the thermosetting resin (668B). To enhance the machinability of resin encapsulated metal layers, polyurethanes with a hardness above 80 Shore A are recommended.

In a subsequent fabrication step, the front printed stock and rear printed stock may be laminated with elevated pressure and temperature to the metal core, with the module implanted after lamination.

FIG. 6C shows a typical module, which may be a transponder chip module (TCM) or an inductive coupling module (ICM). The module typically has a front portion supporting contact pads (CP) on the front surface of a module tape (MT) and a module antenna (MA) on the rear surface of the module tape, and has a rear portion supporting and encapsulating an integrated circuit (IC) chip.

The front portion of the module is typically larger (in area) than the rear portion of the module. A module opening (or openings) in layers of the smartcard may be "stepped", having an upper "P1" portion sized to receive the front (contact pads) portion of the module. A rear "P2" portion of the module opening may be sized to receive the rear (chip) portion of the module.

The terms "P1" and "P2" are used in FIG. 6C to identify the portions of the transponder chip module (TCM) corresponding with the "P1" and "P2" portions of a single, stepped module opening (refer, for example, to FIG. 6B). In embodiments having two metal layers (refer, for example, to FIGS. 7B, 8B), a larger "P1" opening may be formed in the upper (front face) metal layer, and a smaller "P2" opening may be formed in the lower (supporting) metal layer.

The "P1" opening in the upper metal layer is aligned above (atop) the "P2" opening in the lower metal layer.

The dimension of the front portion of the module may be 13.2×12.0 mm. The dimensions of a "P1" module opening (or portion of a stepped module opening) accepting the front portion of the module may be 13.7×12.5 mm. The depth (Z-height) of the P1 cavity is typically 0.195 mm The dimension of the rear portion of the module may be 9.4×8.4 mm. The dimensions of a "P2" module opening (or portion of a stepped module opening) accepting the rear portion of the module may be 9.8×8.8 mm. The depth (Z-height) of the P2 cavity is typically 0.65 mm A separation channel between the metal edges of the module opening in the front face metal layer and the upper ("P1") portion of the chip module may be 0.25 mm on all (four) sides.

By having the module openings (and portions thereof) in the metal layer(s) larger than the corresponding portions of the module, this allows for thermosetting resin to "insulate" the module from the metal layer(s). In all of the embodiments, a separation channel of approximately 0.25 mm may be established between the module and the metal layer.

In FIG. 6C, well-known details of the module construction are omitted. For example, the module antenna (MA) on the bottom surface of the module tape is omitted, and connections of the IC chip to the module antenna and contact pads are also omitted. More detailed descriptions of the module construction may be found, for example, in US 2015/0021403 (22 Jan. 2015), US 2015/0136858 (21 May 2015) and US 2016/0110639 (21 Apr. 2016). The "generic" module shown in FIG. 6C is intended to be representative of modules wherein the IC chip is flip-chip connected with conductive pads and traces on the underside of the module tape (with underfiller therebetween), or the IC chip is wire-bond connected with conductive pads and traces on the underside of the module tape (and covered by a "glob-top" mold mass or encapsulant).

FIG. 7A shows a metal face smartcard (SC: 700) having different layers in the stack-up construction, comprising:
- a front face (discontinuous) metal layer (ML, DML, FML: 730) encapsulated on its rear side with thermosetting resin (768A) acting as a dielectric medium and further filling a laser-cut module opening (MO: 712, P1) and a slit (S: 720A) in the front face metal layer (FML: 730), and
- a supporting (discontinuous) rear metal layer (ML, DML, RML: 750) encapsulated on its rear side with thermosetting resin (768B) and further filling a laser-cut module opening (MO: 714, P2) and a slit (S: 720B) in the supporting metal layer (RML: 750).

A transponder chip module (TCM/ICM: 710) is implanted in the resin filled laser-cut module opening (MO: 712) in the front face metal layer (FML: 730). The module antenna (MA: 711) of the module may inductively couple with the slit (S: 720B) and module opening (MO: 714) in the supporting (discontinuous) metal layer (RML: 750).

The front face discontinuous metal layer (DML: 730) has a straight or shaped slit (S: 720A) extending from (starting at) a perimeter edge of the discontinuous metal layer and ending at the laser-cut module opening (MO: 712). The module opening in the front face metal layer is sufficiently large to accept the "P1" dimension of the module which will be inserted (implanted) therein. The front face discontinuous metal layer (FML: 730) may be coated with a primer (727), followed by the selective application of ink (726) to print a filigree pattern and graphic elements on the metal surface, with the printed artwork protected by a coating of hard ink (725) and varnish (724). On top thereof, raised (embossed) characters (723) above the surface of the card may be digitally printed.

The front face discontinuous metal layer (FML: 730) with a straight or shaped slit (S: 720A) is mechanically reinforced by an underlying supporting metal layer (RML: 750) with a slit (720B) which is offset from the slit (720A) in the front face discontinuous metal layer (FML: 730). The supporting metal layer (RML: 750) is electrically separated from the front face metal layer by a layer of thermosetting resin (768A), epoxy or polyurethane, bonded by means of an upper inter-coat (738) and lower adhesive coat (743) to bond both of the (front face (730), supporting (750)) metal layers together. The straight or shaped slit (720A) and the laser-cut module opening (MO: 712) in the front face metal layer (FML: 730) may be filled with the thermosetting resin (768A) prior to assembly with the supporting metal layer. The underside of the supporting metal layer (RML: 750) is also encapsulated with a thermosetting resin (768B) which coats the bottom side of the metal layer and fills the laser-cut module opening (MO: 714) and slit (S: 720B). The encapsulated front and supporting metal layers (730, 750) may be laminated together via an adhesive layer (743A).

The construction of the smartcard 700 has been briefly described hereinabove, and comprises a number of layers. The stack-up (construction) of the smartcard is now described. Generally, the layers may be described starting with the front face metal layer with slit, and working both up (towards the front face of the card) and down (towards the rear face of the card) therefrom. Some details, which have already been described elsewhere, may be omitted from this description, for the sake of brevity. For descriptive purposes each layer may have a front surface and a rear surface.

- 700 smartcard (SC) or metal transaction card pre-lamination thickness of card body: ~823 µm
- 710 transponder chip module/inductive coupling chip module (TCM/ICM)
- 711 module antenna (MA)
- 723 raised characters-post lamination varnish (PLV)
- 724 laser reactive, protective gloss or matte coating
- 725 a transparent coat of rigid ink (hard coat) for scratch protection applied over the graphic print layer (726), such as by means of digital printing
- 726 graphic print layer-deposited ink (color)
- 727 deposited primer. Combined thickness of the laser reactive, transparent hard coat, deposited ink and primer, approximately: 45 µm
- 776 laser markings on the protective coating (724)

Alternative Option
- 728 powder coating, decorative finish, PVD or DLC coating replacing the deposited primer (727), graphic print layer (726) and the transparent hard coat (725)
- 730 front metal layer (ML, FML), which may be a front face discontinuous metal layer (DML) with a laser-cut module opening (MO: 712) with metal edges (713) and a slit (720A)—thickness of the front metal layer: 304 µm stainless steel (12 mils)
- 712 laser-cut module opening (MO: $P_1$)
- 713 metal edges around the laser-cut module opening (MO: 712)
- 720A slit in the front face discontinuous metal layer (DML: 730)
- 738 inter-coat (an adhesion promoter in the form of a primer or an adhesive coating) applied to the backside surface of the front face discontinuous metal layer (DML: 730)—thickness of the inter-coat: 10 µm
- 768A a layer of transparent thermosetting resin encapsulating the bottom side of the front face discontinuous metal layer (DML: 730) filling the laser-cut module opening (MO: 712) and the slit (S: 720A)—thickness of the thermosetting resin: 40 µm
- 743A adhesive layer (AL), a thermosetting adhesive film layer (AL) joining by way of press lamination the front metal layer subassembly to the rear metal layer subassembly, an inter-coat layer (10 µm) may replace the adhesive layer (25 µm)—thickness of the adhesive layer (AL): 25 µm
- 750 rear metal layer (ML, RML), which may be a supporting discontinuous metal layer (DML) with a laser-cut module opening (MO: 714) and a slit (S: 720B)—thickness of the rear metal layer: 152 µm stainless steel (6 mils)
- 714 laser-cut module opening (MO: $P_2$)
- 716 metal edges around the laser-cut module opening (MO: 714)
- 720B slit in the rear discontinuous metal layer (DML: 750)
- 748 inter-coat (an adhesion promoter in the form of a primer or an adhesive coating) applied to the top surface of the rear discontinuous metal layer (DML: 750)—thickness of the inter-coat: 10 μm

768B a layer of thermosetting resin encapsulating the topside of the discontinuous metal layer (DML: 750) filling the laser-cut module opening (MO: 714) and the slit (S: 720)—thickness of the thermosetting resin: 40 μm

743B adhesive layer (AL), a thermosetting adhesive film layer (AL), an inter-coat layer (10 μm) may replace the adhesive layer (25 μm)—thickness of the adhesive layer (AL): 25 μm

760 graphic print layer (GPL), which may be a synthetic layer (PVC)—thickness of the graphic print layer: 125 μm

764 offset ink layer-lithographic printing-thickness of the printed ink: 16 μm

770 overlay layer (OL), which functions as a protective film—thickness of the overlay layer: 60 μm

774 magnetic stripe mounted to the rear overlay layer (770)

776 laser markings on the protective film (770)

FIG. 7B shows a smartcard (SC: 700) having a metal face, comprising the following main portions:

a top protective portion comprising hard coat, ink and primer (723, 724, 725, 726, 727)

a front face metal portion;

a supporting metal portion; and a bottom portion comprising rear printed stock (760, 764, 770).

Method and apparatus will be described.

The front face metal portion of the smartcard, between the dashed lines "a" and "b" comprises:

a metal layer (ML: 730) which is a discontinuous metal layer (DML) having a module opening (MO: 712, P1) and a slit (S: 720A);

an inter-coat (738) covering the bottom surface of the metal layer (ML); and thermosetting resin (TR: 768A) covering the inter-coat (738) on the bottom surface of the metal layer (ML) and filling the module opening (MO) and slit(S).

The layer of thermosetting resin on the bottom surface of the metal layer (730), and filling the module opening and slit, may be applied by a process of coating, over-molding, casting, reaction injection molding (RIM), or the like. In order to facilitate the process, a sacrificial layer (SL: 709A) is applied on the top surface of the metal layer (730), covering the module opening (MO) and slit(S), to retain the thermosetting resin in the module opening and slit, with a top surface of the thermosetting resin being substantially coplanar with the top surface of the metal layer. The sacrificial layer may comprise polytetrafluoroethylene (PTFE, Teflon® or polyolefin backing film. The sacrificial layer will be removed after the thermosetting resin is sufficiently cured to remain in the module opening and slit, without leaking (bulging) out. The inter-coat (738) applied to the bottom surface of the metal layer promotes adhesion of the thermosetting resin (768A) and the metal layer (730).

The supporting metal portion of the smartcard comprises:

a metal layer (ML: 750) which is a discontinuous metal layer (ML, DML) having a module opening (MO: 714, P2) and a slit (S: 720B);

an inter-coat (748) covering the bottom surface of the discontinuous metal layer; and thermosetting resin (TR: 768B) covering inter-coat (738) on the bottom surface of the discontinuous metal layer and filling the module opening and slit.

The module opening (714) in the "lower" supporting metal layer (750) is aligned (such as, but not necessarily concentric) with the module opening (712) in the "upper" front face metal layer (730). The module opening (712) is sized ("P1") to receive the larger, front portion (with contact pads) of the chip module, and the module opening (714) is sized ("P2") to receive the smaller, rear portion (with IC) of the chip module. Refer to FIG. 6C. The "P1" and "P2" openings are "over-sized"-such as 0.4 or 0.5 mm larger than the corresponding portion of the chip module received therein-so that after milling the thermosetting resin from inside the module openings, a thin (0.2 or 0.25 mm thick layer of thermosetting resin will remain between the respective portion of the chip module and module opening in the corresponding metal layer. This may also apply to the comparable module openings (812 and 814) in the metal layers (830 and 850) FIG. 8 embodiment, described below. For the single module opening (614) in the single metal layer (650) embodiment of FIG. 6, the module opening (614) may be "stepped", having a larger upper "P1" portion disposed atop and aligned with and a smaller lower "P2" portion.

The layer of thermosetting resin on the bottom surface of the metal layer (750), and filling the module opening and slit, may be applied by a process of coating, over-molding, casting, reaction injection molding (RIM), or the like. In order to facilitate the process, a sacrificial layer (SL: 709B) is applied on the top surface of the metal layer (750), covering the module opening (MO) and slit(S), to retain the thermosetting resin in the module opening and slit, with a top surface of the thermosetting resin being substantially coplanar with the top surface of the metal layer.

The sacrificial layer may comprise polytetrafluoroethylene (PTFE, Teflon®) or polyolefin backing film. The sacrificial layer will be removed after the thermosetting resin is sufficiently cured to remain in the module opening and slit, without leaking (bulging) out. The inter-coat (748) applied to the bottom surface of the metal layer promotes adhesion of the thermosetting resin (768B) and the metal layer.

Regarding the processes of applying the thermosetting resin on the bottom surfaces of the metal layers (730, 750), injection molding is a problem because of the high temperature and pressure required. Other processes, such as Reaction Assisted Molding Process (RAMP) may be suitable. RAMP is already being used to encapsulate electronics into smart cards without requiring the traditional layering manufacturing process. Reference may be made to https://www.plasticsnet.com/doc/first-reaction-injection-molding-now-reaction-0001

This results in a front face metal component (between the dashed lines "a" and "b") comprising a metal layer (730) coated on its bottom surface by thermosetting resin, and having the module opening and slit filled with thermosetting resin. (The sacrificial layer 709A is part of the process, is removed before laminating, and is not part of the resulting front face metal component.)

This results in a supporting metal component (between the dashed lines "c" and "d") comprising a metal layer (750) coated on its bottom surface by thermosetting resin, and having the module opening and slit filled with thermosetting resin. (The sacrificial layer 709B is part of the process, is removed, and is not part of the resulting front face metal component.)

The thermosetting resin layers are cured.

The supporting metal component (between the dashed lines "c" and "d") is disposed behind the front face metal component (between the dashed lines "a" and "b") and may be joined thereto with an adhesive layer 743A (between the dashed lines "b" and "c") using a process such as press lamination.

The module openings (712, P1) and (714, P2), filled with thermosetting resin, may then be machined (milled) to accept insertion of a module (TCM, ICM). The module opening may be slightly larger than the module, so that the module does not contact the sides of the module opening of the metal layer. Also, the module will rest upon the thermosetting resins (768A, 768B).

The module typically has a front portion supporting contact pads on its front surface and a module antenna on its rear surface, and has a rear portion supporting the chip. The front portion of the module is typically larger (in area) than the rear portion of the module. The "P1" opening in the front face metal layer (730) is sized to receive the front (contact pads) portion of the module. The "P2" opening in the supporting metal layer (750) is sized to receive the rear (chip) portion of the module.

In a subsequent fabrication step, the front printed stock and rear printed stock may be laminated with elevated pressure and temperature to the upper and lower encapsulated metal layers, with the module implanted after lamination.

FIG. 8A—Metal face Transaction Card with Booster Antenna Circuitry

Generally, the smartcard 800 comprises two metal layers, a front face continuous metal layer (ML, CML: 830) which has a module opening (MO: 812) and no slit, and a supporting discontinuous metal layer (ML, DML: 850) having a module opening (MO: 814) and a slit (S: 820). A magnetic shielding layer (842) is disposed beneath the front face continuous metal layer, and attached thereto via an inter-coat layer (838).

Thermosetting resin (TR: 868A) covers the back surface of the front face continuous metal layer (and magnetic shielding layer, and also fills the module opening (812).

Thermosetting resin (TR: 868B) covers the back surface of the underlying, supporting discontinuous metal layer, and also fills the module opening (814) and slit (820).

A booster antenna circuit (BAC: 844) is mounted via an adhesive layer (843) to the magnetic shielding layer (842).

The thermosetting resin can be used to create a separation layer in lieu of an Adhesive Spacing Layer (ASL) or in combination thereof to distance the booster antenna circuit from the magnetic shielding layer. This distance should be 50 µm or greater to achieve optimum shielding and RF functionality.

The booster antenna circuit may be attached by means of an inter-coat to the rear discontinuous metal layer having its underside encapsulated with a thermosetting resin which further fills the laser-cut module opening and slit in the discontinuous metal layer, and the magnetic shielding layer with a void attached by means of an inter-coat to the front face continuous metal layer encapsulated with a thermosetting resin which further fills the void in the magnetic shielding layer and the laser-cut module opening in the continuous metal layer, with the adhesive spacing layer joining by way of press lamination the subassembly of the front face continuous metal layer with the attached magnetic shielding layer, to the subassembly of the rear discontinuous metal layer with the attached booster antenna circuit The following elements may be shown and described in FIG. 8A and may correspond with similarly numbered elements in FIG. 7A (e.g., 8nn may correspond with 7nn):

- 800 smartcard (SC) or metal transaction card pre-lamination thickness of card body: 849 µm
- 810 transponder chip module/inductive coupling chip module (TCM/ICM)
- 811 module antenna (MA)
- 823 raised characters-post lamination varnish (PLV)
- 824 laser reactive, protective gloss or matte coating
- 825 a transparent coat of rigid ink (hard coat) for scratch protection applied over the graphic print layer (826), such as by means of digital printing
- 826 graphic print layer-deposited ink (color)
- 827 deposited primer Combined thickness of the laser reactive, transparent hard coat, deposited ink and primer, approximately: 45 µm
- 876 laser markings on the protective coating (824)

Alternative Option

- 828 powder coating, decorative finish, PVD or DLC coating replacing the deposited primer (827), graphic print layer (826) and the transparent hard coat (825)
- 830 front (face) metal layer (ML, FML), which may be a continuous metal layer (CML) with a laser-cut module opening (MO: 812) with metal edges (813)—thickness of the front metal layer: 203 µm stainless steel (8 mils)
- 812 laser-cut module opening (MO: $P_1$)
- 813 metal edges around the laser-cut module opening (MO: 812)
- 838 inter-coat (an adhesion promoter in the form of a primer or an adhesive coating)—thickness of the inter-coat: 10 µm
- 842 magnetic shielding layer (MSL) with a void-thickness of the magnetic shielding layer: 65 µm
- 868A a layer of thermosetting resin encapsulating the magnetic shielding layer (MSL: 842) and filling the void in the magnetic shielding layer and the laser-cut module opening (MO: 812)—thickness of the thermosetting resin: 40 µm
- 843 adhesive spacing layer (ASL), a layer of thermosetting adhesive film joining by way of press lamination the top subassembly to the bottom subassembly—thickness of the adhesive spacing layer: 25 µm
- 844 booster antenna circuit (BAC) on a PET carrier layer (23 µm) having plated copper tracks and antenna circuitry on both sides (18 µm)—thickness of booster antenna circuit: 23 µm, assuming the copper tracks sink into the 25 µm adhesive layers
- 844A perimeter coil (PC)
- 844B PET (polyethylene terephthalate) carrier layer
- 844C coupler coil (CC)
- 844D capacitor bank
- 848 inter-coat (an adhesion promoter in the form of a primer, an adhesive coating or an adhesive film) with a thickness to insulate the copper plated tracks and circuitry on the PET carrier layer from the rear metal layer (ML, RML): 25 µm
- 850 rear metal layer (ML, RML), which may be a discontinuous metal layer (DML) with a laser-cut module opening (MO: 814) and a slit (S: 820)—thickness of the rear metal layer: 152 µm stainless steel (6 mils)
- 814 laser-cut module opening (MO: $P_2$)
- 816 metal edges around the laser-cut module opening (MO: 814)
- 820 slit in the discontinuous metal layer (DML: 850)
- 858 top inter-coat (an adhesion promoter in the form of a primer or an adhesive coating)—thickness of the inter-coat: 10 µm
- 868B a layer of thermosetting resin encapsulating the underside (backside) of the discontinuous metal layer (DML: 850) filling the laser-cut module opening (MO: 814) and the slit (S: 820)—thickness of the thermosetting resin: 40 μm

858 bottom inter-coat (an adhesion promoter in the form of a primer, an adhesive coating or an adhesive film)—thickness of the inter-coat: 10 μm

860 graphic print layer (GPL), which may be a synthetic layer (PVC)—thickness of the graphic print layer: 125 μm

862 primer

864 deposited ink (color)—combined thickness of primer and ink: 16 μm

870 overlay film or layer (OL), which functions as a protective film-thickness of the overlay layer: 60 μm

874 magnetic stripe mounted to the rear overlay layer (870)

876 laser markings on the protective film (870)

FIG. 8A shows the stack-up construction of a dual interface metal face smartcard (SC: 800) with contactless "tap to pay" function operating from the rear side of the card body (CB) with two metal layers, one continuous (CML: 830) and the other discontinuous (DML: 850), sandwiching a booster antenna circuit (BAC: 844) mounted to a magnetic shielding layer (MSL: 842) using an adhesive spacing layer (ASL: 843), with the booster antenna circuit (BAC: 844) attached by means of an inter-coat (848) to the rear discontinuous metal layer (DML: 850) having its underside encapsulated with a thermosetting resin (868B) which further fills the laser-cut module opening (MO: 814) and slit (S: 820) in the discontinuous metal layer (DML: 850), and the magnetic shielding layer (MSL: 842) with a void attached by means of an inter-coat (838) to the front face continuous metal layer (CML: 830) encapsulated with a thermosetting resin (868A) which further fills the void in the magnetic shielding layer (MSL: 842) and the laser-cut module opening (MO: 812) in the continuous metal layer (CML: 830), with the adhesive spacing layer (ASL: 843) joining by way of press lamination the subassembly of the front face continuous metal layer with the attached magnetic shielding layer, to the subassembly of the rear discontinuous metal layer with the attached booster antenna circuit.

The adhesive spacing layer 25 μm (ASL: 843) and the encapsulation (868A) over the magnetic shielding layer 40 μm (MSL: 842) provides a gap of 65 μm between the booster antenna circuit (844) and the magnetic shielding layer (MSL: 842), thus improving the contactless communication in terms of activation distance.

The front face solid metal layer (CML: 830) is continuous metal layer with no discontinuity. The rear metal interlayer (DML: 850) is a discontinuous metal layer having a laser module opening (MO: 814) and a slit (S: 820) to function as a coupling frame for contactless communication. The laser-cut module opening (MO: 814) accepts the placement of a transponder chip module (TCM: 810) with its module antenna (MA: 811) inductively coupling with the coupler coil (CC: 844C) of the booster antenna circuit (BAC: 844) and overlapping the laser-cut module opening (MO: 814) and slit (S: 820) in the rear metal layer (DML: 850). The dimensional arrangement of the module antenna (MA: 811), coupler coil (CC: 844C) and laser-cut module opening (MO: 814) is one of concentricity.

The stack-up construction of the card body (CB) 800 (smartcard (SC) or transaction card (TC)) with a front face continuous metal layer without a discontinuity and a rear discontinuous metal layer with a discontinuity may comprise the following layers (all dimensions and parameters are exemplary and approximate):

810: Dual-interface transponder chip module (TCM) or inductive coupling chip module (ICM)

812: Laser-cut module opening (MO: $P_1$) with metal edges (813) in the front face metal layer (CML: 830) without a slit

814: Laser-cut module opening (MO: $P_2$) with metal edges (816) in the rear metal layer (DML: 850) with a slit (S: 820)

876: Operation of laser marking the laser reactive protective layer (824) with personalization data

824: Laser reactive protective layer (10 μm)—a hard top-coat lamination film or a deposited coating (ink, varnish, enamel, lacquer or a polymer as a matte or gloss finish) which can be laser marked or laser engraved

825: Optionally a hard coat layer of rigid ink for scratch protection (10 μm) as opposed to stretchable ink used in the deposition of the graphic print layer (826)

826: A print layer (35 μm) which may comprise: (i) a digital, silk screen, lithographic or thermo-graphic layer of clear or colored ink, (ii) a baked-on-ink layer, (iii) a PVD or DLC coating, or (iv) a combination thereof, including an adhesion promoter or primer applied between the metal layer (CML: 830) and subsequent print/coating layers

830: Front face metal layer without a slit ("continuous"), which may have the graphic print layer (826) disposed on it. A typical thickness for this metal layer may be 203 μm (8 mils)

838: Inter-coat (10 μm), an adhesion promoter in the form of a primer or an adhesive coating, attaching the magnetic shielding layer with void (MSL: 842, ferrite or non-ferrite material) to the front face continuous metal layer (CML: 830)

842: High permeability magnetic shielding layer (MSL) with void having a thickness of 50 μm, 65 μm, 75 μm or 100 μm which may compose of the following: calcium carbonate ($CaCO_3$), silicon dioxide ($SiO_2$), magnesium fluoride ($MgF_2$), SiO2, chromium (Cr) and iron (Fe), to offset the effects of electromagnetic shielding caused by the front face metal layer (CML: 830) and having a booster antenna circuit (BAC: 844) assembled to its face downside by means of an adhesive spacing layer (ASL: 843)

868A: Thermosetting resin 40 μm (epoxy or polyurethane) encapsulating the magnetic shielding layer (MSL: 842) and filling the void in the magnetic shielding layer and the laser-cut module opening (MO: 812)

843: Adhesive spacing layer (ASL: 25 μm), a layer of thermosetting adhesive film joining by way of press lamination the top subassembly to the bottom subassembly 844: Open or closed loop booster antenna circuit (chemically etched copper tracks, plated copper tracks, conductive printed tracks or equivalent) attached to the high permeability magnetic shielding layer (MSL: 842), low magnetic loss ferrite layer (50 μm, 65 μm, 75 μm or 100 μm in thickness) by means of an adhesive spacing layer (ASL: 843) (50 μm), with the booster antenna circuit (BAC) comprising of a perimeter coil (844A), a coupler coil (844C) and a set of parallel plate trimming capacitors (844D, capacitor bank for tuning), with the booster antenna circuitry (BAC) being assembled on a PET carrier layer (844B, 23 μm) having a top antenna layer (perimeter coil with 10-13 windings (copper track width: 150-300 μm, spacing between tracks: 100 μm, copper track thickness: 18 μm), vertical interconnects and the upper capacitor plate electrodes) with said top antenna layer facing the magnetic shielding layer (MSL: 842), and having a bottom antenna layer (coupler coil (844C) with 10-15 windings (copper track width: 100-150 μm, spacing between tracks: 100 μm, copper track thickness: 18 μm), connection jumpers and the lower capacitor plate electrodes) with said bottom antenna layer facing the rear metal layer (DML: 850) acting as a one turn (RLC) antenna circuit The arrangement of the perimeter coil (844A) and the coupler coil (844C) on the PET carrier layer (844B) being respectively positioned on the top and bottom surfaces thereof may be interchanged or portions of their antenna structures may be located on both sides of the carrier layer

848: Inter-coat 25 μm, an adhesion promoter in the form of a primer, an adhesive coating or an adhesive film with a thickness to insulate the copper plated tracks and circuitry on the PET carrier layer (844B) from the rear metal layer (DML: 850)

850: Rear discontinuous metal layer (DML) with a laser-cut module opening (MO: 814) and a slit (S: 820) having a thickness of approximately 152 μm (6 mils) is attached to the rear synthetic layers by an inter-coat 858

858: Top inter-coat 10 μm, an adhesion promoter in the form of a primer or an adhesive coating, applied to underside (backside) of the rear discontinuous metal layer (DML: 850)

868B: Thermosetting resin 40 μm (epoxy or polyurethane) encapsulating the underside of the discontinuous metal layer (DML: 850) filling the laser-cut module opening (MO: 814) and the slit (S: 820)

858: Bottom inter-coat 10 μm, an adhesion promoter in the form of a primer, an adhesive coating or an adhesive film, attaching the encapsulated rear metal layer (DML: 850) to the top side of the synthetic layer (860)

860: Transparent, translucent, white or colored synthetic layer (e.g. PVC, PC, PETG), typically having a thickness of 125 μm

862 primer

864 ink (printed information (PI)), typically having a combined thickness of 16 μm; The position of 862 and 864 may be interchangeable depending on the printing process.

870: Laser engravable overlay layer (PVC) typically having a thickness of 60 μm

874: Magnetic stripe mounted to the rear overlay layer 870

876: Operation of laser marking to the rear overlay layer 870 with personalization data. Security elements (signature panel and hologram) are not shown.

FIG. 8B shows a smartcard (SC: 800) having a booster antenna circuit (BAC), comprising the following main portions:
 a top protective portion comprising hard coat, ink and primer (823, 824, 825, 826, 827)
 a front face metal portion;
 a supporting metal portion; and
 a bottom portion comprising rear printed stock (860, 862, 864, 870).

The smartcard (SC: 800) is a metal face smartcard similar to the metal face smartcard having two discontinuous metal layers which was shown in FIGS. 7A, 7B.

Method and apparatus will be described.

The front face metal portion of the smartcard, between the dashed lines "a" and "b" comprises:
 a metal layer (ML: 830) which is a continuous metal layer (ML, CML) having a module opening (MO: 812, $P_1$). The metal layer 830 does not have a slit (compare 720A);
 magnetic shielding material (842) disposed below the metal layer (ML);
 an inter-coat (838) disposed between the bottom surface of the metal layer (ML) and the magnetic shielding material;
 thermosetting resin (TR: 868A) covering inter-coat (738) on the bottom surface of the metal layer (ML) and filling the module opening (MO) and slit(S).

The magnetic shielding material (842) may be a layer of ferrite or non-ferrite material having a void corresponding with the module opening (MO: 812) in the metal layer (830) and prevents the continuous metal layer from attenuating radio frequency (RF) signals passing between the card and an external reader (such as a POS terminal) when the back of the card is presented to the reader.

The thermosetting resin (868A) may be applied to the magnetic shielding layer (842) with or without a primer. Alternatively, the magnetic shielding layer (842) may be disposed below the thermosetting resin (868A), rather than above it (as shown). Alternatively, the magnetic shielding layer (842) may be disposed on the adhesive layer (843) (between dashed lines "b" and "c"), rather than above or below the thermosetting resin (868A).

The layer of thermosetting resin on the bottom surface of the continuous metal layer (830), and filling the module opening, may be applied by a process of coating, over-molding, casting, reaction injection molding (RIM), or the like. In order to facilitate the process, a sacrificial layer (SL: 809A) is applied on the top surface of the continuous metal layer (830), covering the module opening (MO), to retain the thermosetting resin in the module opening, with a top surface of the thermosetting resin being substantially coplanar with the top surface of the metal layer. The sacrificial layer may comprise polytetrafluoroethylene (PTFE, Teflon®) or polyolefin backing film. The sacrificial layer will be removed after the thermosetting resin is sufficiently cured to remain in the module opening, without leaking (bulging) out. The inter-coat (838) applied to the bottom surface of the metal layer promotes adhesion of the thermosetting resin (868A) and the magnetic shielding material (842) on the back side of the continuous metal layer (730).

The supporting metal portion of the smartcard, between the dashed lines "c" and "d" may be the same as the supporting metal portion shown in FIG. 7B, and comprises:
 a metal layer (ML: 850) which is a discontinuous metal layer (ML, DML) having a module opening (MO: 814, $P_2$) and a slit (S: 820);
 an inter-coat (858) covering the bottom surface of the discontinuous metal layer; and thermosetting resin (TR: 868B) covering the inter-coat (858) on the bottom surface of the discontinuous metal layer and filling the module opening and slit.

The layer of thermosetting resin on the bottom surface of the metal layer (850), and filling the module opening and slit, may be applied by a process of coating, over-molding, casting, reaction injection molding (RIM), or the like. In order to facilitate the process, a sacrificial layer (SL: 809B) is applied on the top surface of the metal layer (850), covering the module opening (MO) and slit(S), to retain the thermosetting resin in the module opening and slit, with a top surface of the thermosetting resin being substantially coplanar with the top surface of the metal layer.

The sacrificial layer may comprise polytetrafluoroethylene (PTFE, Teflon® or polyolefin backing film. The sacrificial layer will be removed after the thermosetting resin is sufficiently cured to remain in the module opening and slit, without leaking (bulging) out. The inter-coat (858) applied to the bottom surface of the metal layer promotes adhesion of the thermosetting resin (868B) and the metal layer.

Regarding the processes of applying the thermosetting resin on the bottom surfaces of the metal layers (830, 850), injection molding is a problem because of the high temperature and pressure required. Other processes, such as Reaction Assisted Molding Process (RAMP) may be suitable. RAMP is already being used to encapsulate electronics into smart cards without requiring the traditional layering manufacturing process. Reference may be made to https://www.plasticsnet.com/doc/first-reaction-injection-molding-now-reaction-0001

This results in a front face metal component (between the dashed lines "a" and "b") comprising a metal layer (830) coated on its bottom surface by thermosetting resin (and with magnetic shielding material), and having the module opening filled with thermosetting resin. (The sacrificial layer 809A is part of the process, is removed before laminating, and is not part of the resulting front face metal component.)

This results in a supporting metal component (between the dashed lines "c" and "d") comprising a metal layer (850) coated on its bottom surface by thermosetting resin, and having the module opening and slit filled with thermosetting resin. (The sacrificial layer 709B is part of the process, is removed, and is not part of the resulting front face metal component.)

The thermosetting resin layers are cured.

In FIG. 7B, an adhesive layer (743A) between the dashed lines "b" and "c" is disposed between the front face metal component (between the dashed lines "a" and "b") and the supporting metal component (between the dashed lines "c" and "d").

In FIG. 8B, a booster antenna circuit (BAC: 844) is disposed is disposed between the front face metal component (between the dashed lines "a" and "b") and the supporting metal component (between the dashed lines "c" and "d"). An adhesive layer (843) may be disposed on a front (top) surface of the booster antenna circuit. A layer (848) of adhesive and inter-coat may be disposed on a back (bottom) surface of the booster antenna circuit.

The supporting metal component (between the dashed lines "c" and "d"), front face metal component (between the dashed lines "a" and "b") and may be joined with the layers of adhesive and inter-coat using a process such as press lamination.

The module openings (812, P1) and (814, P2), filled with thermosetting resin, may then be machined (milled) to accept insertion of a module (TCM, ICM). The module opening may be slightly larger than the module, so that the module does not contact the sides of the module opening of the metal layer. Also, the module will rest upon the thermosetting resins (868A, 868B).

The module typically has a front portion supporting contact pads on its front surface and a module antenna on its rear surface, and has a rear portion supporting the chip. The front portion of the module is typically larger (in area) than the rear portion of the module. The "P1" opening in the front face metal layer (830) is sized to receive the front (contact pads) portion of the module. The "P2" opening in the supporting metal layer (850) is sized to receive the rear (chip) portion of the module.

In a subsequent fabrication step, the front printed stock and rear printed stock may be laminated with elevated pressure and temperature to the upper and lower encapsulated metal layers, with the module implanted after lamination.

FIG. 8C shows the stack-up construction of the subassembly (between dashed lines "a" and "b") as depicted in FIG. 8B, comprising a sacrificial layer (SL: 809A) of polyolefin backing film, a front (continuous) metal layer (FML: 830) with an array (16-up format) of card body sites with a laser-cut module opening (MO: 812) wherein each card body site is supported by metal struts with laser-cut void sections between struts: an inter-coat layer (838) acting as an adhesion promoter in the form of a primer or an adhesive coating bonding the front metal layer (FML: 830) to an underlying magnetic shielding layer (MSL: 842): the magnetic shielding layer (MSL: 842) having an array of card body sites (16-up) with a module opening (void) wherein at each site in the array the shielding material is supported by side struts with void sections between the struts; and the assembly is encapsulated with thermosetting resin (868A) with the voids filled with resin, applied by a method of pressure molding, coating, reaction injection molding, or any similar production technique.

FIG. 8D shows the stack-up construction of the subassembly (between dashed lines "c" and "d") as depicted in FIG. 8B, comprising a sacrificial layer (SL: 809B) of polyolefin backing film, a rear (discontinuous) metal layer (RML: 850) with an array (16-up format) of card body sites with a laser-cut module opening (MO: 814) and a slit (S: 820) wherein each card body site is supported by metal struts with laser-cut void sections between struts: an inter-coat layer (858) acting as an adhesion promoter in the form of a primer or an adhesive coating to enhance the bonding of the rear metal layer (RML: 850) to the layer of thermosetting resin (868B); and the assembly is encapsulated with said thermosetting resin (868B) filling any voids and openings with resin, applied by a method of pressure molding, coating, reaction injection molding, or any similar production technique.

FIG. 8E shows the subassemblies "a to b" as shown in FIG. 8C, and "c to d" as shown in FIG. 8D, with a center component section "b to c" as presented in FIG. 8B ready for press lamination with the subassemblies. The adhesive attachment of the components (booster antenna circuit (BAC: 844)) to the front and rear subassemblies ("a to b" & c to d) is achieved by the adhesive spacing layer (ASL: 843) a layer of thermosetting adhesive film and an inter-coat layer (848) in the form of a primer, an adhesive coating or an adhesive film.

Pressure Molding Encapsulation of a Metal Inlay

The urethane pressure molding method involves a low filling pressure and an exothermic chemical reaction, producing an encapsulated metal inlay with both thick and thin sections of thermoset resin (polyurethane).

The pressure molding takes place in a sealed chamber. The chamber is held at either high pressure or in a vacuum, helping to eliminate air bubbles in the thermoset resin encapsulating the metal inlay.

At a basic level, pressure molding is about using a time-sensitive chemical reaction under temperature control to cure a liquid into a solid. The chemical reaction is initiated when the raw ingredients of the thermoset resin, consisting of a polyol component (resin) and an isocyanate component (hardener), are mixed together. The thermoset resin mix is poured into a mold and fills all of the mold's details before it becomes too viscous. The thermoset resin (polyurethane) cures and the solid (resin encapsulated metal inlay) is removed from the mold.

FIG. 9A shows a 16-up metal inlay with each card body site supported by corner struts with void sections between struts, similar to the prior art in FIG. 5 (FIG. 16 of U.S. Ser. No. 17/882,569), and each card body site in the metal inlay provided with a laser-cut module opening and slit. FIG. 9A represents, before singulation to a metal card body, the metal inlay layer on the front face of the transaction card (SC: 700) shown in FIG. 7A. FIG. 9A illustrates the dimensional drawing of the front face metal inlay having a thickness of 304 µm, with 16 card body sites supported by corner struts between void sections, and each card body site having a slit (S: 920A) and a module opening (MO: 912—$P_1$).

FIG. 9B shows a card body site supported by corner struts between void sections from the 16-up metal inlay array shown in FIG. 9A. FIG. 9B illustrates a view of a card body site in the 16-up array representing the front face metal inlay layer (discontinuous) with a module opening (MO: 912—$P_1$) and a straight slit (S: 920A). The laser cut-module opening in the discontinuous metal layer has the dimensions of 13.7 mm×12.5 mm, leaving a separation channel of 250 µm around all sides of the transponder chip module implanted in the $P_1$ pocket (cavity) having the dimensions of 13.2 mm×12.0 mm. Notably, the module antenna of the transponder chip module does not inductively couple with the front face discontinuous metal layer.

FIG. 9C shows a 16-up supporting metal inlay with each card body site supported by corner struts with void sections between struts, and each card body site in the metal inlay provided with a laser-cut module opening and slit for inductive coupling with the module antenna of the transponder chip module. FIG. 9C represents, before singulation to a metal card body, the rear supporting metal inlay on the backside of the transaction card (SC: 700) shown in FIG. 7A. FIG. 9A illustrates the dimensional drawing of the supporting metal inlay having a thickness of 152 µm, with 16 card body sites supported by corner struts between void sections, and each card body site having a slit (S: 920B) and a module opening (MO: 914—$P_2$).

FIG. 9D shows a card body site supported by corner struts between void sections from the 16-up supporting metal inlay shown in FIG. 9C. FIG. 9D illustrates a view of a card body site in the 16-up array representing the rear supporting metal inlay layer (discontinuous) with a module opening (MO: 914—$P_2$) and a straight slit (S: 920B). The laser cut-module opening in the discontinuous metal layer has the dimensions of 9.8 mm×8.8 mm, leaving a separation channel of 200 µm around all sides of the mold mass of the transponder chip module implanted in the $P_2$ pocket (cavity) having the dimensions of 9.4 mm×8.4 mm. Notably, the module antenna of the transponder chip module inductively couples with the rear supporting (discontinuous) metal layer.

FIG. 10A shows the stack-up construction of a dual interface metal face smartcard having a front continuous metal layer (ML, CML, FML) and further having a magnetic shielding layer (MSL) and a booster antenna circuit (BAC) enabling contactless "tap to pay" function operating from the rear side of the card body.

FIG. 10A—Metal face Transaction Card with Booster Antenna Circuitry

Generally, the smartcard (SC) 1000A comprises a single front face continuous metal layer (ML, CML, FML: 1030) which has a module opening (MO: 1012) and no slit. A magnetic shielding layer (MSL: 1042) is disposed beneath the front face continuous metal layer, and attached (joined, mounted) thereto (to the back surface thereof) via an inter-coat layer (1038). A booster antenna circuit (BAC: 1044: comprising components 1044A, 1044B and 1044C) may be mounted via an adhesive spacing layer (ASL: 1043) to (behind) the magnetic shielding layer (MSL: 1042).

Thermosetting resin (TR: 1068) covers the back surface of the front face continuous metal layer (ML, CML, FML: 1030), the magnetic shielding layer (MSL: 1042), the booster antenna circuit (BAC: 1044), fills the module opening (MO: 1012) and also fills any voids in the magnetic shielding layer and the booster antenna circuit.

Thermosetting resin may be used in lieu of an Adhesive Spacing Layer (ASL: 1043) or in combination thereof to distance (to create a separation layer between) the booster antenna circuit from the magnetic shielding layer. This distance should be 50 µm or greater to achieve optimum shielding and RF functionality.

The booster antenna circuit (BAC: 1044) with a void (opening) may be attached by means of an inter-coat (1048) to the thermosetting resin (TR: 1068), and the magnetic shielding layer (MSL: 1042) with a void (opening) attached by means of an inter-coat (1038) to the front face continuous metal layer (ML, CML, FML: 1030) encapsulated with the thermosetting resin (TR: 1068) which further fills the voids in the booster antenna circuit and the magnetic shielding layer, as well as the laser-cut module opening in the front face continuous metal layer, with the adhesive spacing layer (ASL: 1043) joining the magnetic shielding layer to the booster antenna circuit.

The following elements may be shown and described in FIG. 10A and may correspond with similarly numbered elements in FIG. 8A (e.g., 10*nn* may correspond with 8*nn*):

1000A smartcard (SC) or metal transaction card, pre-lamination thickness of card body:
815 µm
1010 transponder chip module/inductive coupling chip module (TCM/ICM)
1011 module antenna (MA) which is a component of the transponder chip module
1023 raised characters—post lamination varnish (PLV)
1024 laser reactive, protective gloss or matte coating
1025 a transparent coat of rigid ink (hard coat) for scratch protection applied over the graphic print layer (1026), such as by means of digital printing
1026 graphic print layer-deposited ink (color)
1027 deposited primer
Combined thickness of the laser reactive, transparent hard coat, deposited ink and primer, approximately: 45 µm
1076 laser markings on the protective coating (1024)
Alternative Option
1028 powder coating, decorative finish, PVD or DLC coating replacing the deposited primer (1027), graphic print layer (1026) and the transparent hard coat (1025)
1030 front (face) metal layer (ML, FML), which may be a continuous metal layer (CML) with a laser-cut module opening (MO: 1012) with metal edges (1013)—thickness of the front metal layer: 406 µm stainless steel (16 mils)
1012 laser-cut module opening (MO)
1013 metal edges in the metal layer (1030) around the module opening (MO: 1012)
1038 inter-coat (an adhesion promoter in the form of a primer or an adhesive coating)—thickness of the inter-coat: 10 µm
1042 magnetic shielding layer (MSL) with a void-thickness of the magnetic shielding layer: 65 µm 1043 adhesive spacing layer (ASL), which may be a layer of thermosetting adhesive film joining the magnetic shielding layer (MSL 1042) to a booster antenna circuit (BAC: 1044)—thickness of the adhesive spacing layer: 50 µm 1044 booster antenna circuit (BAC) on a PET carrier layer (23 µm) having plated copper tracks and antenna circuitry on both sides (18 µm)—thickness of booster antenna circuit: 23 µm, assuming the copper tracks sink into the adhesive spacing layer (ASL: 1043) and inter-coat (1048)

1044A perimeter coil (PC) of the booster antenna circuit, disposed atop the PET carrier layer, and which may be a copper plated track 1044B PET (polyethylene terephthalate) carrier layer for supporting the booster antenna circuit and its various components 1044C coupler coil (CC) of the booster antenna circuit, which may be disposed beneath the PET carrier layer, and which may be a copper plated track 1044D capacitor bank of the booster antenna circuit, which may be disposed beneath the PET carrier layer 1048 inter-coat (an adhesion promoter in the form of a primer, an adhesive coating or an adhesive film) with a thickness to insulate and cover the perimeter coil and coupler coil, and circuitry on the PET carrier layer: thickness 10 µm 1068 a layer of thermosetting resin (TR) encapsulating the booster antenna circuit (BAC: 1044) with void, the magnetic shielding layer (MSL: 1042) with void, and filling the void in the laser-cut module opening (MO: 812)—rear thickness of the thermosetting resin may be 40 µm, and extends to the sacrificial layer (SL: 1009) through the voids and module opening for a distance of ~ 560 µm.

1058 inter-coat (an adhesion promoter in the form of a primer, an adhesive coating or an adhesive film)—thickness of the inter-coat: 10 µm 1060 graphic print layer (GPL), which may be a synthetic layer (PVC)—thickness of the graphic print layer: 125 µm 1062 primer 1064 deposited ink (color)—combined thickness of primer and ink: 16 µm 1070 overlay film or layer (OL), which functions as a protective film-thickness of the overlay layer: 60 µm 1074 magnetic stripe mounted to the rear overlay layer (1070)

1076 laser markings on the protective film (1070)

In the various embodiments disclosed herein, security elements (signature panel and hologram) disposed on the back of the card are not shown. Also, generally, the "voids" in various layers correspond with "openings" described in metal layers for receiving the transponder chip module.

FIG. 10B shows a smartcard having a single layer of thermosetting resin encapsulating a booster antenna circuit (BAC), a magnetic shielding layer (MSL) and a front face continuous metal layer (ML, CML, FML) having a module opening (MO), such as the smartcard shown in FIG. 10A. A dashed line "a" is shown above the front metal layer (FML: 1030), and sacrificial layer (SL: 1009) which will eventually be removed. A dashed line "b" is shown below the thermosetting resin (TR: 1068).

FIG. 10B shows a smartcard (SC: 1000B) having a magnetic shielding layer (MSL) and a booster antenna circuit (BAC), comprising the following main portions:

a top protective portion comprising hard coat, ink and primer (1023, 1024, 1025, 1026, 1027)

a front face metal portion;

and a bottom portion comprising rear printed stock (1060, 1062, 1064, 1070).

Method and apparatus will be described.

The front face metal portion of the smartcard, between the dashed lines "a" and "b" comprises:

a metal layer which is a continuous metal layer (ML, CML, FML: 1030) having a module opening (MO: 1012). The metal layer (1030) does not have a slit;

a magnetic shielding material (1042) with void (opening) disposed below the metal layer (ML); and an inter-coat (1038) disposed between the bottom surface of the metal layer (ML) and the magnetic shielding layer (MSL);

a booster antenna circuit (BAC: 1044) with void (opening) is disposed below the magnetic shielding layer (MSL: 1042) by means of an adhesive spacing layer (ASL: 1043); an inter-coat (1048) may be disposed on a back (bottom) surface of the booster antenna circuit (BAC: 1044); and thermosetting resin (TR: 1068) is applied to the elements comprising of the booster antenna circuit (BAC: 1044) with void, magnetic shielding layer (MSL: 1042) with void and the metal layer (ML: 1030) with a module opening (MO: 1012) to form a sub-assembly. A layer of thermosetting resin covers the entire area below the booster antenna circuit having a thickness of 40 µm or greater.

The magnetic shielding layer (MSL: 1042) may be a layer of ferrite or non-ferrite material having a void corresponding with the module opening (MO: 1012) in the metal layer (1030) and prevents the continuous metal layer from attenuating radio frequency (RF) signals passing between the card and an external reader (such as a POS terminal) when the back of the card is presented to the reader.

The layer of thermosetting resin on the bottom surface of the continuous metal layer (1030), and filling the module opening (MO: 1012) and voids in the magnetic shielding layer (MSL: 1042) and booster antenna circuit (BAC: 1044) may be applied by a process of coating, over-molding, vacuum or pressure casting, compression molding or reaction injection molding (RIM), or the like. In order to facilitate the process, a sacrificial layer (SL: 1009) may be applied on the top surface of the continuous metal layer (ML, CML, FML: 1030), covering the module opening (MO: 1012), to retain the thermosetting resin in the module opening and voids, with a top surface of the thermosetting resin being substantially coplanar with the top surface of the metal layer. The sacrificial layer may comprise polytetrafluoroethylene (PTFE, Teflon® or polyolefin backing film. The sacrificial layer will be removed after the thermosetting resin is sufficiently cured to remain in the module opening and voids, without leaking (bulging) out. Means other than a sacrificial layer, such as a plate, may be used to ensure that the top surface of the thermosetting resin is substantially coplanar with the top surface of the metal layer (in other words, that the thermosetting resin does not overfill the opening) when the thermosetting resin is applied from beneath the metal layer to fill the module opening.

The inter-coat (1038) applied to the bottom surface of the continuous metal layer and the inter-coat (1048) applied to the bottom surface of the booster antenna to promote adhesion, may be deposited through the manufacturing technique of spraying or screen printing.

The thermosetting resin (TR: 1068) may be applied to the booster antenna circuit (1044) with or without a primer.

The module opening filled with thermosetting resin, may then be machined (milled) to form a pocket or cavity to accept insertion of a chip module (TCM, ICM) into the module opening (i.e., the machined pocket or cavity within the module opening). The module opening may be slightly larger than the module, so that the module does not contact the sides of the module opening of the metal layer, insulated therefrom by the cured/hardened thermosetting resin. Also, the module will rest upon the thermosetting resins (TR: 1068).

In a subsequent fabrication step, the rear printed stock may be laminated with elevated pressure and temperature to the encapsulated sub-assembly, and the module may be implanted into the module opening (i.e., the machined pocket or cavity within the module opening) after lamination.

FIG. 10C shows a smartcard (SC: 1000C) having a transponder chip module (TCM: 1010) implanted in a module opening (MO: 1012) in a front face, discontinuous metal layer (ML, FML, DML: 1030) having a slit (S: 1020A), wherein the module opening has been filled with thermosetting resin (TR: 1068A) and machined (such as milled) to have a pocket or cavity for receiving and providing mechanical support for the transponder chip module, and insulating the module from the metal layer, particularly the edges (1013) of the module opening in the metal layer, such as has been described with respect to FIGS. 10A and 10B.

The card construction shown in FIG. 10C is substantially similar to the card construction shown in FIG. 10B, with the addition of the transponder chip module (TCM: 1010) with module antenna (MA: 1011) inserted into the module opening, and is intended to shown that the module may be supported and insulated by the thermosetting resin (TR: 1068B).

In their various embodiments, the invention(s) described herein may relate to payment smartcards (metal, plastic or a combination thereof), electronic credentials, identity cards, loyalty cards, access control cards, and the like.

While the invention(s) may have been described with respect to a limited number of embodiments, these should not be construed as limitations on the scope of the invention(s), but rather as examples of some of the embodiments of the invention(s). Those skilled in the art may envision other possible variations, modifications, and implementations that are also within the scope of the invention(s), and claims, based on the disclosure(s) set forth herein.

What is claimed is:

1. A method of making a smartcard comprising:
providing a metal layer (ML) having a module opening (MO) extending from a front surface of the metal layer to a rear surface thereof;
providing a sacrificial layer (SL) on the front surface of the metal layer, wherein the sacrificial layer covers at least the module opening; and
from the rear surface of the metal layer, filling the module opening with thermosetting resin (TR);
further comprising:
allowing the thermosetting resin to cure (harden);
removing the sacrificial layer; and
from the front surface of the metal layer, milling a cavity in the cured (hardened) thermosetting resin for receiving a transponder chip module (TCM).

2. The method of claim 1, further comprising:
disposing a graphic print layer on the front surface of the metal layer.

3. The method of claim 2, further comprising:
applying a transparent coat of rigid ink (hard coat) for scratch protection over the graphic print layer.

4. The method of claim 3, further comprising:
disposing a laser-reactive, protective gloss or matte coating over the transparent coat.

5. The method of claim 4, further comprising:
providing laser markings on the protective coating.

6. The method of claim 1, further comprising:
implanting the transponder chip module in the milled-out cavity.

* * * * *